(12) United States Patent
Makabe et al.

(10) Patent No.: US 8,758,973 B2
(45) Date of Patent: Jun. 24, 2014

(54) METHOD AND APPARATUS FOR PRODUCING TONER

(75) Inventors: Keiji Makabe, Shizuoka (JP);
Yohichiroh Watanabe, Shizuoka (JP);
Minoru Masuda, Shizuoka (JP);
Yasutada Shitara, Shizuoka (JP);
Yoshihiro Norikane, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 13/235,016

(22) Filed: Sep. 16, 2011

(65) Prior Publication Data

US 2012/0070777 A1  Mar. 22, 2012

(30) Foreign Application Priority Data

Sep. 16, 2010 (JP) ................... 2010-208237
Jan. 28, 2011 (JP) ................... 2011-017096
Mar. 4, 2011 (JP) ................... 2011-047673

(51) Int. Cl.
*G03G 5/00* (2006.01)

(52) U.S. Cl.
USPC .......................................... 430/137.1; 425/6

(58) Field of Classification Search
USPC ......... 430/137.14, 110.4, 137.1; 425/6; 264/9
See application file for complete search history.

(56) References Cited

U.S. PATENT DOCUMENTS

| 8,034,526 | B2* | 10/2011 | Watanabe et al. | 430/137.1 |
| 8,110,332 | B2* | 2/2012 | Suzuki et al. | 430/137.1 |
| 8,329,373 | B2* | 12/2012 | Norikane et al. | 430/137.1 |
| 8,652,744 | B2* | 2/2014 | Yohichiroh et al. | 430/137.1 |
| 2008/0063971 | A1 | 3/2008 | Watanabe et al. | |
| 2008/0286679 | A1* | 11/2008 | Norikane et al. | 430/110.4 |
| 2008/0292985 | A1* | 11/2008 | Suzuki et al. | 430/116 |
| 2009/0317738 | A1* | 12/2009 | Honda et al. | 430/137.14 |
| 2010/0003613 | A1* | 1/2010 | Honda et al. | 430/110.4 |
| 2010/0021209 | A1* | 1/2010 | Watanabe et al. | 399/252 |
| 2010/0104970 | A1* | 4/2010 | Norikane et al. | 430/137.14 |
| 2010/0227267 | A1 | 9/2010 | Shitara et al. | |
| 2011/0014565 | A1 | 1/2011 | Norikane et al. | |
| 2011/0305987 | A1* | 12/2011 | Yohichiroh et al. | 430/109.3 |

FOREIGN PATENT DOCUMENTS

| CN | 101308338 A | 11/2008 |
| CN | 101308339 A | 11/2008 |
| CN | 101308340 A | 11/2008 |
| CN | 101542396 A | 9/2009 |
| CN | 101556442 A | 10/2009 |

(Continued)

OTHER PUBLICATIONS

Combined Chinese Office Action and Search Report issued Oct. 30, 2012 in Patent Application No. 201110433996.1 with English Translation and English Translation of Category of Cited Documents.

(Continued)

*Primary Examiner* — Stewart Fraser
(74) *Attorney, Agent, or Firm* — Oblon, Spivak, McClelland, Maier & Neustadt, L.L.P.

(57) ABSTRACT

An apparatus for producing a toner, including a liquid droplet-forming unit configured to discharge a toner composition liquid containing at least a resin and a colorant at a uniform discharge speed from a plurality of discharge holes some of which have different shapes from each other to thereby form liquid droplets, and a particle-forming unit configured to solidify the liquid droplets of the toner composition liquid to thereby form particles.

8 Claims, 20 Drawing Sheets

(56) References Cited

FOREIGN PATENT DOCUMENTS

| | | |
|---|---|---|
| CN | 101807018 A | 8/2010 |
| EP | 1 992 993 A2 | 11/2008 |
| EP | 1 992 993 A3 | 11/2008 |
| JP | 57-201248 | 12/1982 |
| JP | 7-152202 | 6/1995 |
| JP | 11-170511 | 6/1999 |
| JP | 2002-1965 | 1/2002 |
| JP | 2003-268031 | 9/2003 |
| JP | 2005-194495 | 7/2005 |
| JP | 3786034 | 3/2006 |
| JP | 3786035 | 3/2006 |
| JP | 2006-297325 A | 11/2006 |
| JP | 2008-242416 | 10/2008 |
| JP | 2008-276146 | 11/2008 |
| JP | 2008-281915 | 11/2008 |
| JP | 2009-69862 | 4/2009 |
| JP | 2010-204596 | 9/2010 |
| WO | WO 2009/078493 A1 | 6/2009 |

OTHER PUBLICATIONS

Extended European Search Report issued Sep. 5, 2013, in European Patent Application No. 11181679.9.

* cited by examiner $N=2$
$L=\lambda/2$ $N=2$
$L=\lambda/2$ $N=3$
$L=3\lambda/4$

METHOD AND APPARATUS FOR PRODUCING TONER

BACKGROUND OF THE INVENTION

1. Field of the Invention

The present invention relates to a method and apparatus for producing a toner used for developing an electrostatic image in, for example, copiers, electrostatic printing, printers, facsimiles and electrostatic recording.

2. Description of the Related Art

Developers used for developing an electrostatic image in, for example, electrophotography, electrostatic recording and electrostatic printing adhere to a latent electrostatic image bearing member on which an electrostatic image has been formed; then are transferred from the latent electrostatic image bearing member onto a recording medium (e.g., a recording paper sheet); and then are fixed on the surface of the recording medium. As have been known, such developers that develop an electrostatic image formed on the latent electrostatic image bearing member are roughly classified into two-component developers formed of a carrier and a toner and one-component developers requiring no carrier (magnetic or non-magnetic toners).

Conventionally, dry toners widely used in, for example, electrophotography, electrostatic recording and electrostatic printing have been so-called pulverized toners which are produced by finely pulverizing a melt-kneaded product of a toner binder (e.g., a styrene resin and a polyester resin), a colorant and the like.

Also, polymerization toners have recently been proposed, which are produced with the suspension polymerization method or the emulsion polymerization aggregation method.

However, the suspension polymerization method and the emulsion polymerization aggregation method pose a problem that the types of employable resins are limited.

In view of this, Japanese Patent Application Laid-Open (JP-A) No. 07-152202 or other literatures disclose a polymerization toner produced by a polymer dissolution suspension method involving volume shrinkage. In the polymer dissolution suspension method, toner materials are dispersed or dissolved in a volatile solvent such as an organic solvent having a low boiling point; and the resultant liquid is emulsified in an aqueous medium in the presence of a dispersing agent to form liquid droplets; and the volatile solvent is removed from the liquid droplets. Unlike the suspension polymerization method and the emulsion polymerization aggregation method, the polymer dissolution suspension method is advantageous in that a wider variety of resins can be used; in particular, a polyester resin can be used which is used for forming a full-color image having transparency and smoothness in image portions after fixing.

In this polymer dissolution suspension method, however, the dispersing agent must be used in the aqueous medium. Thus, the dispersing agent, which degrades chargeability of the formed toner particles, remains on their surfaces to impair environmental stability thereof. In order to avoid such an unfavorable phenomenon, the remaining dispersing agent must be removed using a very large amount of wash water, which is problematic.

In view of this, spray granulation methods have long been proposed as toner production methods using no aqueous medium (see, for example, JP-A No. 57-201248). The spray granulation methods produce particles through a process including: discharging a liquid containing toner materials melted or dissolved using various atomizers in the form of fine particles; and drying the fine particles to form particles. Thus, these spray granulation methods do not cause failures due to use of an aqueous medium.

However, the particles produced by conventional spray granulation methods are relatively coarse and large as well as broad in particle size distribution, problematically degrading the properties of the formed toner particles.

In view of this, there have been proposed a production method and a production apparatus for producing a toner through a process including: forming fine liquid droplets from nozzles utilizing piezoelectric pulsing; and drying and solidifying the fine liquid droplets to produce a toner (see, for example, Japanese Patent (JP-B) No. 3786034).

However, in the above toner production method and apparatus, nozzles correspond to piezoelectric elements on a one-on-one basis; i.e., the liquid droplets can be discharged from only one nozzle by one piezoelectric element. Thus, the number of liquid droplets discharged per unit of time is small to make their productivity low.

Also, there have been proposed a toner production method and apparatus for producing a toner through a process including: discharging a toner composition liquid from nozzles as fine liquid droplets to a solidification part by piezoelectric pulses converged with an acoustic lens; and drying and solidifying the fine liquid droplets (see, for example, JP-B No. 3786035).

However, also in the above toner production method and apparatus, the liquid droplets can be discharged from only one nozzle by one piezoelectric element. Thus, the number of liquid droplets discharged per unit of time is small to make their productivity low.

In view of this, there has been a toner production method including: expanding and contracting a piezoelectric element to vibrate a vibrating surface thereof facing a thin film containing a plurality of discharge holes (nozzles) thereby discharging liquid droplets of a toner composition fluid at a certain frequency; and solidifying the liquid droplets to form toner particles (see, for example, JP-A No. 2008-276146).

However, as in the above toner production method, when a plurality of discharge holes are provided per piezoelectric element, the time required that each discharge hole receives the vibration of the piezoelectric element varies with the distance from the discharge hole to the piezoelectric element. Thus, there arises time-lag between the liquid droplets discharged from the discharge holes, resulting in that the amounts of the liquid droplets discharged are different between the discharge holes.

In view of this, there have been proposed a method and apparatus for producing toner particles including: directly vibrating a thin film, which contains a plurality of discharge holes and is connected to a liquid chamber, by an electromechanical transducing unit disposed around the thin film to discharge a toner composition liquid as liquid droplets (film-vibrating discharge unit); and solidifying the liquid droplets to form toner particles (see, for example, JP-A No. 2008-281915). The above production method and apparatus for toner particles can directly vibrate the thin film containing the discharge holes and thus, can produce toner particles having a monodispersed particle size.

BRIEF SUMMARY OF THE INVENTION

However, as seen in the above-described method and apparatus for producing toner particles, when discharging a toner composition liquid as liquid droplets by utilizing wave generated parallel to a thin film having a plurality of discharge holes, the distribution of the vibration speeds is formed in the direction parallel to the thin film, thereby forming the distribution of sound pressures applied to meniscus of the toner composition liquid in the discharge holes; hence forming the distribution of discharge speeds of the toner composition liquid. As a result, the toner composition liquid is not discharged at a place where the sound pressure applied to the meniscus is small; even if discharged, the liquid droplets are easy to aggregate with each other. Therefore, an area where monodispersed liquid droplets can be discharged becomes disadvantageously small relative to the total area of the thin film (discharge structure or nozzle plate), which is problematic. When the area where the monodispersed liquid droplets can be discharged is small, an apparatus necessary for production has to be made large as well as such production apparatus is decreased in energy efficiency. Therefore, at present, there is a need to enlarge the area where the monodispersed liquid droplets can be discharged.

The present invention aims to solve the above existing problems and achieve the following objects. Specifically, an object of the present invention is to provide fine resin particle production method and apparatus as well as toner production method and apparatus which can discharge liquid droplets from a plurality of discharge holes at the same time, which can discharge a uniform amount of liquid droplets from the discharge holes without aggregating the discharged liquid droplets with each other, which can discharge a larger number of liquid droplets per unit of time, and which can efficiently produce fine resin particles and toner particles having a wide variety of applications and a high monodispersibility.

The present inventors conducted extensive studies to solve the above existing problems and have obtained the following finding. That is, they have found that by using a production apparatus including a liquid droplet-forming unit configured to discharge a toner composition liquid containing at least a resin and a colorant at a uniform discharge speed from a plurality of discharge holes some of which have different shapes from each other to thereby form liquid droplets, and a particle-forming unit configured to solidify the liquid droplets of the toner composition liquid to thereby form particles, liquid droplets can be discharged from a plurality of discharge holes at the same time, a uniform amount of liquid droplets can be discharged from the discharge holes without aggregating the discharged liquid droplets with each other, a larger number of liquid droplets can be discharged per unit of time, and toner particles having a wide variety of applications and a high monodispersibility can efficiently be produced. The present invention has been accomplished on the basis of this finding.

The present invention is based on the above finding obtained by the present inventors. Means for solving the above problems are as follows.

<1> An apparatus for producing a toner, including:
a liquid droplet-forming unit configured to discharge a toner composition liquid containing at least a resin and a colorant at a uniform discharge speed from a plurality of discharge holes some of which have different shapes from each other to thereby form liquid droplets, and
a particle-forming unit configured to solidify the liquid droplets of the toner composition liquid to thereby form particles.

<2> The apparatus for producing a toner according to <1>, wherein the liquid droplet-forming unit includes a discharge structure in which the plurality of the discharge holes are formed, wherein the discharge holes each have such a tapered shape that an opening size thereof decreases along a direction in which the toner composition liquid is discharged, and wherein the discharge holes each have a taper angle different depending on a position thereof in the discharge structure.

<3> The apparatus for producing a toner according to <2>, wherein the liquid droplet-forming unit further includes a vibration generator configured to generate a vibration, and the vibration generator is annularly provided at the periphery of the discharge structure.

<4> The apparatus for producing a toner according to <3>, wherein the taper angles of the discharge holes located at the side of the vibration generator in the discharge structure are greater than those of the discharge holes located at a central portion of the discharge structure.

<5> The apparatus for producing a toner according to <1> or <2>, wherein the liquid droplet-forming unit includes a liquid chamber in which the discharge holes are formed and a vibration generator configured to apply a vibration to the toner composition liquid in the liquid chamber, and wherein the liquid droplet-forming unit is configured to allow the vibration generator to apply a vibration to the toner composition liquid in the liquid chamber to form a standing wave in the toner composition liquid through liquid column resonance, to thereby discharge the toner composition liquid as the liquid droplets from the discharge holes formed in a region corresponding to an antinode of the standing wave.

<6> The apparatus for producing a toner according to any one of <1> to <5>, wherein the particle-forming unit includes a conveyance gas flow path which allows a conveyance gas flow to pass therethrough, the conveyance gas flow being for conveying the liquid droplets of the toner composition liquid, or solidified particles thereof, or both thereof.

<7> The apparatus for producing a toner according to <6>, wherein the conveyance gas flow path is provided so as to allow the conveyance gas flow to flow in a direction almost perpendicular to a direction of an initial discharge speed of the liquid droplets discharged by the liquid droplet-forming unit.

<8> A method for producing a toner with the apparatus according to any one of <1> to <7>, the method including:
discharging a toner composition liquid containing at least a resin and a colorant at a uniform discharge speed from a plurality of discharge holes some of which have different shapes from each other to thereby form liquid droplets, and
solidifying the liquid droplets of the toner composition liquid to thereby form particles.

<9> The method for producing a toner according to <8>, wherein the discharging is allowing a vibration generator to apply a vibration to a discharge structure containing the discharge holes to thereby discharge the toner composition liquid as the liquid droplets, the vibration generator being annularly provided at the periphery of the discharge structure.

<10> The method for producing a toner according to <8>, wherein the discharging is applying a vibration to the toner composition liquid in a liquid chamber containing the discharge holes to form a standing wave in the toner composition liquid through liquid column resonance to thereby discharge the toner composition liquid from the discharge holes formed in a region corresponding to an antinode of the standing wave.

<11> The method for producing a toner according to any one of <8> to <10>, wherein the solidifying includes conveying the liquid droplets present within a distance of 2 mm from openings of the discharge holes where the openings are at the side where the toner composition liquid is discharged, using a conveyance gas flow which flows in a direction almost perpendicular to a direction of an initial discharge speed of the liquid droplets.

<12> The method for producing a toner according to any one of <8> to <11>, further including, prior to the discharging, dissolving or dispersing in an organic solvent a toner composition containing at least a resin and a colorant to thereby prepare the toner composition liquid, and filtrating the toner composition liquid to remove coarse particles therefrom, wherein a temperature of the toner composition liquid at the discharging is made higher than that of the toner composition liquid at the filtrating.

<13> A toner obtained with the apparatus according to any one of <1> to <7>.

<14> The toner according to <13>, wherein the toner has a particle size distribution of 1.00 to 1.10 where the particle size distribution is expressed by the following: a volume average particle diameter of the toner/a number average particle diameter of the toner.

<15> An apparatus for producing fine resin particles, including:
a liquid droplet-forming unit configured to discharge a resin composition liquid at a uniform discharge speed from a plurality of discharge holes some of which have different shapes from each other to thereby form liquid droplets, and
a particle-forming unit configured to solidify the liquid droplets of the resin composition liquid to thereby form particles.

<16> A method for producing fine resin particles with the apparatus according to <15>, the method including:
discharging a resin composition liquid at a uniform discharge speed from a plurality of discharge holes some of which have different shapes from each other to thereby form liquid droplets, and
solidifying the liquid droplets of the resin composition liquid to thereby form particles.

The present invention can provide a toner production method and apparatus which can discharge liquid droplets from a plurality of discharge holes at the same time, can discharge a uniform amount of liquid droplets from the discharge holes without aggregating the discharged liquid droplets with each other, can discharge a larger number of liquid droplets per unit of time, and can efficiently produce fine resin particles and toner particles having a wide variety of applications and a high monodispersibility. These can solve the above existing problems and achieve the above objects.

DETAILED DESCRIPTION OF THE INVENTION

Figure 1:
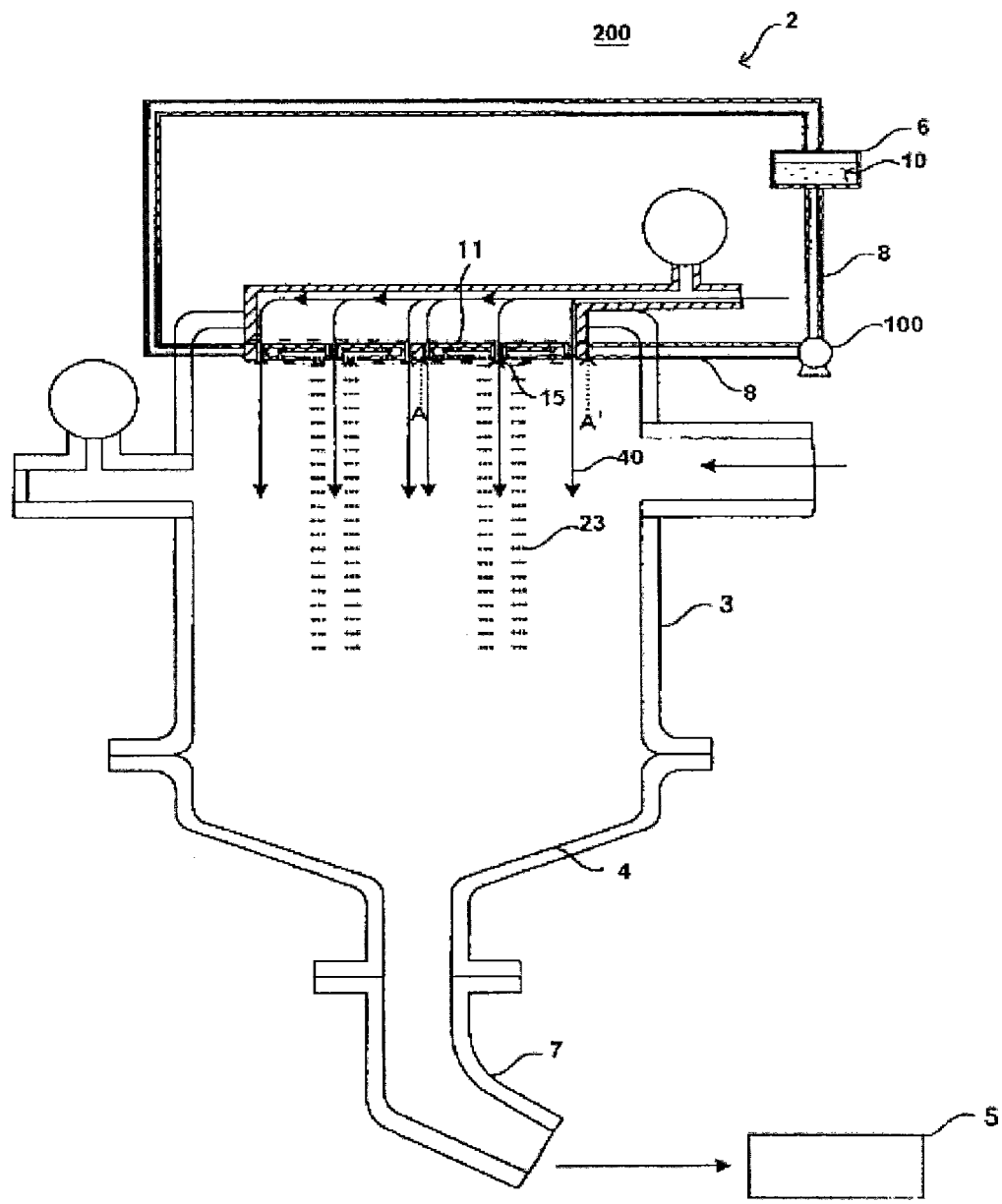
FIG. 1 is a schematic cross-sectional view of one exemplary toner production apparatus according to the present invention.

Apparatus and Method for Producing Fine Resin Particles

An apparatus of the present invention for producing fine resin particles includes at least a liquid droplet-forming unit and a particle-forming unit; and, if necessary, further includes other units.

A method of the present invention for producing fine resin particles includes at least a liquid droplet-forming step and a particle-forming step; and, if necessary, further includes other steps.

The fine resin particles contain at least a resin; and, if necessary, further contain other ingredients.

Next will be described in detail the method and apparatus of the present invention for producing fine resin particles, taking a case as an example where the fine resin particles are toner particles.

The apparatus of the present invention for producing a toner includes a liquid droplet-forming unit and a particle-forming unit; and, if necessary, further includes other units such as a toner composition liquid-filtrating unit.

The method of the present invention for producing a toner includes a liquid droplet-forming step and a particle-forming step; and, if necessary, further includes other steps prior to the liquid droplet-forming step such as a toner composition liquid preparation step, an aging step and a filtration step. The method of the present invention for producing a toner is suitably performed by the above apparatus for producing a toner.

Next, the method of the present invention for producing a toner will also be described in detail along with the apparatus of the present invention for producing a toner.

<Liquid Droplet-Forming Step and Unit>

The liquid droplet-forming step is a step of discharging a toner composition liquid at a uniform discharge speed from a plurality of discharge holes some of which have different shapes from each other to thereby form liquid droplets, and is performed by the liquid droplet-forming unit.

The liquid droplet-forming unit is not particularly limited and may be appropriately selected depending on the intended purpose, so long as it can discharge the toner composition liquid at a uniform discharge speed from a plurality of discharge holes some of which have different shapes from each other to thereby form liquid droplets. The liquid droplet-forming unit preferably has a liquid chamber and a liquid droplet-discharging portion.

The type of the liquid droplet-forming unit is not particularly limited, so long as the liquid droplet-forming unit can form liquid droplets, and may be appropriately selected depending on the intended purpose. Examples thereof include a film vibration-type liquid droplet-forming unit and a liquid column resonance-type liquid droplet-forming unit.

<<Film Vibration Type>>

When the below-described discharge structure having a plurality of discharge holes is a film, the film vibration-type liquid droplet-forming unit is a unit configured to apply a vibration to the film with the below-described vibration generator to discharge the toner composition liquid from the discharge holes as liquid droplets.

—Liquid Chamber—

The liquid chamber is provided in a toner composition flow path and reserves the below-described toner composition.

The shape of the liquid chamber is not particularly limited and may be appropriately selected depending on the intended purpose. For example, the liquid chamber has, for example, a cylindrical shape, angular shape and conical shape.

The structure of the liquid chamber is not particularly limited and may be appropriately selected depending on the intended purpose. The liquid chamber has, for example, a single-layered structure composed of a container, and a dual or laminated structure composed of a container main body and a surface layer.

The material of the container may be the same or different from that of the surface layer brought into contact with the toner composition.

The material of the surface layer brought into contact with the toner composition is not particularly limited and may be appropriately selected depending on the intended purpose. Examples thereof include metals, ceramics, plastics and silicone. Among them, preferred are materials that do not dissolve in the toner composition liquid nor degrade the toner composition liquid.

The size of the liquid chamber is not particularly limited and may be appropriately selected depending on the intended purpose.

—Liquid Droplet-Discharging Portion—

The liquid droplet-discharging portion includes at least a discharge structure containing a plurality of discharge holes some of which have different shapes from each other, and a vibration generator; and, if necessary, further includes other portions. The liquid droplet-discharging portion applies a vibration to the discharge structure with the vibration generator to discharge the toner composition at a uniform discharge speed as liquid droplets from the discharge holes some of which have different shapes from each other.

The liquid droplet-discharging portion is not particularly limited and may be appropriately selected depending on the intended purpose. It is preferably a portion which forms into liquid droplets the liquid contained in the liquid chamber (which may be referred to as "reservoir") by utilizing a resonance phenomenon. In this case, when the resonance frequency of the liquid chamber is overlapped with the resonance frequency of the toner composition liquid, the toner composition liquid cannot receive vibration desirably. Thus, the resonance frequency of the toner composition liquid in the liquid chamber is preferably lower than the resonance frequency of the liquid chamber, since the toner composition liquid in the liquid chamber is uniformly increased in pressure to attain a uniform discharge speed during formation of liquid droplets.

—Discharge Structure—

The discharge structure includes at least a plurality of discharge holes provided for discharging the toner composition liquid, some of which have different shapes from each other; and, if necessary, further includes other portions.

When the liquid droplet-forming unit is of a film vibration type, the discharge structure is preferably a thin film or a plate from the viewpoint of obtaining desired vibration.

The area of a surface of the discharge structure where the discharge holes are formed (i.e., a surface of the discharge structure having openings of the discharge holes) is not particularly limited and may be appropriately selected depending on the intensity of vibration applied by the vibration generator. The area thereof is preferably 1 mm$^2$ to 80 mm$^2$, more preferably 3 mm$^2$ to 20 mm$^2$. When the area thereof is smaller than 1 mm$^2$, the total area of the openings of the discharge holes is small relative to the total area of the discharge structure in the case where a conveyance gas flow path is formed in a particle-forming unit described below, potentially degrading toner production efficiency. Whereas when the area thereof exceeds 80 mm$^2$, the production apparatus becomes too large, and even when the conveyance gas flow path is provided, it may be difficult to obtain the effect of preventing aggregation of liquid droplets.

Also, the material of the discharge structure is not particularly limited and may be appropriately selected depending on the intended purpose. The discharge structure is preferably a metal plate.

The thickness of the discharge structure is not particularly limited and may be appropriately selected depending on the intended purpose. It is preferably 5 μm to 500 μm.

The shape of the discharge structure is not particularly limited and may be appropriately selected depending on the intended purpose. When the liquid droplet-forming unit is of a film vibration type, the discharge structure is preferably circular from the viewpoint of being uniformly vibrated. In the cross-section of the discharge structure in the thickness direction, preferably, a central portion of the discharge structure's surface having the discharge holes is protruded to form a convex portion in the direction in which liquid droplets are discharged. This is because provision of such a convex portion can control the direction in which liquid droplets are discharged (traveled), and can more uniformly vibrate the entire discharge structure to form liquid droplets more uniformly.

Also, when the liquid droplet-forming unit is of a film vibration type, the discharge structure is preferably provided so as to be deflected upon application of vibration. The method for deflecting the discharge structure is not particularly limited and may be appropriately selected depending on the intended purpose. Examples of the method include a method in which the discharge structure is joined/fixed via a bonding portion on a frame provided at the outermost circumference of the discharge structure.

The elastic modulus of a member used for the bonding portion is not particularly limited and may be appropriately selected depending on the intended purpose. The elastic modulus thereof is preferably 10$^8$ Pa or higher since a concentric, uniform vibration state can be established in each discharge hole whereby liquid droplets are stably discharged to obtain a toner having a uniform particle size distribution.

Use of a material having a high elastic modulus as the member for the bonding portion is advantageous in that the discharge structure can be firmly fixed at the outermost circumference of the discharge structure. With this configuration, vibration is efficiently propagated in the discharge structure. This configuration is preferred especially when the discharge structure (film) is a circular structure (film) since vibration is efficiently propagated therein.

The above elastic modulus can be measured by, for example, an ultrasonic method.

The entirety of the exposed surfaces of the discharge structure and the frame and/or the discharge structure and the vibration generator is preferably electrically insulated with a liquid repellent film or a bonding agent made of an insulating material.

The material used for the liquid repellent film or bonding agent is not particularly limited, so long as it is an insulating material, and may be appropriately selected depending on the intended purpose. Examples thereof include fluorine-containing resins such as polytetrafluoroethylene (PTFE), tetrafluoroethylene-perfluoroalkyl vinyl ether copolymer (PFA), fluorinated ethylene propylene (FEP) and polyfluorinated vinylidene; epoxy resins such as bisphenol A and bisphenol F; and SiO$_2$. These may be used alone or in combination. Also, there is suitably used a liquid repellent film described in JP-A No. 2010-107904 and containing a SiO$_2$ film and a compound thereon having a perfluoroalkyl group and having at its ends an alkyl group via a siloxan bond.

—Discharge Hole—

A plurality of discharge holes (each discharge hole may also be referred to as "nozzle" or "through hole") are formed in the discharge structure. Some of the discharge holes have different shapes from each other (i.e., the discharge holes include discharge holes having different shapes from each other).

The number of the discharge holes is not particularly limited and may be appropriately selected depending on the intended purpose. When the liquid droplet-forming unit is of a film vibration type, the number of the discharge holes formed in one discharge structure is preferably 2 to 3,000.

The minimum interval (pitch) of the centers of the discharge holes adjacent to each other is not particularly limited and may be appropriately selected depending on the intended purpose. From the viewpoint of discharging uniform particles, the discharge holes are preferably arranged such that their centers are at regular intervals.

The size of the opening (opening size) of the discharge hole (the end portion of the discharge hole at the side where liquid droplets are discharged) is not particularly limited and may be appropriately selected depending, for example, on the intended volume of each of the discharged liquid droplets. It is preferably 3 μm to 30 μm from the viewpoint of forming fine liquid droplets having a very uniform particle diameter by discharging (spraying) the toner composition liquid as liquid droplets from the discharge holes. The volume of each of the discharged liquid droplets is substantially determined by the size of the opening of the discharge hole. For example, in order for solidified toner particles to have a particle diameter of about 6 μm, the opening size of the discharge hole is preferably 8 μm to 12 μm.

Notably, when the discharge hole is a truly circular discharge hole, the opening size thereof means a diameter thereof. When the discharge hole is an ellipsoidal discharge hole or in the form of (regular) polygon such as square, hexagon and octagon, the opening size thereof means an average diameter thereof.

In the discharge structure, the manner in which the discharge holes are arranged is not particularly limited and may be appropriately selected depending on the intended purpose. When the liquid droplet-forming unit is of a film vibration type, the discharge holes are preferably provided in a central region in the surface perpendicular to the thickness direction of the discharge structure (hereinafter may be referred to as "central region of the discharge structure").

When the toner production apparatus has the below-described vibration generator around the discharge structure, the minimum distance from the discharge holes to the vibration generator is not particularly limited and may be appropriately selected depending, for example, on the area of the discharge structure and the intensity of the vibration applied by the vibration generator. The discharge holes are preferably disposed at positions where the vibration displacement of the discharge structure is not 0. At the discharge holes disposed at positions where the vibration displacement of the discharge structure is 0, the toner composition liquid may exude therefrom.

The shape of the discharge holes is not particularly limited and may be appropriately selected depending on the intended purpose, so long as some of the discharge holes have different shapes from each other and the toner composition liquid can be discharged uniformly between the discharge holes.

Preferably, the shape of the discharge holes is a round shape or a tapered shape where the opening size thereof gradually decreases along the direction in which the liquid droplets (toner composition liquid) are discharged. When the discharge holes have a tapered shape, the discharge holes preferably have different taper angles depending on the positions in the discharge structure. When the discharge holes have a round shape, the discharge holes preferably have different curvature radii depending on the positions in the discharge structure. In this manner, when the discharge holes have different taper angles or curvature radii depending on the positions in the discharge structure, the toner composition can be discharged uniformly. In other words, by varying the discharge holes in taper angle or curvature radius with the positions in the discharge structure to adjust the pressure loss depending on the positions of the discharge holes in the discharge structure, the discharge speeds at the discharge holes can be controlled to discharge the toner composition liquid from the discharge holes at a uniform speed. This is preferred in that the distribution of the speed of the liquid to be discharged becomes the same among the discharge holes and as a result toner particles can be formed with high accuracy.

Here, the "taper angle" refers to an angle formed between a vertical line (axis) with respect to a surface having openings of the discharge holes (i.e., a surface perpendicular to the thickness direction of the discharge structure) and a side surface of each discharge hole in the cross-section thereof in the thickness direction of the discharge structure. Also, the "curvature radius" refers to a curvature radius of a round shape curved, in the thickness direction of the discharge structure, from a surface having openings of the discharge hole (i.e., a surface perpendicular to the thickness direction of the discharge structure). The taper angle or curvature radius can be measured through observation with, for example, a confocal microscope.

The method for forming the discharge holes in the discharge structure is not particularly limited and may be appropriately selected depending on the intended purpose. Examples thereof include a method for processing the discharge structure through electroformation and a method for processing the discharge structure through discharging. Also, the method for processing the discharge holes so as to have a desired taper angle or curvature radius is not particularly limited and may be appropriately selected depending on the intended purpose. When electroformation has been employed for processing the discharge structure, the formed discharge holes may be processed through, for example, IGA process. When discharging has been employed for processing the discharge structure, the formed discharge holes may be processed by, for example, a method by controlling with electrodes.

—Vibration Generator—

The vibration generator is not particularly limited, so long as it can generate a vibration, and may be appropriately selected depending on the intended purpose. The vibration generator applies a vibration to the discharge structure to discharge the toner composition liquid in the discharge holes of the discharge structure in the form of liquid droplets.

Specific examples of the vibration generator include an ultrasonic generator which generates a mechanical vibration by piezoelectric effects or magnetostriction effects. Of these, preferred are those capable of converting electricity to mechanical vibration by piezoelectric effects, since they can efficiently generate a vibration at higher frequencies. Examples thereof include a piezoelectric element.

The material of the piezoelectric element is not particularly limited and may be appropriately selected depending on the intended purpose. Examples thereof include piezoelectric ceramics such as lead zirconate titanate (PZT); piezoelectric polymers such as polyvinylidene difluoride (PVDF); and single crystals such as crystals, $LiNbO_3$, $LiTaO_3$ and $KNbO_3$. Of these, lead zirconate titanate (PZT) is preferred from the viewpoint of controlling vibration.

The position of the vibration generator is not particularly limited, so long as the toner composition liquid can be efficiently vibrated, and may be appropriately selected depending on the intended purpose. When the liquid droplet-forming unit is of a film vibration type, the vibration generator is preferably provided around a region of the discharge structure where the discharge holes are formed, more preferably, the vibration generator is annularly provided around a region of the discharge structure where the discharge holes are formed.

The method for providing the vibration generator around the region of the discharge structure where the discharge holes are formed is not particularly limited and may be appropriately selected depending on the intended purpose. Examples thereof include a method in which the vibration generator is joined/fixed via a bonding portion on the discharge structure. In this case, particularly preferably, the vibration generator is annularly provided around a region where the discharge holes are formed, the region being present within a region where the discharge structure is not fixed on the frame provided at the outermost circumference of the discharge structure (hereinafter may be referred to as "deformable region").

—Liquid Droplet Formation—

Next will be described a mechanism by which a toner composition liquid is periodically discharged as liquid droplets at the liquid droplet-forming step when the liquid droplet-forming unit is of a film vibration type.

When the discharge structure is a film, the vibration generator generates and applies a vibration to the discharge structure (film) having a plurality of discharge holes facing the liquid chamber thereby periodically vibrating the discharge structure. With this configuration, a plurality of discharge holes can be disposed in a relatively large area (1 mm or greater in diameter) and liquid droplets can periodically be discharged from the discharge holes reliably.

Figure 12A:
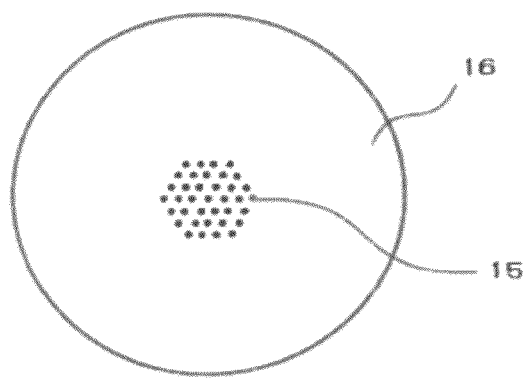
FIG. 12A is an explanatory cross-sectional view for operation mechanism with which liquid droplets are discharged by a liquid droplet-discharging unit.
Figure 12B:
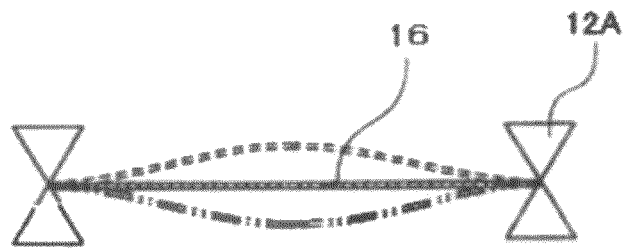
FIG. 12B is an explanatory cross-sectional view for operation mechanism with which liquid droplets are discharged by a liquid droplet-discharging unit.
Figure 13:
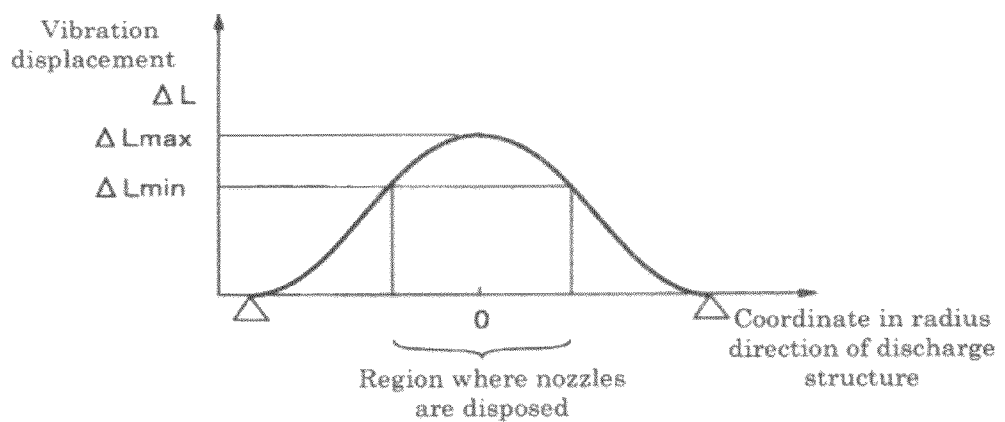
FIG. 13 is a graph referred to for explaining a basic vibration mode.

When the discharge structure 16 which is a simple round-shaped film as shown in FIGS. 12A and 12B is fixed at its peripheral area 12A, a basic vibration occurring upon vibration has a node at the peripheral area. As shown in FIG. 13, the discharge structure 16 has a cross-sectional shape in which vibration displacement $\Delta L$ is maximum ($\Delta Lmax$) at the central portion O (i.e., at the discharge hole located at the central portion of the discharge structure) and vibration displacement ΔL is minimum (ΔLmin) at the outermost discharge holes (i.e., at the discharge holes located at the side of the vibration generator), and the discharge structure 16 is periodically vibrated in a vertical direction. Notably, the discharge holes located at the positions where the minimum vibration displacement (ΔLmax) is obtained are preferably disposed in such a region that liquid droplets discharged therefrom are not hit/attached to the vibration generator.

Figure 14:
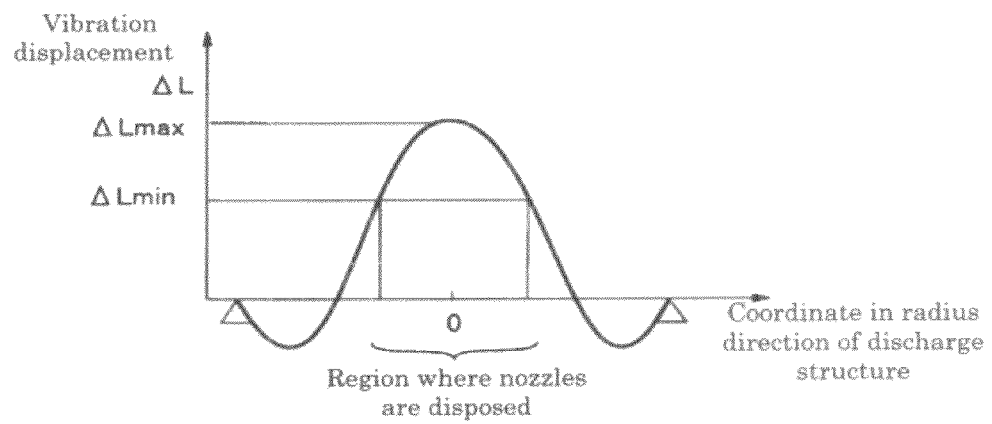
FIG. 14 is a graph referred to for explaining a second-order vibration mode.
Figure 15:
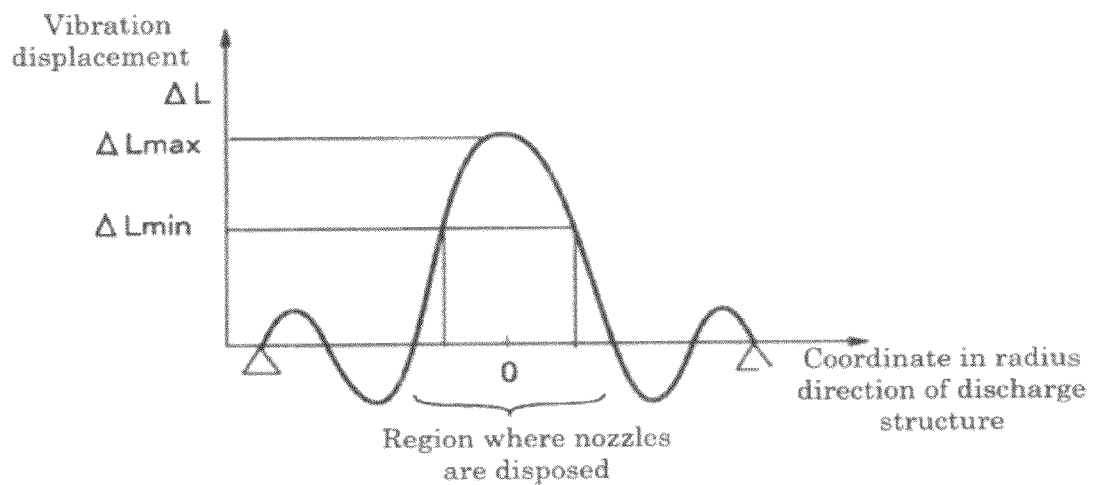
FIG. 15 is a graph referred to for explaining a third-order vibration mode.
Figure 16:
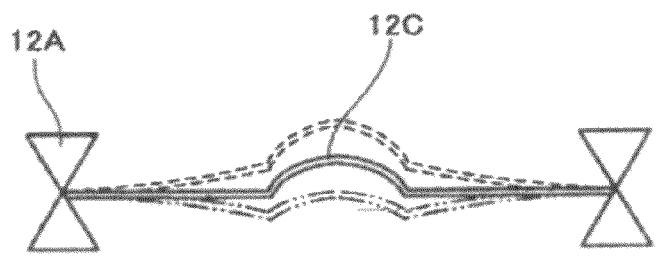
FIG. 16 is an explanatory view of a discharge structure (thin film or nozzle plate) having a convex central portion.

Notably, there have been known higher-order vibration modes such as a second-order vibration mode shown in FIG. 14 and a third-order vibration mode shown in FIG. 15. In these modes, one or more nodes are concentrically formed in the circular film, and this film substantially transforms axisymmetrically. Also, use of the discharge structure 16 having a convex portion 12C at its central portion (shown in FIG. 16) can control the vibration amplitude and the movement direction of the liquid droplets in some degree.

The vibration displacement can be measured with a laser Doppler vibrometer.

When the discharge structure 16 is vibrated, a sound pressure of Pac is applied to the liquid present in the vicinity of the discharge holes formed in the circular film (discharge structure). The sound pressure Pac is proportional to a vibration speed Vm of the discharge structure. The sound pressure is known to arise as a result of reaction of a radiation impedance Zr of a medium (toner composition liquid), and is expressed as a product of the radiation impedance and the vibration speed Vm of the discharge structure, as shown in the following Equation (1).

$$Pac(r,t) = Zr \cdot Vm(r,t) \qquad (1)$$

The vibration speed Vm of the vibration structure periodically varies with time (i.e., is a function of time (t)) and can form various periodic variations (e.g., a sine waveform and a rectangular waveform). Also, the vibration displacement in a vibration direction varies depending on a position in the vibration structure (i.e., the vibration speed Vm is also a function of position in the discharge structure). As mentioned above, the vibration form of the discharge structure used in the present invention is axisymmetric. Thus, the vibration form is substantially a function of a radial coordinate (r).

Upon application of vibration, the toner composition liquid present in each of the discharge holes receives force Fn which is a product of sound pressure Pac(r,t) and cross-sectional area Sn of the discharge hole at the side where the toner composition liquid is supplied. The force Fn is expressed by the following Equation (2).

$$Fn = Pac(r,t) \cdot Sn \qquad \text{Equation (2)}$$

Notably, the sound pressure Pac is not constant over the entire cross-section of the discharge hole at the side where the toner composition liquid is supplied, but the force Fn is approximated as a function of the coordination of the radius (r) with the cross-section being regarded sufficiently small. Also, character n means the number of the discharge hole from the center of the discharge structure; i.e., the nth discharge hole. As is clear from the above Equation (2), the greater the Sn is, the greater the force Fn is and also, the force Fn can be uniform by adjusting the Sn. Actually, the force Fn undergoes local loss and channel loss, and the resultant force obtained through subtraction of them becomes the discharge speed of the toner composition liquid. However, it is possible to adjust the discharge speed in consideration of these pressure losses.

The discharge speed of the toner composition liquid is not particularly limited and may be appropriately selected depending on the intended purpose. It is preferably 8 m/sec to 20 m/sec, more preferably 12 m/sec to 16 m/sec. When the discharge speed thereof is lower than 8 m/sec, the liquid droplets discharged from the discharge holes may aggregate with each other, whereas when the discharge speed thereof exceeds 20 m/sec, a satellite may be formed and also the toner composition liquid may exude from the discharge holes. Here, the satellite is a liquid droplet with a diameter that is ½ the diameter of the liquid droplets mainly formed.

The discharge speed is preferably uniform in all the discharge holes. Thus, the ratio of the discharge speed at the discharge hole where the minimum vibration displacement ΔL (ΔLmin) of the discharge structure is obtained to the discharge speed at the discharge hole where the maximum vibration displacement ΔL (ΔLmax) of the discharge structure is obtained (i.e., the discharge speed at the discharge hole where ΔLmin is obtained/the discharge speed at the discharge hole where ΔLmax is obtained) is preferably 0.5 to 1.0, more preferably 0.8 to 1.0.

The method for measuring the discharge speed is not particularly limited and may be appropriately selected depending on the intended purpose. For example, the state where the toner composition liquid is discharged from the discharge holes can be confirmed by lighting the discharged toner composition dispersion liquid with an LED, photographing the discharged toner composition dispersion liquid with a CCD camera disposed so as to face the LED via the discharged toner composition dispersion liquid, and synchronizing the drive frequency of the LED with the vibration frequency of the liquid droplet-discharging portion (coinciding the timing of the vibration generation by the vibration generator with the timing of the application of voltage to the LED for light emission).

Figure 23A:
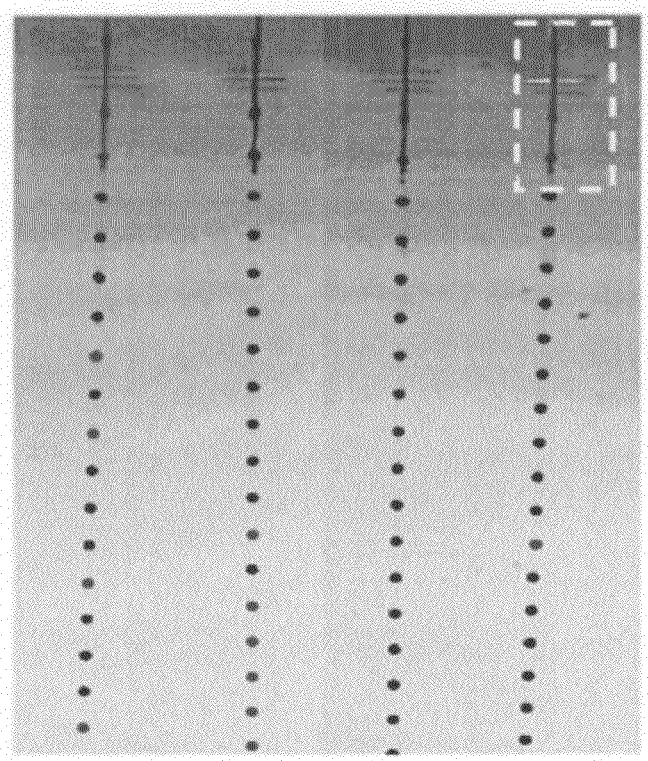
FIG. 23A shows one exemplary state where a toner composition liquid is discharged from discharge holes.
Figure 23B:
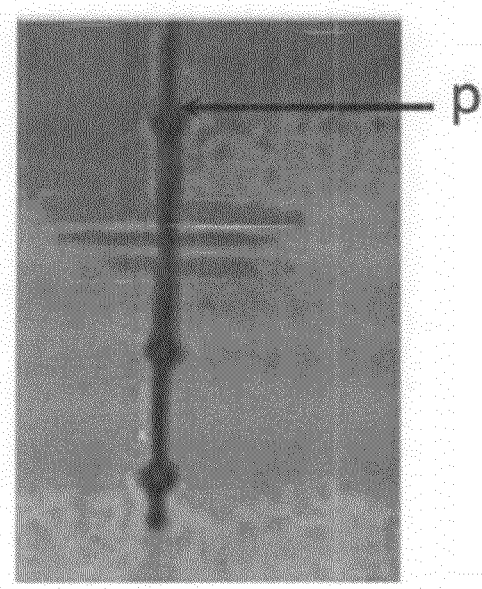
FIG. 23B is an enlarged image of a region surrounded by a dotted line in FIG. 23A.

FIG. 23A shows a state where the toner composition dispersion liquid is discharged from unillustrated discharge holes, and FIG. 23B is an enlarged image of a region surrounded by a dotted line in FIG. 23A. The liquid column of the toner composition dispersion liquid discharged from the discharge hole through application of certain vibration is constricted at regular intervals to form a constriction p (hereinafter may be referred to as "liquid column constriction"). The tip portion of the liquid column is separated into a certain amount of liquid droplets, whereby toner particles having a certain particle diameter are produced continuously (FIG. 23A). Using the constriction p of the discharged liquid column and the vibration frequency, the discharge speed (m/sec) can roughly be calculated from the following equation: discharge speed=constriction wavelength (μm)/vibration frequency (kHz). Here, the "constriction wavelength" refers to the maximum length from the opening of the unillustrated discharge hole to the liquid column constriction p that first appears in the liquid column of the toner composition dispersion liquid discharged from the opening of the discharge hole; i.e., the liquid column constriction p closest to the opening of the discharge hole).

After periodically discharged from the end portions of the discharge holes at the discharge side to the gaseous phase outside the discharge holes, the toner composition liquid becomes spherical attributed to the difference in surface tension between in the gaseous phase and in the discharge holes (liquid phase), whereby the toner composition liquid is periodically discharged in the form of liquid droplets.

The frequency of vibration applied to the discharge structure for enabling the toner composition liquid to be discharged in the form of liquid droplets is not particularly limited and may be appropriately selected depending on the intended purpose. It is generally 20 kHz to 2.0 MHz, preferably 50 kHz to 500 kHz. When the vibration frequency is 20 kHz or higher, dispersibility of fine particles (e.g., pigment and/or wax particles) contained in the toner composition liquid is promoted through excitation of the toner composition liquid.

The sound pressure is not particularly limited and may be appropriately selected depending on the intended purpose. When the sound pressure is 10 kPa or higher, preferably, dispersibility of the fine particles is further promoted. Since satellites are similarly generated when the toner composition liquid has a viscosity of 20 mPa·s or less and a surface tension of 20 mN/m to 75 mN/m, the sound pressure must be 500 kPa or lower. In particular, the sound pressure is preferably 100 kPa or lower.

<<Liquid Column Resonance Type>>

The liquid droplet-forming unit of a liquid column resonance type is the following unit when the below-described discharge structure having a plurality of discharge holes is one wall surface which defines a liquid chamber. Specifically, the liquid column resonance-type liquid droplet-forming unit is configured to form a pressure standing wave through liquid column resonance caused by applying a vibration to the toner composition liquid in the liquid chamber with the below-described vibration generator, to thereby discharge liquid droplets of the toner composition liquid from the discharge holes formed in a region corresponding to an antinode of the pressure standing wave.

The "region corresponding to an antinode of the pressure standing wave" is a region where the amplitude of the pressure standing wave generated through liquid column resonance is large, a change in pressure is large, and a sufficiently large change in pressure to discharge liquid droplets is obtained. The region corresponding to an antinode of the pressure standing wave is not particularly limited and may be appropriately selected depending on the intended purpose. It is preferably a region within a range of ±⅓ wavelength, more preferably within a range of ±¼ wavelength, from a position where the amplitude of the pressure standing wave becomes maximum (a node of a speed standing wave) toward a position where the amplitude of the pressure standing wave becomes minimum.

When the discharge holes are formed in the region corresponding to an antinode of the pressure standing wave, liquid droplets can be discharged from the discharge holes substantially uniformly. In addition, the liquid droplets can efficiently be discharged to involve less clogging of the discharge holes, which is preferred.

—Liquid Chamber—

In the case of the liquid column resonance-type liquid droplet-forming unit, the shape, structure and size of the liquid chamber are not particularly limited and may be appropriately selected depending on the intended purpose. For example, the liquid chamber may have the same shape, structure and size as those of the liquid chamber of the film vibration-type liquid droplet-forming unit.

The material of the liquid chamber may be, for example, the same material as that of the liquid chamber of the film vibration-type liquid droplet-forming unit.

When the liquid droplet-forming unit is of a liquid column resonance type, the liquid chamber (liquid column resonance-generating liquid chamber) is a liquid chamber capable of forming a pressure standing wave with a vibration applied by the vibration generator according to the below-described principle of liquid column resonance phenomenon. The liquid chamber has discharge holes formed in the region corresponding to an antinode of the pressure standing wave and also has a communication hole for supplying the toner composition liquid (at the end portion of the liquid column resonance-generating liquid chamber in the longitudinal direction thereof). If necessary, the liquid chamber has a reflection wall surface (which is perpendicular to the longitudinal direction of the liquid column resonance-generating liquid chamber) at least part of one or both ends of the liquid column resonance-generating liquid chamber in the longitudinal direction thereof.

Here, the "reflection wall surface" refers to a wall surface made of a member that is sufficiently hard to reflect sound waves of liquid, such as a metal member of aluminum or stainless steel or a member of silicone.

Figure 2:
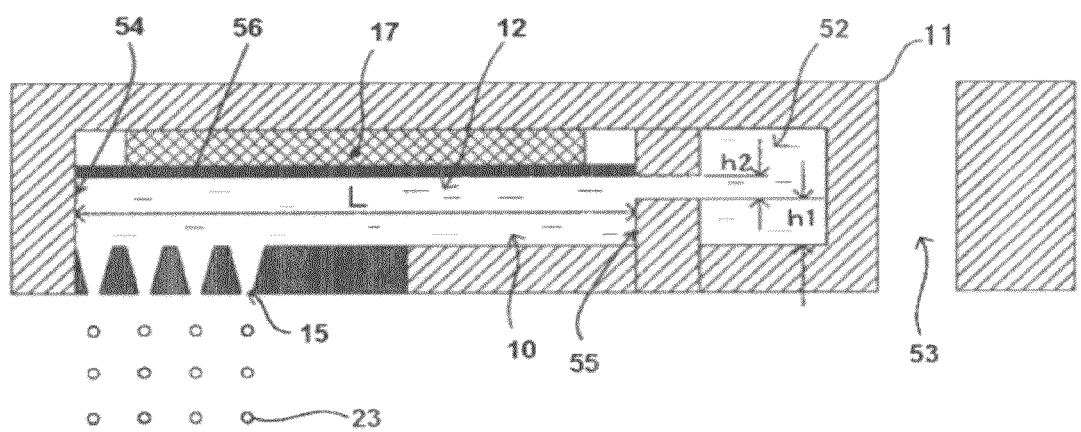
FIG. 2 is a cross-sectional view of one example of the liquid droplet-discharging portion in the liquid droplet-forming unit shown in FIG. 1.
Figure 3:
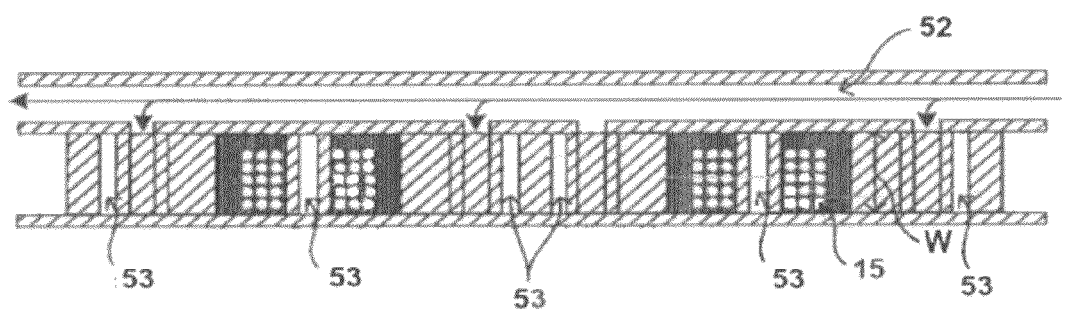
FIG. 3 is a cross-sectional view of the liquid droplet-forming unit shown in FIG. 1 taken along line A-A'.

As shown in FIG. 2, the length L between the wall surfaces at both ends of the liquid column resonance-generating liquid chamber in the longitudinal direction thereof is not particularly limited and may be appropriately selected depending on the intended purpose. It is preferably determined according to the below-described principle of liquid column resonance phenomenon. Also, the width W of the liquid column resonance-generating liquid chamber shown in FIG. 3 is not particularly limited and may be appropriately selected depending on the intended purpose. The width W is preferably smaller than ½ the length L of the liquid column resonance-generating liquid chamber so as not to give unnecessary frequency to liquid column resonance.

The number of the liquid chambers is not particularly limited and may be appropriately selected depending on the intended purpose. When the liquid droplet-forming unit is of a liquid column resonance type, the number of the liquid chambers is preferably 100 to 2,000, more preferably 100 to 1,000 particularly preferably 100 to 400, from the viewpoint of achieving a favorable balance between operability and productivity. Notably, the arrow horizontally extending from right to left in FIG. 3 denotes a direction of the liquid flowing from the circulation pump 100 to the raw material container 6.

—Liquid Droplet-Discharging Portion—

The liquid droplet-discharging portion includes at least the discharge structure and the vibration generator; and, if necessary, further includes other portions. In the liquid droplet-discharging portion, a vibration is applied from the vibration generator to the toner composition liquid, to thereby discharge liquid droplets of the toner composition liquid at a uniform discharge speed from the discharge holes some of which have different shapes from each other.

The liquid droplet-discharging portion is not particularly limited and may be appropriately selected depending on the intended purpose. Preferably, it forms liquid present in the liquid chamber into liquid droplets utilizing resonance phenomenon. In this case, when the resonance frequency of the liquid chamber is overlapped with the resonance frequency of the toner composition liquid, the toner composition liquid cannot receive vibration desirably. Thus, the resonance frequency of the toner composition liquid in the liquid chamber is preferably lower than the resonance frequency of the liquid chamber, since the toner composition liquid in the liquid chamber is uniformly increased in pressure to attain a uniform discharge speed during formation of liquid droplets.

—Discharge Structure—

The discharge structure includes at least a plurality of discharge holes provided for discharging the toner composition liquid, some of which have different shapes from each other; and, if necessary, further includes other portions.

When the liquid droplet-forming unit is of a liquid column resonance type, the discharge structure is one wall surface which defines the liquid column resonance-generating liquid chamber.

The area, thickness and shape of a surface of the discharge structure where the discharge holes are formed (i.e., a surface of the discharge structure having openings of the discharge holes) are not particularly limited and may be appropriately selected depending on the intensity of vibration applied by the vibration generator. For example, they are the same area, thickness and shape as described in the film vibration type.

Also, the material of the discharge structure is not particularly limited and may be appropriately selected depending on the intended purpose. For example, the material thereof is the same material as that of the discharge structure in the film vibration type. In order to form a pressure standing wave in the toner composition liquid in the liquid column resonance-generating liquid chamber according to the below-described principle of liquid column resonance to thereby discharge liquid droplets of the toner composition liquid from the discharge holes provided in the region corresponding to an antinode of the pressure standing wave, the discharge structure is preferably bonded to a frame made of a material having such high rigidity that the material does not affect the resonance frequency of the toner composition liquid. Examples of the material include metals, ceramics and silicone.

The entirety of the exposed surface of the discharge structure may be provided with the below-described insulating liquid repellent film.

The liquid repellent film is not particularly limited and may be appropriately selected depending on the intended purpose. For example, the liquid repellent film may be the same as in the film vibration type.

—Discharge Hole—

A plurality of the discharge holes are formed in the discharge structure. Some of the discharge holes have different shapes from each other.

The number of the discharge holes is not particularly limited and may be appropriately selected depending on the intended purpose. When the liquid droplet-forming unit is of a liquid column resonance type, the number of the discharge holes may be one per liquid column resonance-generating liquid chamber, but two or more of the discharge holes are preferably disposed from the viewpoint of improving productivity. The number of the discharge holes per liquid column resonance-generating liquid chamber is preferably 2 to 100, more preferably 4 to 60, particularly preferably 4 to 20. When the number of the discharge holes per liquid column resonance-generating liquid chamber exceeds 100, the voltage applied to the vibration generator must be set high to form desired liquid droplets of the toner composition liquid from the 100 discharge holes and thus, the behavior of the vibration generator may be unstable. When the number of the discharge holes per liquid column resonance-generating liquid chamber is 4 to 20, the standing wave is stabilized to keep productivity high.

Furthermore, when the liquid droplet-forming unit is of a liquid column resonance type, the number of the discharge holes provided in at least one region corresponding to an antinode of the pressure standing wave is not particularly limited and may be appropriately selected depending on the intended purpose. The number of the discharge holes is preferably 1 to 20, more preferably 4 to 15, particularly preferably 4 to 10. The greater the number of the discharge holes is, the higher the productivity is. When the number of the discharge holes exceeds 20, the discharge holes are excessively densely arranged. As a result, the discharged liquid droplets aggregate with each other to form coarse particles, potentially adversely affecting image quality.

The minimum interval (pitch) of the centers of the discharge holes adjacent to each other or the size of the opening (opening size) of the discharge hole (the end portion of the discharge hole at the side where the liquid droplets are discharged) is not particularly limited and may be appropriately selected depending, for example, on the intended volume of each of the discharged liquid droplets. The pitch and the opening size are preferably the same as those in the film vibration type.

When the liquid droplet-forming unit is of a liquid column resonance type, the positions of the discharge holes in the discharge structure are not particularly limited, so long as they are provided in the region corresponding to the antinode of the pressure standing wave, and may be appropriately selected depending, for example, on the length L between both ends of the liquid column resonance-generating liquid chamber in the longitudinal direction thereof and the width W of the liquid column resonance-generating liquid chamber.

When L denotes the above length between both ends of the liquid column resonance-generating liquid chamber in the longitudinal direction thereof and Le denotes a distance between the end of the liquid column resonance-generating liquid chamber and the center of the discharge hole closest to the end thereof, the ratio Le/L is not particularly limited and may be appropriately selected depending on the intended purpose. It is preferably greater than 0.6.

The shapes of the discharge holes are not particularly limited and may be appropriately selected depending on the intended purpose, so long as some of the discharge holes have different shapes from each other and the toner composition liquid can be discharged uniformly from the discharge holes. Preferably, the discharge holes each have the same shape as in the film vibration type.

—Vibration Generator—

The vibration generator is not particularly limited, so long as it can generate a vibration, and may be appropriately selected depending on the intended purpose. For example, the vibration generator may be the same as in the film vibration type.

When the liquid droplet-forming unit is of a liquid column resonance type, the position of the vibration generator is not particularly limited and may be appropriately selected depending on the intended purpose. The vibration generator is preferably formed at a wall of the liquid column resonance-generating liquid chamber, the wall facing a wall in which the discharge holes are formed (i.e., a surface in the longitudinal direction of the liquid column resonance-generating liquid chamber).

Also, the vibration generator is preferably attached to an elastic plate. The elastic plate is preferably formed as part of the wall of the liquid column resonance chamber so that the vibration generator is not in contact with the liquid.

Furthermore, each of the vibration generators is preferably provided in one liquid column resonance-generating liquid chamber so that they can be controlled individually. Also, each vibration generator such as a block-shaped piezoelectric element is preferably provided via the elastic plate correspondingly to each liquid column resonance-generating liquid chamber, since the liquid column resonance-generating liquid chambers can be controlled individually.

—Liquid Droplet Formation—

Next will be described a mechanism with which the toner composition liquid is periodically discharged as liquid droplets when the liquid column resonance-type liquid droplet-forming unit is used at the liquid droplet-forming step.

When c denotes a sound speed of a toner composition liquid in a liquid column resonance-generating liquid chamber, f denotes a drive frequency applied from a vibration generator to the toner composition liquid (medium) and $\lambda$ denotes a wavelength at which resonance of the liquid is generated, these c, f and λ satisfy the following Equation (3).

$$\lambda = c/f \qquad \text{Equation (3)}$$

FIG. 2 is a cross-sectional view of one example of the liquid droplet-discharging portion. In a liquid column resonance-generating liquid chamber 12 shown in FIG. 2, L denotes a length from an end portion 54 of the frame at the fixed end side thereof to another end portion 55 at the side of a common liquid-feeding path 52, h1 denotes a height of the end portion of the frame at the side of the common liquid-feeding path 52 (h1=about 80 μm) and h2 denotes a height of a communication hole (h2=about 40 μm).

Assuming that the end portion at the side of the common liquid-feeding path 52 is equivalent to a fixed end in a closed state; i.e., in the case where both end portions are regarded as fixed ends, resonance is most efficiently formed when the length L is identical to an even multiple of ¼ the wavelength λ. That is, the length L is expressed by the following Equation (4).

$$L = (N/4)\lambda \qquad \text{Equation (4)}$$

where N denotes an even number.

Notably, "being equivalent to a fixed end" is a case where an end portion can be regarded as having no site from which a pressure is escaped, such as a case where, at an end portion, the height of a reflection wall surface is twice or more greater than that of a communication hole for supplying a toner composition liquid or a case where, at an end portion, the area of a reflection wall surface is twice or more larger than that of a communication hole for supplying a toner composition liquid.

The above Equation (4) is established when both ends are open ends; i.e, both ends are completely open, and when both ends are equivalent to open ends.

Similarly, when one end is equivalent to an open end from which a pressure is escaped and the other end is closed (a fixed end); i.e., in the case where one end is fixed or one end is opened, resonance is most efficiently formed when the length L is identical to an odd multiple of ¼ the wavelength λ. That is, the length L is expressed by the above Equation (4) where N is an odd number. Notably, when both ends are open ends, L is an even multiple of ¼ the wavelength λ. When one end is a fixed end, L is an odd multiple of ¼ the wavelength λ.

Based on the above Equations (3) and (4), the most efficient drive frequency f is calculated from the following Equation (5):

$$f = N \times c/(4L) \qquad \text{Equation (5)}$$

where L denotes a length of a liquid column resonance-generating liquid chamber in the longitudinal direction thereof, c denotes a sound speed of a toner composition liquid and N is an integer.

Therefore, in the toner production method of the present invention, it is preferred that a vibration having a frequency f obtained from the above Equation (5) be applied to the toner composition liquid. Actually, a liquid has a viscosity attenuating a resonance and thus a vibration is not amplified endlessly (Q factor is observed). However, as shown in the following Equations (6) and (7), a resonance is generated even at a frequency close to the most efficient drive frequency f obtained from Equation (5).

FIGS. 18A to G show shapes (resonance modes) of standing waves showing changes in speed and pressure where N is 1, 2, 3, 4 or 5.

Actually, the standing wave is a compressional wave (longitudinal wave); however, it is generally expressed as shown in FIGS. 18A to G. In FIGS. 18A to G, the solid line is a standing wave of speed (distribution of speed) and a dotted line is a standing wave of pressure (distribution of pressure).

Figure 18A:
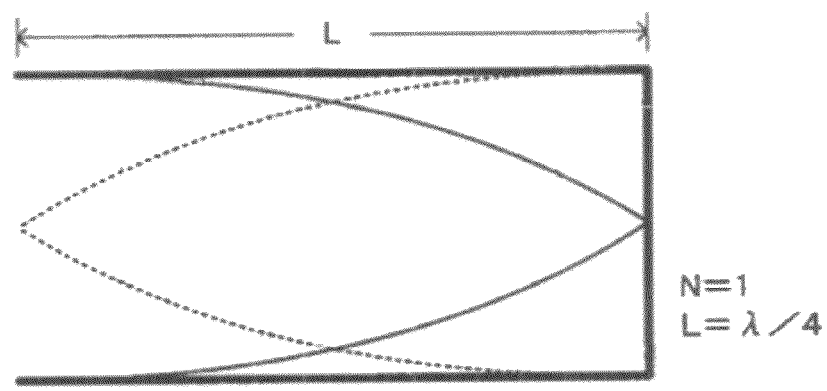
FIG. 18A is an explanatory cross-sectional view of a standing wave showing a change in speed or pressure in a case where one end of a liquid column resonance-generating liquid chamber is a fixed end and N=1.
Figure 18B:
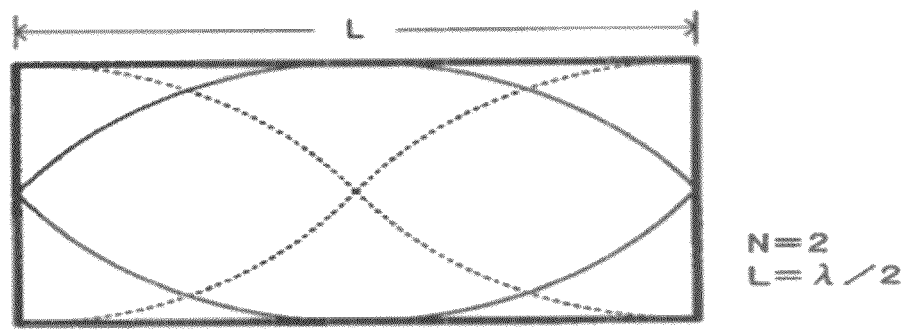
FIG. 18B is an explanatory cross-sectional view of a standing wave showing a change in speed or pressure in a case where both ends of a liquid column resonance-generating liquid chamber are fixed ends and N=2.
Figure 18C:
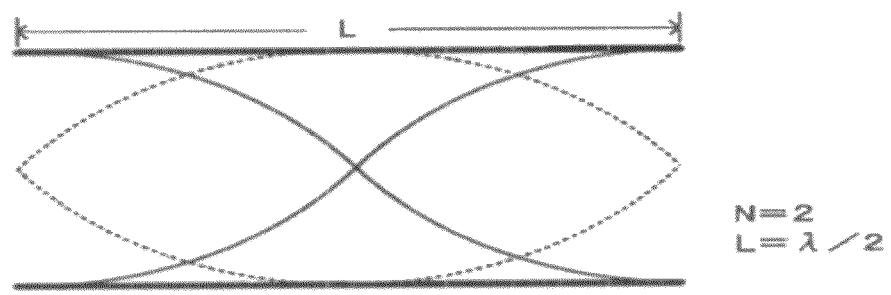
FIG. 18C is an explanatory cross-sectional view of a standing wave showing a change in speed or pressure in a case where both ends of a liquid column resonance-generating liquid chamber are open ends and N=2.
Figure 18D:
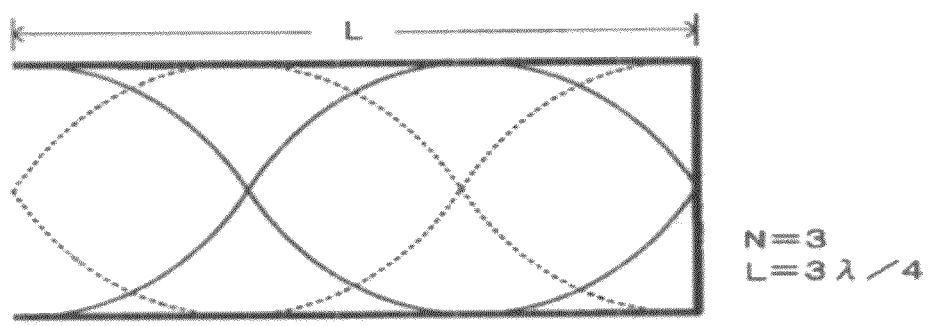
FIG. 18D is an explanatory cross-sectional view of a standing wave showing a change in speed or pressure in a case where one end of a liquid column resonance-generating liquid chamber is a fixed end and N=3.
Figure 18E:
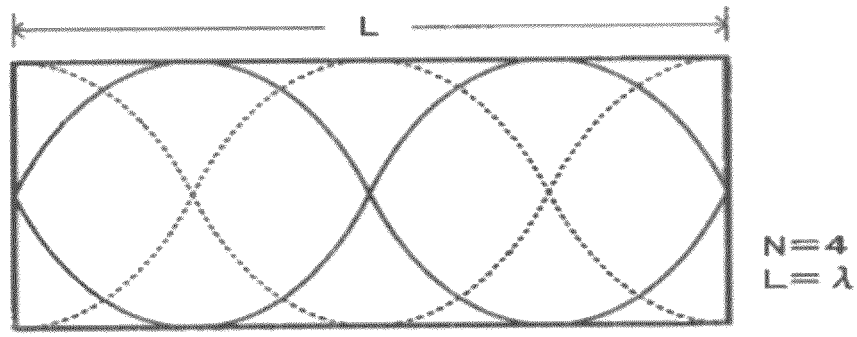
FIG. 18E is an explanatory cross-sectional view of a standing wave showing a change in speed or pressure in a case where both ends of a liquid column resonance-generating liquid chamber are fixed ends and N=4.
Figure 18F:
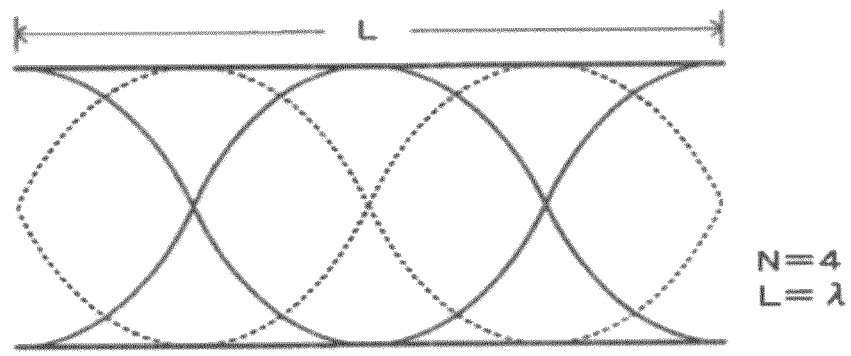
FIG. 18F is an explanatory cross-sectional view of a standing wave showing a change in speed or pressure in a case where both ends of a liquid column resonance-generating liquid chamber are open ends and N=4.
Figure 18G:
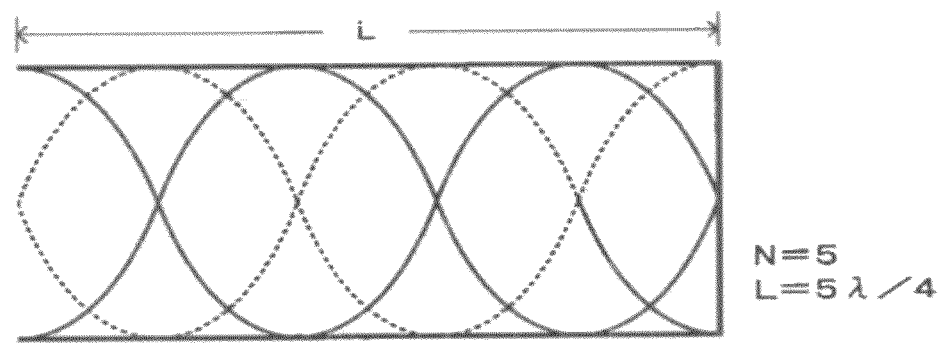
FIG. 18G is an explanatory cross-sectional view of a standing wave showing a change in speed or pressure in a case where both ends of a liquid column resonance-generating liquid chamber are open ends and N=5.

For example, as can be seen from FIG. 18A for a case where one end is fixed and N=1, the amplitude of the distribution of speed becomes zero at the close end while becomes maximum at the open end.

In the case where L denotes a length between both ends of the liquid column resonance-generating liquid chamber in the longitudinal direction thereof and λ denotes a wavelength at which a resonance of the liquid is generated, the standing wave is most efficiently generated with the integer N being 1 to 5. Further, a standing wave differs in pattern depending on whether each end is closed or opened and thus, different patterns are also described. As described below, the conditions at the end portions are determined depending on the state of the opening of discharge holes and the state of the opening through which a liquid is supplied.

Notably, in acoustics, an open end is an end at which the moving speed of a medium (liquid) in the longitudinal direction is zero while the pressure is maximum. Meanwhile, a close end is defined as an end at which the moving speed of a medium becomes zero. Such a closed end is considered as a hard wall in terms of acoustics and reflection of a wave occurs at the close end. When each end is ideally completely closed or opened, standing waves through liquid column resonance are generated in the forms as shown in FIGS. 18A to G as a result of superposition of waves. However, the standing wave varies in pattern depending on the number and position of discharge holes. A resonance frequency appears at a position shifted from a position obtained from the above Equations, but conditions for stable discharging can be established by appropriately adjusting the drive frequency.

For example, under the conditions that a sound speed c of a liquid is 1,200 m/s, a length L of a liquid column resonance-generating liquid chamber is 1.85 mm, wall surfaces are present at both sides and a resonance mode is a mode of N=2 which is completely equivalent to the case where both ends are fixed ends, the most efficient resonance frequency is calculated as 324 kHz from the above Equation (4).

As another example, under the conditions that a sound speed c of a liquid is 1,200 m/s, a length L of a liquid column resonance-generating liquid chamber is 1.85 mm, wall surfaces are present at both sides, and a resonance mode is a mode of N=4 which is equivalent to the case where both ends are fixed ends, the most efficient resonance frequency is calculated as 648 kHz from the above Expression (4). Even using a liquid column resonance-generating liquid chamber having the same configuration, a higher-order resonance can be utilized.

Further, the number of the discharge holes 15, arrangement thereof and cross-sectional shape thereof can also be factors to determine the drive frequency, and the drive frequency can be appropriately determined depending on them.

For example, when the number of the discharge holes 15 is increased, the restriction of the fixed end of the liquid column resonance-generating chamber 12 is gradually loosened. As a result, a resonance standing wave almost the same as the resonance standing wave obtained at an open end occurs and the drive frequency increases. Furthermore, the restriction conditions are loosened starting with the position of the discharge hole 15 present nearest the common liquid-feeding path 52. Also, when the volume of the discharge holes is changed depending on the thickness of the discharge structure, an actually-obtained standing wave has a short wavelength and is higher than the drive frequency employed. Further, when a voltage is applied to the vibration generator at the thus-determined drive frequency, the vibration generator 17 is deformed and a resonance standing wave is most efficiently generated at this drive frequency. Furthermore, even at a frequency close to the drive frequency at which the resonance standing wave is most efficiently generated, a liquid column resonance standing wave is generated. That is, when the vibration generator is effected to vibrate using a drive waveform mainly containing a drive frequency f in a range determined by the following Expressions (6) and (7) on the basis of both lengths of L and Le, to thereby excite liquid column resonance to discharge liquid droplets from discharge holes. Here, L denotes a length between both ends of the liquid column resonance-generating liquid chamber in the longitudinal direction thereof and Le denotes a distance between the end portion 55 at the side of the common liquid-feeding path 52 and the center of the discharge hole 15 closest to the end portion 55.

$$N \times c/(4L) \leq f \leq N \times c/(4Le) \quad \text{Expression (6)}$$

$$N \times c/(4L) \leq f \leq (N+1) \times c/(4Le) \quad \text{Expression (7)}$$

where L denotes a length of a liquid column resonance-generating liquid chamber in the longitudinal direction, Le denotes a distance between an end portion at the side of a liquid-feeding path and the closest discharge hole to the end portion, c denotes a sound speed of a toner composition liquid and N is an integer.

Using the above-described principle of the liquid column resonance phenomenon, a liquid column resonance pressure standing wave is formed in the liquid column resonance-generating chamber 12 shown in FIG. 2, and liquid droplets are continuously discharged from the discharge holes 15 arranged at part of the liquid column resonance-generating chamber 12. Notably, when the discharge holes 15 are preferably arranged at positions where the pressure of the standing wave changes to the greatest extent, since the discharge efficiency is increased and driving with low voltage can be achieved.

Referring to FIGS. 4A to E, next will be described the state of a liquid column resonance phenomenon generated in a liquid column resonance-generating chamber of a liquid droplet-discharging portion.

Notably, in FIGS. 4A to E, the solid line written in a liquid column resonance-generating liquid chamber indicates a speed distribution which is obtained by plotting a speed measured at each measurement position randomly selected from the positions ranging from the fixed end side of the liquid column resonance-generating liquid chamber to the end portion at the side of the common liquid-feeding path. And, the direction from the common liquid-feeding path side toward the liquid column resonance-generating liquid chamber is defined as + (plus) and the reverse direction is defined as − (minus).

In addition, in FIGS. 4A to E, the dotted line written in the liquid column resonance-generating liquid chamber indicates a pressure distribution which is obtained by plotting a pressure measured at each measurement position randomly selected from the positions ranging from the fixed end side of the liquid column resonance-generating liquid chamber to the end portion at the side of the common liquid-feeding path. And, the positive pressure with respect to atmospheric pressure is defined as + (plus), and a negative pressure with respect to atmospheric pressure is defined as − (minus).

When the pressure is a positive pressure, the pressure is applied downward in the figures; whereas when the pressure is a negative pressure, the pressure is applied upward in the figures.

In addition, in FIGS. 4A to E, the liquid column resonance-generating liquid chamber is opened at the side of the common liquid-feeding path 52 as described above. However, since the height (h1 shown in FIG. 2) of the frame serving as the fixed end is preferably about twice or more than the height (h2 shown in FIG. 2) of a communication hole through which the common liquid-feeding path 52 is in communication with the liquid column resonance-generating liquid chamber 12, changes over time of the speed distribution and the pressure distribution are shown under approximate conditions where both ends of the liquid column resonance-generating liquid chamber 12 are substantially fixed ends.

Figure 4A:
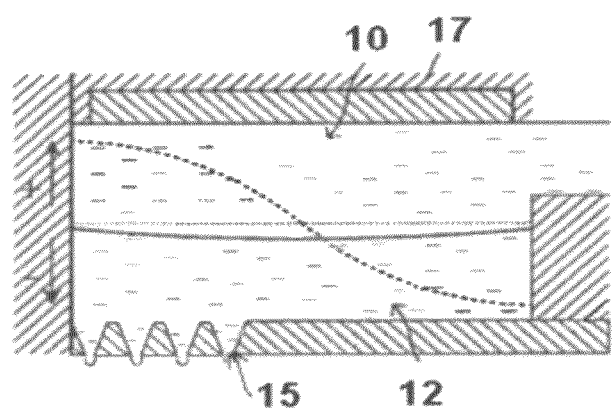
FIG. 4A schematically shows an exemplary liquid column resonance phenomenon in a liquid chamber.
Figure 4B:
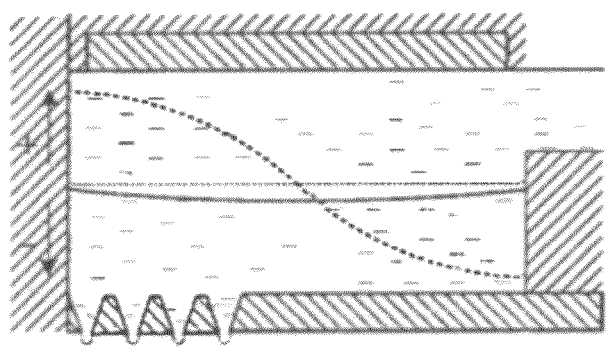
FIG. 4B schematically shows another exemplary liquid column resonance phenomenon in a liquid chamber.
Figure 4C:
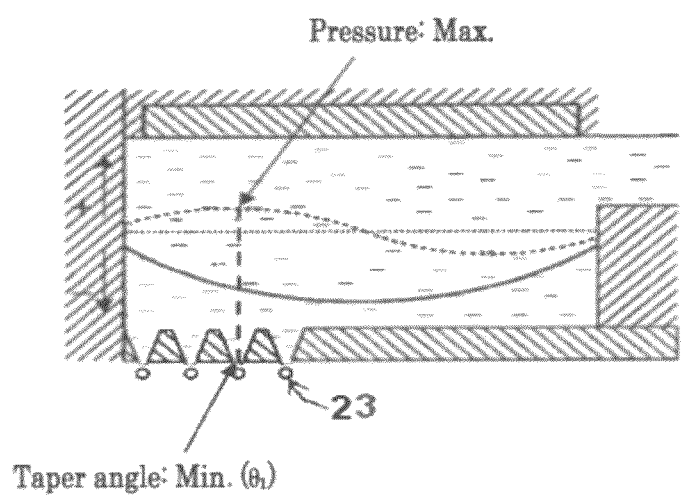
FIG. 4C schematically shows still another exemplary liquid column resonance phenomenon in a liquid chamber.

FIG. 4A shows a pressure waveform and a speed waveform in the liquid column resonance-generating liquid chamber 12 when liquid droplets are discharged. Also, as shown in FIG. 4B, a pressure applied to meniscus increases again when a liquid is fed to the liquid column resonance-generating liquid chamber 12 immediately after discharge of the liquid droplets. As shown in FIGS. 4A and B, a pressure is maximum in a region of the liquid column resonance-generating liquid chamber 12 where the discharge holes 15 are provided. Subsequently, as shown in FIG. 4C, a positive pressure in the vicinity of the discharge holes 15 decreases and transfers toward a negative pressure, whereby the liquid droplets 23 are discharged.

Figure 4D:
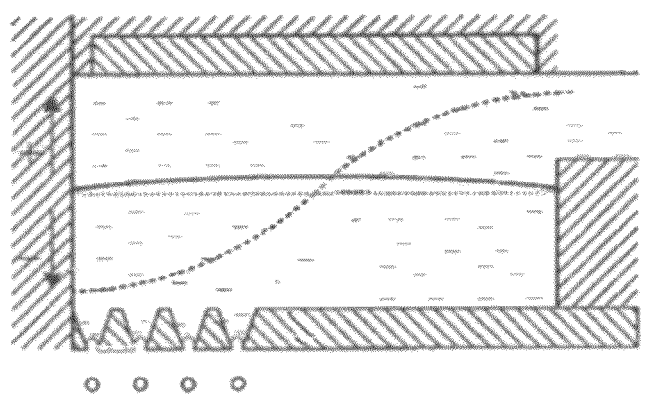
FIG. 4D schematically shows yet another exemplary liquid column resonance phenomenon in a liquid chamber.
Figure 4E:
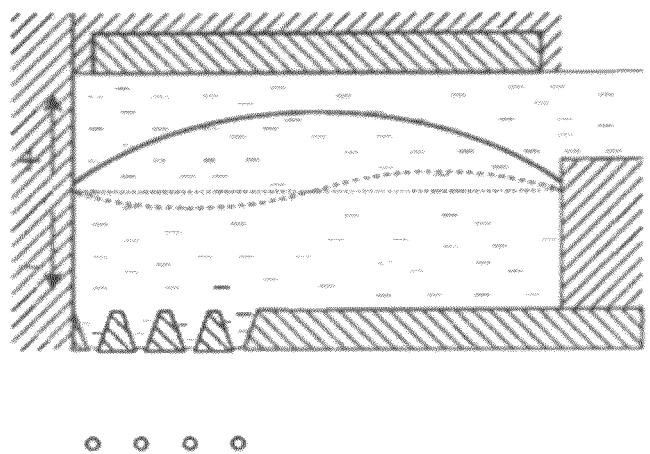
FIG. 4E schematically shows even another exemplary liquid column resonance phenomenon in a liquid chamber.

Further, as shown in FIG. 4D, the pressure in the vicinity of the discharge holes 15 becomes minimum. From this point of time, the liquid column resonance-generating liquid chamber 12 starts to be filled with the toner composition liquid 12. Subsequently, as shown in FIG. 4E, the negative pressure in the vicinity of the discharge holes 15 becomes small and transfers toward a positive pressure. At this point of time, the filling of the toner composition liquid 12 has finished. Then, as shown in FIG. 4A, the positive pressure in a liquid droplet discharge area in the liquid column resonance-generating liquid chamber 12 becomes maximum, and the liquid droplets 23 are discharged from the discharge holes 15. In this manner, in the liquid column resonance-generating liquid chamber, a standing wave through liquid column resonance is generated by a high frequency drive from a vibration generator. And, since the discharge holes 15 are arranged in the region corresponding to an antinode of the standing wave generated through liquid column resonance, which is a region where the pressure changes to the greatest extent, the liquid droplets 23 are continuously discharged from the discharge holes 15 according to the cycle of the antinode.

Notably, the discharge speed in the case of a liquid column resonance type is preferably similar to that in the case of a film vibration type. The discharge speed in the case of a liquid column resonance type can also be measured by the same method as in the case of a film vibration type.

The temperature of the toner composition liquid at the liquid droplet-forming step is not particularly limited and may be appropriately selected depending on the intended purpose. It is preferably −50° C. to 70° C., more preferably 0° C. to 60° C. The temperature of the toner composition liquid at the liquid droplet-forming step is preferably made higher than the temperature of the toner composition liquid at the below-described filtration step, particularly preferably the former temperature is made higher by at least 1° C. than the latter temperature. When the temperature of the toner composition liquid is adjusted in each step, the components dissolved in the toner composition liquid at a saturated state do not precipitate after filtration to prevent coarse particles from being formed. This is because the components dispersed in the toner composition liquid tends to dissolve more at the liquid droplet-forming step, making it difficult to precipitate the toner composition (toner components).

<Steps Prior to Liquid Droplet-Forming Step>

In the present invention, liquid preparation/supply steps such as a toner composition liquid preparation step, aging step and filtration step are performed as steps prior to the liquid droplet-forming step.

<<Toner Composition Liquid Preparation Step>>

The toner composition liquid preparation step is a step of dissolving or dispersing a toner composition in an organic solvent to prepare a toner composition liquid.

The toner composition liquid is prepared by dispersing or dissolving, in an organic solvent, a toner composition containing at least a resin and a colorant; and, if necessary, further containing other components such as a magnetic material, a wax and a flowability improver.

The toner composition may also be a toner composition used for forming conventional electrophotographic toners. Specifically, a toner composition which has been prepared through a process including dissolving a resin in any of various organic solvents, dispersing a colorant therein, and dispersing or dissolving a releasing agent therein, is allowed to be discharged as fine liquid droplets, followed by drying and solidifying, to thereby produce intended toner particles. Also, a liquid which has been prepared through a process including melt-kneading the above materials to prepare a melt-kneaded product and dissolving or dispersing the melt-kneaded product in any of various solvents, is allowed to be discharged as fine liquid droplets, followed by drying and solidifying, to thereby produce intended toner particles.

The viscosity of the toner composition liquid is not particularly limited and may be appropriately selected depending on the intended purpose. It is preferably 0.5 mPa·s to 15 mPa·s, more preferably 0.5 mPa·s to 1.5 mPa·s. When the viscosity exceeds 15 mPa·s, the toner composition liquid cannot be discharged in some cases due to high viscosity resistance.

The viscosity of the toner composition liquid can be measured by, for example, a cone-flat plate-type rotational viscometer.

—Resin—

The resin is not particularly limited and may be appropriately selected depending on the intended purpose. Examples of the resin include vinyl resins made of, for example, a styrene monomer, acryl monomer and methacryl monomer, polyester resins, polyol resins, phenol resins, silicone resins, polyurethane resins, polyaminde resins, furan resins, epoxy resins, xylene resins, terpene resins, coumarone-indene resins, polycarbonate resins and petroleum resins. These may be used alone or in combination.

—Colorant—

The colorant is not particularly limited and may be appropriately selected depending on the intended purpose. Examples of the colorant include carbon black, nigrosine dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazinelake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro anilin red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red F5R, brilliant carmin 6B, pigment scarlet 3B, bordeaux 5B, toluidine Maroon, permanent bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanin blue, phthalocyanin blue, fast sky blue, indanthrene blue (RS and BC), indigo, ultramarine, iron blue, anthraquinon blue, fast violet B, methylviolet lake, cobalt purple, manganese violet, dioxane violet, anthraquinon violet, chrome green, zinc green, chromium oxide, viridian, emerald green, pigment green B, naphthol green B, green gold, acid green lake, malachite green lake, phthalocyanine green, anthraquinon green, titanium oxide, zinc flower, lithopone and mixtures thereof. These colorants may be used alone or in combination.

The amount of the colorant is not particularly limited and may be appropriately selected depending on the intended purpose. The amount of the colorant is preferably 1% by mass to 15% by mass, more preferably 3% by mass to 10% by mass, with respect to the toner.

When the colorant is a pigment, the toner composition liquid preferably contains a pigment-dispersing agent highly compatible with the resin from the viewpoint of satisfactorily dispersing the pigment. Specific examples of commercially available products of the pigment-dispersing agent include "AJISPER PB821" and "AJISPER PB822" (these products are of Ajinomoto Fine Techno Co., Inc.), "Disperbyk-2001" (product of BYK-chemie Co.) and "EFKA-4010" (product of EFKA Co.).

The amount of the dispersing agent with respect to the colorant is not particularly limited and may be appropriately selected depending on the intended purpose. The amount thereof is preferably 1% by mass to 200% by mass, more preferably 5% by mass to 80% by mass, with respect to the colorant. When the amount thereof is less than 1% by mass, the dispersing agent may be decreased in dispersion capability; whereas when the amount thereof exceeds 200% by mass, the formed toner particles may be decreased in chargeability.

The amount of the dispersing agent for dispersing the colorant with respect to the toner is not particularly limited and may be appropriately selected depending on the intended purpose. The amount of the dispersing agent is preferably 0.1% by mass to 10% by mass with respect to the toner. When the amount thereof is less than 0.1% by mass, the dispersibility of the pigment may be insufficient; whereas when the amount thereof exceeds 10% by mass, the formed toner particles may be degraded in chargeability under high-humidity conditions.

The weight average molecular weight of the dispersing agent is not particularly limited and may be appropriately selected depending on the intended purpose. The dispersing agent preferably has a weight average molecular weight as measured through GPC of 500 to 100,000, more preferably 3,000 to 100,000, still more preferably 5,000 to 50,000, particularly preferably 5,000 to 30,000, where the weight average molecular weight is a maximum molecular weight as converted to styrene on a main peak. When the weight average molecular weight thereof is lower than 500, the dispersing agent has high polarity, potentially degrading dispersibility of the colorant. Whereas when the weight average molecular weight thereof is higher than 100,000, the dispersing agent has high affinity to a solvent, potentially degrading dispersibility of the colorant.

The colorant may be mixed with a resin to form a masterbatch. The binder resin which is used for producing a masterbatch or which is kneaded together with a masterbatch is not particularly limited and may be appropriately selected depending on the intended purpose. Examples of the binder resin include modified or unmodified polyester resins; styrene polymers and substituted products thereof (e.g., polystyrenes, poly-p-chlorostyrenes and polyvinyltoluenes); styrene resins (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloro methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers); polymethyl methacrylates; polybutyl methacrylates; polyvinyl chlorides; polyvinyl acetates; polyethylenes; polypropylenes, polyesters; epoxy resins; epoxy polyol resins; polyurethanes; polyamides; polyvinyl butyrals; polyacrylic acid resins; rosin; modified rosin; terpene resins; aliphatic or alicyclic hydrocarbon resins; aromatic petroleum resins; chlorinated paraffins; and paraffin waxes. These may be used alone or in combination.

The acid value of the resin for use in the masterbatch is not particularly limited and may be appropriately selected depending on the intended purpose. It is preferably 30 mgKOH/g or lower, more preferably 20 mgKOH/g or lower. When the acid value is higher than 30 mgKOH/g, chargeability decreases under high-humidity conditions and also dispersibility of the pigment may be insufficient. Notably, the acid value can be measured by the method according to JIS K0070.

The amine value of the resin for use in the masterbatch is not particularly limited and may be appropriately selected depending on the intended purpose. It is preferably 1 to 100, more preferably 10 to 50. When the amine value is lower than 1 or higher than 100, dispersibility of the pigment may be insufficient. Notably, the amine value can be measured by the method according to JIS K7237.

The masterbatch can be prepared by mixing/kneading a colorant with a resin for use in a masterbatch through application of high shearing force. Also, an organic solvent may be used for improving interactions between the colorant and the resin.

Further, the flashing method may be employed for producing the masterbatch. The flashing method is a method in which an aqueous paste containing a colorant is mixed/kneaded with a resin and an organic solvent and then the colorant is transferred to the resin to remove water and the organic solvent. When using the flashing method, a wet cake of the colorant can be directly used; i.e., no drying is required.

In this mixing/kneading, a high-shearing dispersing device (e.g., a three-roll mill) may be used.

The amount of the masterbatch with respect to the amount of the resin separately added is not particularly limited and may be appropriately selected depending on the intended purpose. It is preferably 0.1% by mass to 20% by mass.
—Organic Solvent—

The organic solvent is not particularly limited, so long as it is an organic solvent capable of dispersing or dissolving the resin and colorant, and may be appropriately selected depending on the intended purpose. Examples of the organic solvent include: water; alcohols such as methanol, ethanol, isopropanol, n-butanol and methyl isocarbinol; ketones such as acetone, 2-butanone, ethyl amyl ketone, diacetone alcohol, isohoron and cyclohexanone; amides such as N,N-dimethyl formamide and N,N-dimethyl acetamide; ethers such as diethyl ether, isopropyl ether, tetrahydrofuran, 1,4-dioxane and 3,4-dihydro-2H-pyran; glycol ethers such as 2-methoxy ethanol, 2-ethoxy ethanol, 2-butoxy ethanol and ethylene glycol dimethyl ether; glycol ether acetates such as 2-methoxy ethyl acetate, 2-ethoxy ethyl acetate and 2-butoxy ethyl acetate; esters such as methyl acetate, ethyl acetate, isobutyl acetate, amyl acetate, ethyl lactate and ethylene carbonate; aromatic hydrocarbons such as benzene, toluene and xylene; aliphatic hydrocarbons such as hexane, heptane, iso-octane and cyclohexane; halogenated hydrocarbons such as methylene chloride, 1,2-dichloroethane, dichloropropane and chlorobenzene; sulfoxides such as dimethyl sulfoxide; and pyrrolidones such as N-methyl-2-pyrrolidone and N-octyl-2-pyrrolidone. These may be used alone or in combination.
—Magnetic Material—

The magnetic material is not particularly limited and may be appropriately selected depending on the intended purpose. Examples thereof include $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder and nickel powder. These may be used alone or in combination. Of these, preferred are ferrosoferric oxide fine powder and γ-iron sesquioxide fine powder.

Furthermore, magnetic iron oxides (e.g., magnetite, maghemite and ferrite) containing other elements or mixtures thereof may be used as the magnetic material. The other elements are not particularly limited and may be appropriately selected depending on the intended purpose. Examples of the other elements include lithium, beryllium, boron, magnesium, aluminum, silicon, phosphorus, germanium, zirconium, tin, sulfur, calcium, scandium, titanium, vanadium, chromium, manganese, cobalt, nickel, copper, zinc and gallium. Of these, magnesium, aluminum, silicon, phosphorus and zirconium are preferred.

The other elements may be incorporated in the crystal lattice of an iron oxide, may be incorporated into an iron oxide in the form of oxide, or may be present on the surface of an iron oxide in the form of oxide or hydroxide. Preferably, it is contained in the form of oxide.

Incorporation of the other elements into particles can be performed as follows: salts of the other elements are allowed to coexist during formation of a magnetic material, and then the pH of the reaction system is appropriately adjusted. Alternatively, after formation of magnetic particles, the pH of the reaction system may be adjusted with or without salts of the other elements, to thereby precipitate these elements on the surfaces of the particles.

The amount of the magnetic material used is not particularly limited and may be appropriately selected depending on the intended purpose. It is preferably 10% by mass to 200% by mass, more preferably 20% by mass to 150% by mass, with respect to the resin.

The number average particle diameter of the magnetic material not particularly limited and may be appropriately selected depending on the intended purpose. It is preferably 0.1 μm to 2 μm, more preferably 0.1 μm to 0.5 μm.

The number average particle diameter of the magnetic material can be measured by observing a magnified photograph thereof obtained through transmission electron microscopy using a digitizer or the like.

The magnetic properties of the magnetic material are not particularly limited and may be appropriately selected depending on the intended purpose. Regarding the magnetic properties under application of 10 kOersted, a magnetic material preferably has an anti-magnetic force of 20 Oersted to 150 Oersted, a saturation magnetization of 50 emu/g to 200 emu/g, and a residual magnetization of 2 emu/g to 20 emu/g.

The magnetic material can also be used as a colorant.

—Wax—

The wax is not particularly limited and may be appropriately selected depending on the intended purpose. Examples thereof include aliphatic hydrocarbon waxes (e.g., low-molecular-weight polyethylenes, low-molecular-weight polypropylenes, polyolefin waxes, microcrystalline waxes, paraffin waxes and SAZOLE wax), oxides of aliphatic hydrocarbon waxes (e.g., oxidized polyethylene waxes) and block copolymers thereof, vegetable waxes (e.g., candelilla wax, carnauba wax, Japan wax and jojoba wax), animal waxes (e.g., bees wax, lanolin and spermaceti wax), mineral waxes (e.g., ozokerite, ceresin and petrolatum), waxes containing fatty acid esters as a main component (e.g., montanic acid ester wax and castor wax) and waxes formed by deoxidizing a part or the whole of a fatty acid ester (e.g., deoxidized carnauba wax).

Further examples of the wax, which is not particularly limited and may be appropriately selected depending on the intended purpose, include saturated linear fatty acids (e.g., palmitic acid, stearic acid, montanic acid and other linear alkyl carboxylic acids each containing a linear alkyl group), unsaturated fatty acids (e.g., brassidic acid, eleostearic acid and parinaric acid), saturated alcohols (e.g., stearyl alcohol, eicosyl alcohol, behenyl alcohol, carnaubyl alcohol, ceryl alcohol, melissyl alcohol and other long-chain alkyl alcohols), polyols (e.g., sorbitol), fatty acid amides (e.g., linoleic acid amide, olefin acid amide and lauric acid amide), saturated fatty acid bisamides (e.g., methylenebis capric acid amide, ethylenebis lauric acid amide, and hexamethylenebis stearic acid amide), unsaturated fatty acid amides (e.g., ethylenebis oleic acid amide, hexamethylenebis oleic acid amide, N,N'-dioleyl adipic acid amide and N,N'-dioleyl sebacic acid amide), aromatic biamides (e.g., m-xylenebis stearic acid amide and N,N-distearyl isophthalic acid amide), metal salts of fatty acids (e.g., calcium stearate, calcium laurate, zinc stearate and magnesium stearate), aliphatic hydrocarbon waxes to which a vinyl monomer such as styrene and acrylic acid is grafted, partial ester compounds between a fatty acid such as behenic acid monoglyceride and a polyol, and methyl ester compounds having a hydroxyl group obtained by hydrogenating vegetable fats.

In particular, the following compounds are preferably used: a polyolefin obtained by radical polymerizing an olefin under high pressure; a polyolefin obtained by purifying low-molecular-weight by-products of polymerization reaction of a high-molecular-weight polyolefin; a polyolefin polymerized under low pressure in the presence of a Ziegler catalyst or a metallocene catalyst; a polyolefin polymerized using radiation, electromagnetic wave or light; a low-molecular-weight polyolefin obtained by thermally decomposing a high-molecular-weight polyolefin; paraffin wax; microcrystalline wax; Fischer-Tropsch wax; synthesized hydrocarbon waxes obtained by synthol method, hydrocoal method, or Arge method; synthesized waxes containing a compound having one carbon atom as a monomer unit; hydrocarbon waxes having a functional group such as hydroxyl group and carboxyl group; mixtures of a hydrocarbon wax and that having a functional group; and these waxes to which a vinyl monomer such as styrene, a maleate ester, an acrylate, a methacrylate, or a maleic anhydride is grafted.

The amount of the wax with respect to the resin is not particularly limited and may be appropriately selected depending on the intended purpose. It is preferably 0.2% by mass to 20% by mass, more preferably 0.5% by mass to 10% by mass.

The method for preparing the toner composition liquid is not particularly limited and may be appropriately selected depending on the intended purpose, so long as the toner composition can be dissolved or dispersed in the organic solvent. A method in which the toner composition and the organic solvent are mixed together using a homomixer, beads mill, etc. is preferred since the components in the toner composition can be made sufficiently finer than the opening size of the discharge holes to prevent clogging of the discharge holes.

The colorant and optionally used components in the toner composition may be melt-kneaded together with the resin. Alternatively, these components may be added to the organic solvent at the time when the other components in the toner composition are dissolved or dispersed in the organic solvent.

The solid content of the toner composition liquid is not particularly limited and may be appropriately selected depending on the intended purpose. It is preferably 5% by mass to 40% by mass. When the solid content thereof is lower than 5% by mass, there may be a decrease in productivity. In addition, disperoids of the releasing agent, colorant, etc. tend to precipitate or aggregate, so that the formed toner particles may differ in composition from each other to degrade quality as a toner. When the solid content thereof exceeds 40% by mass, toner particles having a small particle diameter cannot be obtained in some cases.

The toner composition containing a releasing agent, some specific resins (e.g., a crystalline polyester) and other components cannot completely dissolve in the organic solvent in some cases. The components that do not dissolve in the organic solvent are preferably pulverized with a pulverizer such as a beads mill so as to have a particle diameter smaller than the opening size of the discharge holes and then dispersed in the organic solvent or the solution containing the other materials.

In the toner composition liquid, the components that partially dissolve in the organic solvent such as a wax and a crystalline polyester are preferably dispersed in the organic solvent as follows.

a: When preparing dispersion liquids of a releasing agent, colorant, resin, etc., preferably, each of them is pulverized and dispersed at a temperature lower than the temperature at which the dispersion liquids are mixed together, and then stored. When the temperature of each dispersion liquid is higher than the toner composition liquid obtained after mixing of them, the mixed components are highly likely to precipitate to form coarse particles.

b: When preparing a dispersion liquid, the resultant dispersion liquid preferably has a solid content of 10% by mass to 80% by mass. When the solid content of the dispersion liquid is smaller than that of the toner composition liquid obtained by mixing the dispersing liquid with other components, precipitates may be formed due to changes in the solution.

Figure 22:
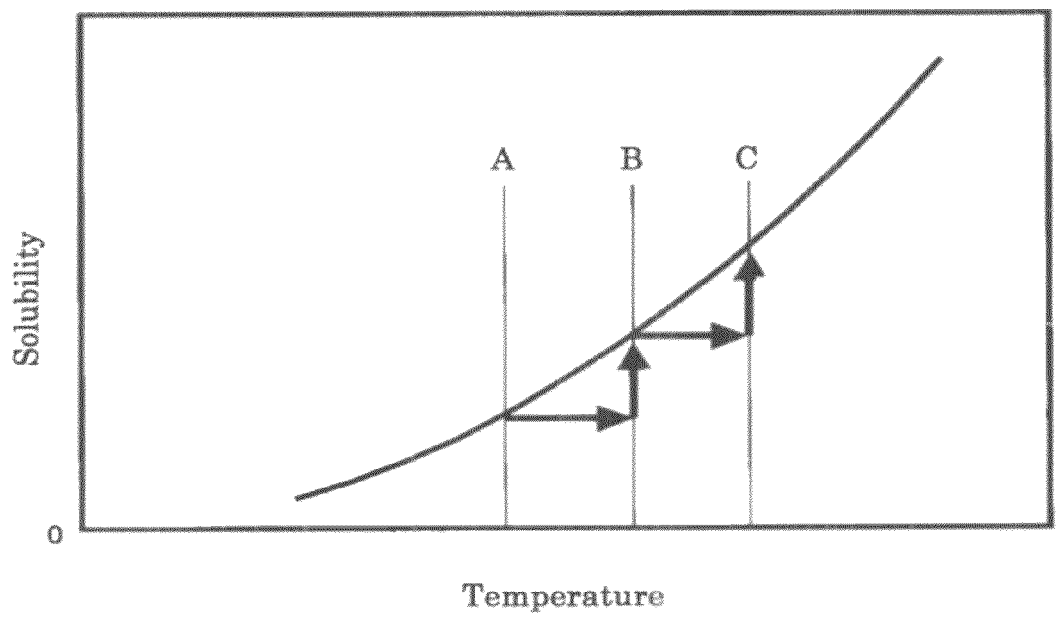
FIG. 22 is an exemplary graph showing that solubility of a toner composition in a toner composition liquid depends on the temperature, where A denotes aging, B denotes filtration, C denotes liquid droplet formation and each arrow denotes a direction in which more components dissolve.

A wax used for the releasing agent, some specific resins such as a crystalline polyester, etc., are partially dissolvable to organic solvents and each have a different solubility depending on the temperature. In general, as shown in FIG. 22, their solubility to an organic solvent increases as the temperature increases. When preparing a toner containing the toner composition in an amount larger than that of the toner composition dissolvable in the organic solvent in each temperature, it is necessary for the toner composition to be dispersed in the toner composition liquid as dispersoids.

The temperature for the toner composition liquid preparation step is not particularly limited and may be appropriately selected depending on the intended purpose. It is preferably −50° C. to 70° C., more preferably −20° C. to 30° C.

<<Aging Step>>

The aging step is a step of storing the toner composition liquid at a constant temperature after the toner composition liquid preparation step. Through the aging step, the unstable toner composition liquid immediately after the toner composition liquid preparation step can be aged so as to be a stable toner composition liquid.

After the toner composition liquid preparation step, various materials (components) are mixed together to change the solubility of the toner composition. Especially when preparing a dispersion liquid where the toner composition partially dissolves in the organic solvent, the toner composition dissolved in the dispersion liquid decreases in solubility, potentially precipitating particles. Also, there may be a case where composite particles of the components precipitate due to the interactions between the components of the toner composition.

The time of storing the toner composition liquid at a constant temperature (aging time) after the toner composition liquid preparation step is not particularly limited and may be appropriately selected depending on the intended purpose. It is preferably 30 min to 30 days, more preferably 2 hours to 7 days. The aging time shorter than 30 min cannot give satisfactory aging effects in some cases. The aging time longer than 30 days is not economical.

The temperature of the toner composition liquid at the aging step is not particularly limited and may be selected depending on the intended purpose. It is preferably −50° C. to 70° C., more preferably −10° C. to 40° C. Also, the temperature of the toner composition liquid at the aging step is preferably made higher than the temperature of the toner composition liquid at the toner composition liquid preparation step, particularly preferably the former temperature is made higher by at least 1° C. than the latter temperature. Even when the temperature of the toner composition liquid at the aging step is lower than the temperature of the toner composition liquid at the toner composition liquid preparation step, the filtration step is provided after the aging step to thereby lower the probability that clogging of the discharge holes occurs. However, when the temperature of the toner composition liquid at the aging step is lower than the temperature of the toner composition liquid at the toner composition liquid preparation step, many components in the toner composition liquid are precipitated at the aging step to form coarse particles which problematically cause clogging of a filter used at the filtration step. In addition, since the precipitated coarse particles are removed at the filtration step, the toner composition liquid at the toner composition liquid preparation step is greatly different in its components from the toner composition liquid after the filtration step. Thus, the temperature of the toner composition liquid at the toner composition liquid preparation step is preferably equal to or lower than that of the toner composition liquid at the aging step.

<Filtration Step and Filtration Unit>

The filtration step is a step of filtrating the toner composition liquid obtained after the toner composition liquid preparation step or the aging step. When the toner composition liquid contains particles having particle diameters larger than the opening size of each discharge hole, clogging of the discharge holes occurs at the liquid droplet-forming step to prevent the toner composition liquid from being discharged. Thus, these particles are preferably removed at the filtration step.

The filtration step can be performed using, for example, a filter. The filter is not particularly limited and a known filter may be suitably used. Examples thereof include a porous membrane filter, a porous plate, nonwoven fabric, nonwoven paper, woven fabric, fired metal wire and woven metal wire. The maximum pore size of the filter is equal to or smaller than the opening size of each discharge hole. It is preferably equal to or smaller than ½ the opening size of the discharge holes, more preferably equal to or smaller than ⅓ the opening size of each discharge hole.

In the toner composition liquid containing the releasing agent dispersed therein, the particle diameter of wax particles dispersed in the toner is preferably as large as possible in order for the wax particles to exhibit satisfactory releasability to the fixing member used for fixing a toner image. Thus, it is not preferred that the pore size of the filter is made smaller than required. It is generally in the range of 0.5 μm to 5 μm.

The temperature of the toner composition liquid at the filtration step is not particularly limited and may be selected depending on the intended purpose. It is preferably −50° C. to 70° C., more preferably −5° C. to 50° C. Also, the temperature of the toner composition liquid at the filtration step is preferably made higher than the temperature of the toner composition liquid at the aging step, particularly preferably the former temperature is made higher by at least 1° C. than the latter temperature. When the temperature of the toner composition liquid at the filtration step is made higher than the temperature of the toner composition liquid at the aging step, the components dispersed or dissolved in the toner composition liquid tend to dissolve more during the course of the filtration, making it difficult for the toner composition (toner components) to precipitate. For the same reason, the temperature of the toner composition liquid at the filtration step is preferably made higher than the temperature of the toner composition liquid at the toner composition liquid preparation step, particularly preferably the former temperature is made higher by at least 1° C. than the latter temperature.

By adjusting the temperature in each step, coarse particles are prevented from being formed to avoid clogging of the discharge holes of the liquid droplet-forming unit, to thereby enable the toner composition liquid to be stably discharged for a long period of time.

Meanwhile, even after a resin or the like have once been dissolved in an organic solvent, solid crystalline resins or gel-like substances may precipitate as time passes. This is likely because specific components are crystallized together to precipitate or specific components are interacted with each other to be in a gelled state. Such precipitates can be formed at the aging step and removed at the filtration step. To prevent formation of precipitates after the filtration step, it is thought to be advantageous that the temperature of the toner composition liquid at the liquid droplet-forming step is made higher than that of the toner composition liquid at the filtration step.

<Particle-Forming Step and Particle-Forming Unit>

The particle-forming step is a step of solidifying the liquid droplets (toner composition liquid) formed at the liquid droplet-forming step to form particles, and is performed by a particle-forming unit. The particle-forming step preferably further includes a step of conveying the liquid droplets discharged at the liquid droplet-forming step with a conveyance gas flow. The conveying step is suitably performed with a conveyance gas flow path.

The conveying step is not particularly limited and may be appropriately selected depending on the intended purpose, so long as it can convey the liquid droplets discharged at the liquid droplet-forming step. At the conveying step, the liquid droplets present within a distance of up to 2 mm from the discharge openings of the discharge holes are preferably conveyed, more preferably the liquid droplets present within a distance of 1.5 mm from the discharging openings of the discharge holes are conveyed, still more preferably the liquid droplets present within a distance of 1.0 mm from the discharging openings of the discharge holes are conveyed, and particularly preferably the liquid droplets present within a distance of 0.5 mm from the discharging openings of the discharge holes are conveyed. The conveyance of the liquid droplets is performed after the liquid droplets have passed through a distance of 2 mm from the discharge openings of the discharge holes, the liquid droplets may aggregate with each other.

The particle-forming unit is a unit configured to solidify the liquid droplets of the toner composition liquid to form particles. The particle-forming unit is not particularly limited, so long as it can form particles, and may be appropriately selected depending on the intended purpose. The particle-forming unit preferably has members such as a drying portion, the conveyance gas flow path and a collecting portion.

<<Drying Portion>>

The drying portion is a member for removing the organic solvent from the liquid droplets by, for example, heating the liquid droplets.

<<Conveyance Gas Flow Path>>

The conveyance gas flow path is a member for allowing a conveyance gas flow to pass therethrough. The conveyance gas flow supplied through the conveyance gas flow path can convey the liquid droplets of the toner composition liquid, or solidified particles thereof, or both of them.

A member for the conveyance gas flow path is not particularly limited and may be appropriately selected depending on the intended purpose, so long as it can allow a conveyance gas flow to pass therethrough. Examples thereof include a shroud (sheath or cover).

The conveyance gas flow path is preferably provided outside the liquid droplet-forming unit, especially around the discharge holes from which liquid droplets are discharged, so as not to prevent the liquid droplets from being discharged from the discharge holes. Notably, in the present invention, the "outside of the liquid droplet-forming unit" means outside of the discharge holes (gaseous phase).

By making a gas flow in the conveyance gas flow path, a conveyance gas flow is supplied around the liquid droplets of the toner composition liquid, or solidified particles thereof, or both of them. The conveyance gas flow increases the speed of a group of discharged liquid droplets of the toner composition liquid, or a group of solidified particles thereof, or both of the groups. Conversely, when the initial discharge speed of the discharged liquid droplets of the toner composition or solidified particles thereof is great, the conveyance gas flow can decrease the speed thereof.

The shape of the conveyance gas flow path is not particularly limited and may be appropriately selected depending on the intended purpose. The conveyance gas flow path may be formed so that the conveyance gas flow flows in a direction parallel to the direction of the initial discharge speed of the liquid droplets discharged by the liquid droplet-forming unit. Alternatively, the conveyance gas flow path may be formed so that the conveyance gas flow flows in such a direction as to change the direction of the discharged liquid droplets.

The direction as to change the direction of the discharged liquid droplets is not particularly limited and may be appropriately selected depending on the intended purpose. Examples thereof include a direction almost perpendicular to the direction of the initial discharge speed of the liquid droplets discharged by the liquid droplet-forming unit.

Of these, the conveyance gas flow path is preferably formed so that the conveyance gas flow flows in such a direction as to change the direction of the discharged liquid droplets, since previously-discharged liquid droplets and subsequently-discharged liquid droplets can have a uniform composition; i.e., monodispersed liquid droplets can be formed. More preferably, the conveyance gas flow path is formed so that the conveyance gas flow flows in a direction almost perpendicular to the direction of the initial discharge speed of the liquid droplets discharged by the liquid droplet-forming unit. Here, as described above in relation to the conveying step, the liquid droplets present within a distance of up to 2 mm from the discharge openings of the discharge holes are particularly preferably conveyed with the conveyance gas flow flowing in a direction almost perpendicular to the direction of the initial discharge speed of the liquid droplets.

As a result, the obtained toner particles contain aggregated products in an extremely small amount, leading to improved productivity such as improved production yield. It is preferred that the particle-forming unit have the conveyance gas flow path, from the viewpoint of efficiently preventing formation of aggregated products due to collision before the discharged liquid droplets of the toner composition liquid are solidified at the drying step.

The gas used for the conveyance gas flow is not particularly limited and may be appropriately selected depending on the intended purpose. Examples thereof include air and inert gas such as nitrogen. It is desired that the temperature of the gas used for the conveyance gas flow can be adjusted and maintained unchanged during production.

The flow speed of the conveyance gas flow is not particularly limited and may be appropriately selected depending, for example, on the discharge speed of the liquid droplets, the opening sizes of the discharge holes, and the angle between the flow direction of the conveyance gas flow and the direction in which the liquid droplets are discharged.

The flow speed thereof can be adjusted by adjusting the pressure of the gas flow with a regulator.

The toner particles dried at the drying portion or by the conveyance gas flow may be secondarily dried. The organic solvent remaining in the toner particles changes over time properties required for a toner such as heat resistance storage stability, fixability and chargeability. In addition, the organic solvent is evaporated during fixing under heating. As a result, users and peripheral devices are highly likely to receive adverse effects. Thus, it is necessary to perform sufficient drying. Secondarily drying is advantageous in that the organic solvent contained in the toner composition liquid can sufficiently be removed.

The method for the secondarily drying is not particularly limited and may be appropriately selected depending on the intended purpose. Examples thereof include a fluidized-bed drying method and a vacuum drying method.

External additives may additionally be added to the toner obtained in this manner.

The external additives are not particularly limited and may be appropriately selected depending on the purposes of aiding flowability, developability, chargeability, etc. Examples thereof include fine inorganic particles and fine polymer particles. Of these, fine inorganic particles are preferred.

The fine inorganic particles are not particularly limited and may be appropriately selected depending on the intended purpose. Examples thereof include silica, alumina, titanium oxide, barium titanate, magnesium titanate, calcium titanate, strontium titanate, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide and silicon nitride.

The primary particle diameter of the fine inorganic particles is not particularly limited and may be appropriately selected depending on the intended purpose. It is preferably 5 nm to 2 μm, more preferably 5 nm to 500 nm.

The specific surface area of the fine inorganic particles measured by the BET method is not particularly limited and may be appropriately selected depending on the intended purpose. It is preferably 20 $m^2/g$ to 500 $m^2/g$.

The amount of the fine inorganic particles added to the toner particles is not particularly limited and may be appropriately selected depending on the intended purpose. It is preferably 0.01% by mass to 5% by mass, more preferably 0.01% by mass to 2% by mass.

The fine polymer particles are not particularly limited and may be appropriately selected depending on the intended purpose. Examples thereof include polystyrenes obtained through, for example, soap-free emulsion polymerization, suspension polymerization or dispersion polymerization; methacrylate copolymers and acrylate copolymers; polycondensates such as silicone, benzoguanamine and Nylon; and polymer particles of thermosetting resins.

By subjecting the external additives to a surface treatment using a surface treatment agent to increase hydrophobicity thereof, it is possible to prevent the external additives themselves from being degraded even under high-humidity conditions.

The surface treatment agent is not particularly limited and may be appropriately selected depending on the intended purpose. Examples of the surface treatment agent include silane coupling agents, silylating agents, fluorinated alkyl group-containing silane coupling agents, organic titanate-containing coupling agents, aluminum-containing coupling agents, silicone oil and modified silicone oil.

The external additives may be added with a commonly-used powder mixer appropriately selected. Examples thereof include, but not limited thereto, a V-form mixer, ROCKING MIXER, LOEDIGE MIXER, NAUTA MIXER and HENSCHEL MIXER. The mixer is preferably equipped with a jacket so as to control the inner temperature thereof. Here, in order to change the history of a load applied to the external additives, the external additives may be added gradually or in the middle of the mixing. Alternatively, the number of revolutions, rolling speed, time, temperature and the like of the mixer may be changed. Furthermore, a strong load and a weak load may be applied to the external additives in this order, and vice versa.

Figure 5:
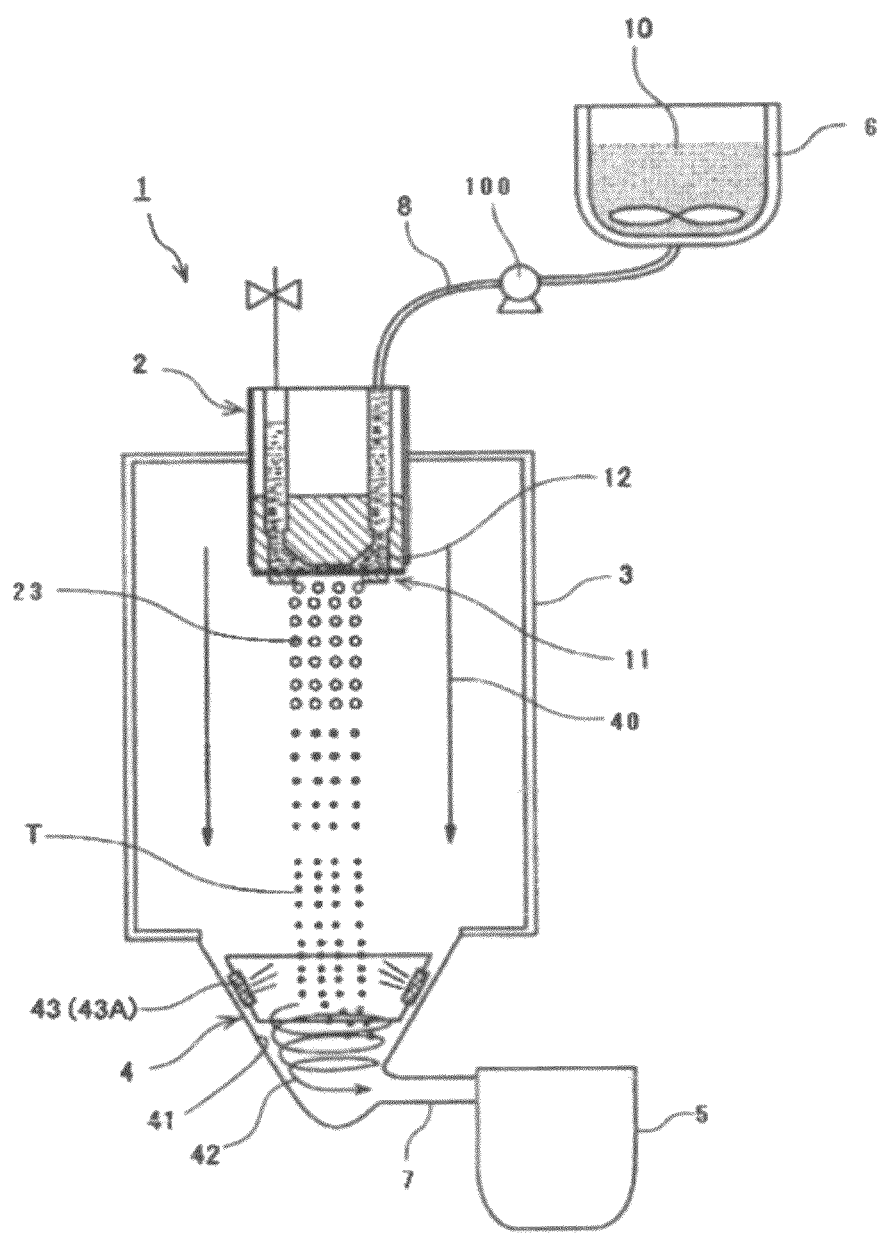
FIG. 5 is a schematic cross-sectional view of one exemplary toner production apparatus according to the present invention.

Next, the toner production apparatus of the present invention will be described with reference to the drawings. FIG. 1 is a schematic cross-sectional view of one exemplary toner production apparatus of the present invention having a liquid droplet-forming unit of a liquid column resonance type. FIG. 5 is a schematic cross-sectional view of one exemplary toner production apparatus of the present invention having a liquid droplet-forming unit of film vibration type.

A toner production apparatus (denoted by reference numeral 1 or 200) includes a liquid droplet-discharging unit 2, a particle forming portion 3 disposed below the liquid droplet-discharging unit 2, a charge-eliminating device 43 (not shown in FIG. 1), a toner collecting portion 4, a toner reservoir 5, a raw material container 6 accommodating a toner composition liquid 10, a liquid feeding tube (pipe) 8 acid a pump 100. In this toner production apparatus, the liquid droplet-discharging unit 2 is configured to periodically discharge the toner composition liquid 10 from a plurality of discharge holes 15 having a uniform opening size to form liquid droplets in a gaseous phase. The particle forming portion 3 serves as a particle-forming unit configured to solidify liquid droplets 23 of the toner composition liquid discharged by the liquid droplet-discharging unit 2 to form toner particles T. The toner collecting portion 4 collects the toner particles T. The charge-eliminating device eliminates charges of the toner particles T formed in the particle forming portion 3. The toner reservoir 5 serves as a toner reserving unit configured to reserve the toner particles T conveyed from the toner collecting portion 4 through a flow path 42 (not shown in FIG. 1) and a tube 7. The liquid-feeding tube (pipe) 8 feeds the toner composition liquid 10 from the raw material container 6 to the liquid droplet-discharging unit 2. The pump 100 is for pressure-feeding the toner composition liquid 10 upon operation of the toner production apparatus.

The toner composition liquid 10 sent from the raw material container 6 is self-supplied to the liquid droplet-discharging unit 2 due to liquid droplet formation performed by the liquid droplet-discharging unit 2. However, as described above, the pump 100 is subsidiarily used for liquid supply during operation of the toner production apparatus. Notably, the toner composition liquid 10 used is a toner composition liquid containing at least a resin and a colorant which are dissolved or dispersed in a solvent. Also, most preferably, a circulating system is established.

—Film Vibration Type—

Referring to FIGS. 6 to 9B, next will be described a liquid droplet-discharging unit including a liquid chamber, a discharge structure and a ring-shaped vibration generator (the case where the liquid droplet-forming unit is of a film vibration type). However, the present invention should not be construed as being limited thereto.

Figure 6:
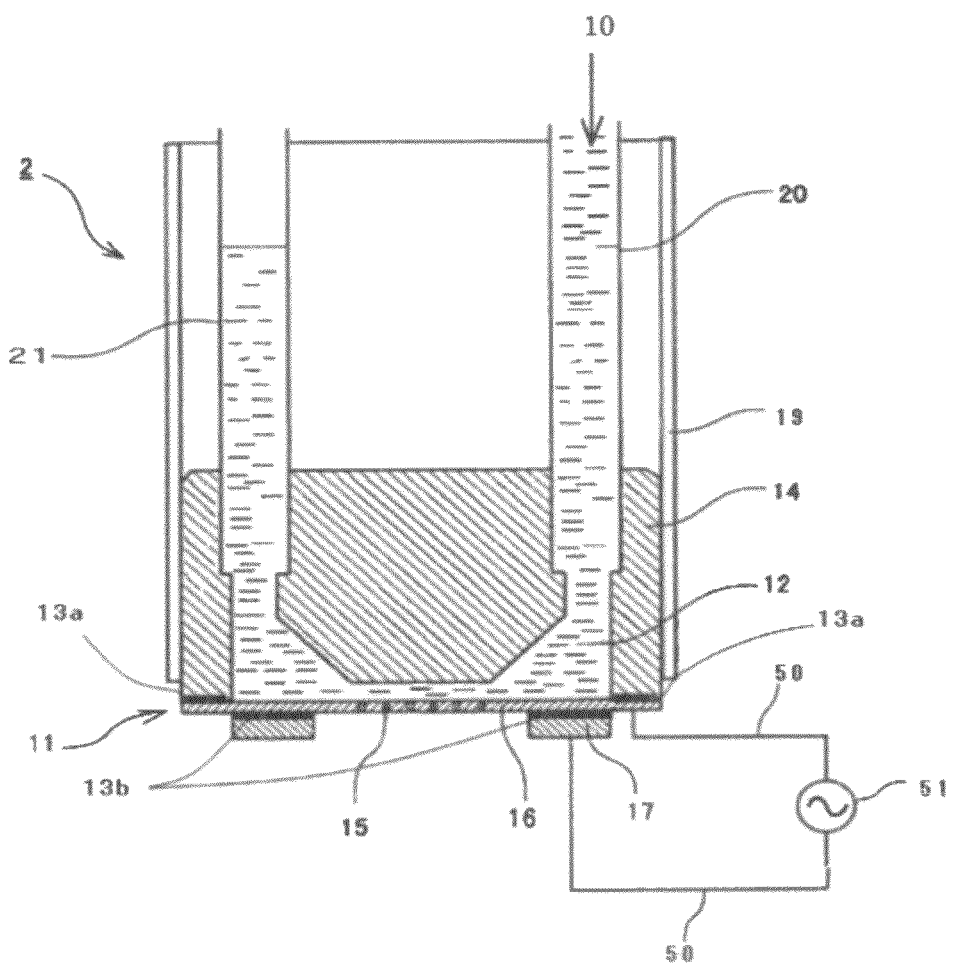
FIG. 6 is an enlarged view of an example of the liquid droplet-discharging unit of the toner production apparatus shown in FIG. 5.
Figure 7:
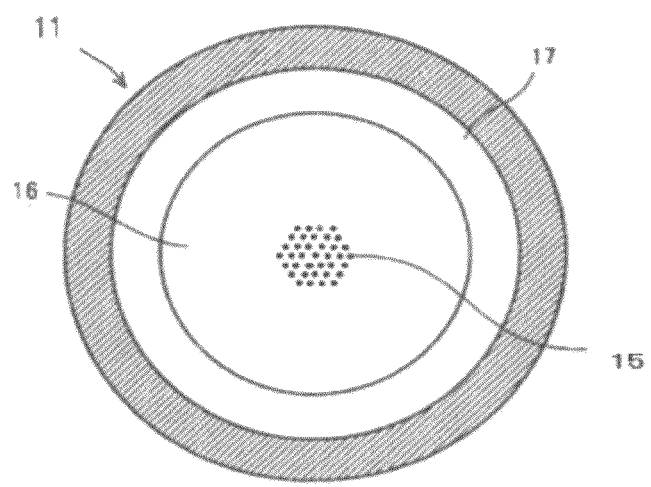
FIG. 7 is a bottom view of the liquid droplet-discharging unit shown in FIG. 6, as viewed from the underside.
Figure 8:
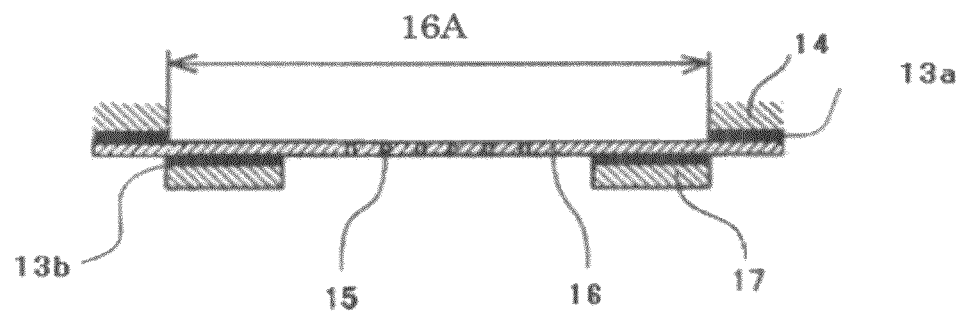
FIG. 8 is an enlarged cross-sectional view of a liquid droplet-discharging portion of a liquid droplet-discharging unit, where reference character 16A denotes a deformable region.

FIG. 6 is an enlarged view of the liquid droplet-discharging unit 2 of the toner production apparatus shown in FIG. 5. FIG. 7 is a bottom view of the liquid droplet-discharging unit 2 shown in FIG. 6, as viewed from the underside. FIG. 8 is an enlarged cross-sectional view of the liquid droplet-discharging portion of the liquid droplet-discharging unit.

The liquid droplet-discharging unit 2 includes a liquid chamber 12, a liquid-feeding tube (liquid-feeding hole) 20, a bubble-discharging tube (discharging hole) 21, a liquid droplet-discharging portion 11 and a frame (liquid chamber member) 14. Here, the liquid-feeding tube 20 feeds the toner composition liquid 10 containing at least a resin and a colorant. The bubble-discharging tube 21 discharges bubbles of the toner composition liquid 10. The liquid droplet-discharging portion 11 discharges the toner composition liquid 10 in the form of liquid droplets. The liquid chamber 12 is formed in the frame 14 and feeds the toner composition liquid 10 to the liquid droplet-discharging portion 11. The liquid droplet-discharging unit 2 is set and held on the top surface 3A of the particle forming portion 3 by a supporting member 19 attached to the frame 14.

The liquid droplet-discharging portion 11 is composed of a discharge structure (thin film, nozzle plate or discharge plate) 16 and a ring-shaped vibration generator (electromechanical transducing unit) 17 which vibrates the discharge structure 16. The discharge structure 16 has a plurality of discharge holes (nozzles or through holes) 15 some of which have different shapes from each other.

The discharge structure 16 is joined/fixed on the frame 14 via a discharge structure bonding portion 13a at the outermost circumference (the shaded region of FIG. 8). The discharge structure 16 is joined/fixed on the vibration generator 17 via a vibration generator bonding portion 13b.

Figure 9A:
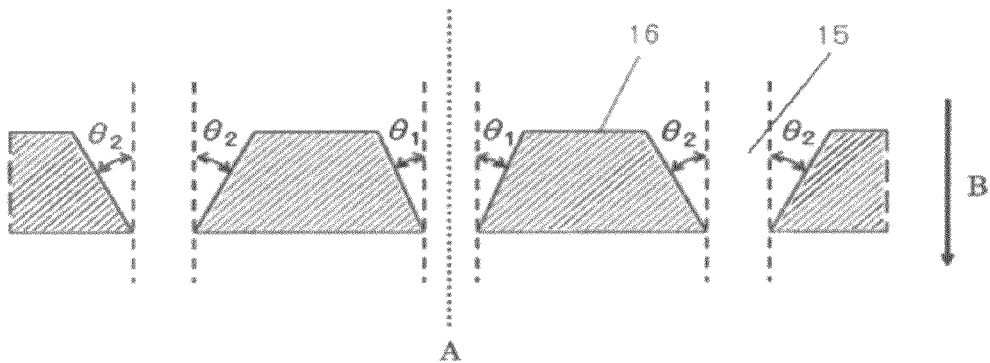
FIG. 9A is an explanatory, schematic cross-sectional view of exemplary shapes of discharge holes for a toner composition to be discharged at a uniform discharge speed, where the dotted line segment A indicates the center of a discharge structure and arrow B denotes a direction in which liquid droplets are discharged.
Figure 9B:
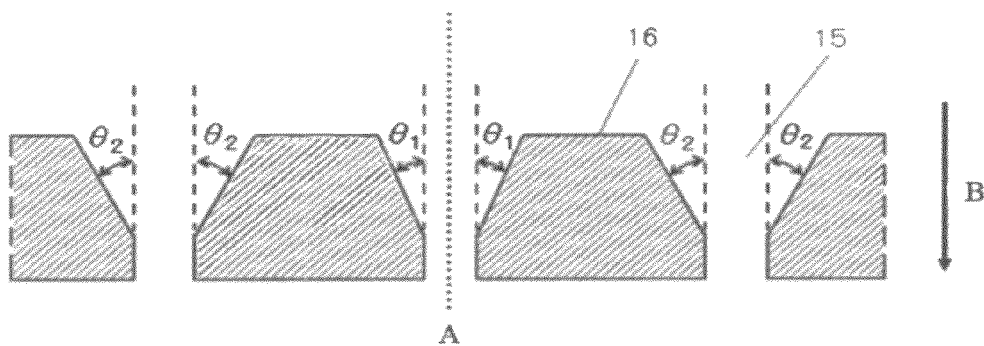
FIG. 9B is an explanatory, schematic cross-sectional view of exemplary shapes of discharge holes for a toner composition to be discharged at a uniform discharge speed, where the dotted line segment A indicates the center of a discharge structure and arrow B denotes a direction in which liquid droplets are discharged.
Figure 9C:
FIG. 9C is an explanatory, schematic cross-sectional view of exemplary shapes of discharge holes for a toner composition to be discharged at a uniform discharge speed, where arrow B denotes a direction in which liquid droplets are discharged.

Here, the shape of the discharge holes 15 may be such a tapered shape as shown in FIG. 9A that the opening size of the discharge hole gradually decreases along the direction in which the toner composition liquid 10 is discharged; such a partially tapered shape as shown in FIG. 9B that the opening size of part of the discharge hole gradually decreases along the direction in which the toner composition liquid 10 is discharged as well as the opening size of the rest of the discharge hole is constant; i.e., the end portion of the discharge hole at the side where the toner composition liquid is discharged has a straight shape; or such a round shape as shown in FIG. 9C that the discharge hole has a curvature radius along the direction in which the toner composition liquid 10 is discharged.

The taper angle and the curvature radius of each of the discharge holes 15 are respectively denoted by "$\theta_n$" and "$R_n$." Here, "n" is an integer and "$\theta_1$" and "$R_1$" denote respectively a taper angle or a curvature radius of the discharge hole 15 located at the center of the discharge structure 16. The "n" preferably increases with distancing from the discharge hole 15 at the center of the discharge structure 16.

The number denoted by "n" is not particularly limited and may be appropriately selected depending, for example, on the area of the discharge structure. The number denoted by "n" is preferably greater. When the number denoted by "n" is great, the discharge holes 15 can be set in taper angle or curvature radius more variably. In this case, liquid droplets can be discharged from the entire discharge holes 15 at a uniform discharge speed, which is preferred.

The plurality of discharge holes are not particularly limited and may be appropriately selected depending on the intended purpose, so long as some of the discharge holes have different shapes from each other. Preferably, the taper angle ($\theta_{n>1}$) or curvature radius ($R_{n>1}$) of the discharge holes located at the vibration generator side is larger than the taper angle ($\theta_1$) or curvature radius ($R_1$) of the discharge hole located at the center of the discharge structure. In other words, preferably, the closer the vibration displacement of the discharge structure 16 is to $\Delta L$min, the greater the taper angle or curvature radius is in the discharge structure 16. For example, when the discharge holes 15 are provided as shown in FIG. 7, the taper angles of the discharge holes (whose positions are denoted by "n") are preferably greater around the discharge hole having $\theta_1$ in the form of concentric regular hexagons. Here, the taper angle may increase continuously or stepwise as the number denoted by "n" becomes greater. The same applies to the curvature radius.

The taper angle is not particularly limited and may be appropriately selected depending, for example, on the area of the discharge structure, the positions of the discharge holes in the discharge structure, and the intensity of the vibration applied by the vibration generator. It is preferably 5° to 60°, more preferably 10° to 30°.

The curvature radius is not particularly limited and may be appropriately selected depending, for example, on the area of the discharge structure, the positions of the discharge holes in the discharge structure, and the intensity of the vibration applied by the vibration generator. It is preferably 40 µm to 100 µm, more preferably 40 µm to 80 µm.

The vibration generator 17 is disposed in a deformable region 16A of the discharge structure 16 (i.e., a region where the discharge structure 16 is not fixed on the frame 14) around a region where the discharge holes 15 are provided. The vibration generator 17 is connected via a lead wire 50 to a drive circuit (drive signal generating source) 51, and when a drive voltage (drive signal) having a required frequency is applied from the drive circuit 51 to the vibration generator, it generates, for example, a deflection vibration.

Figure 10:
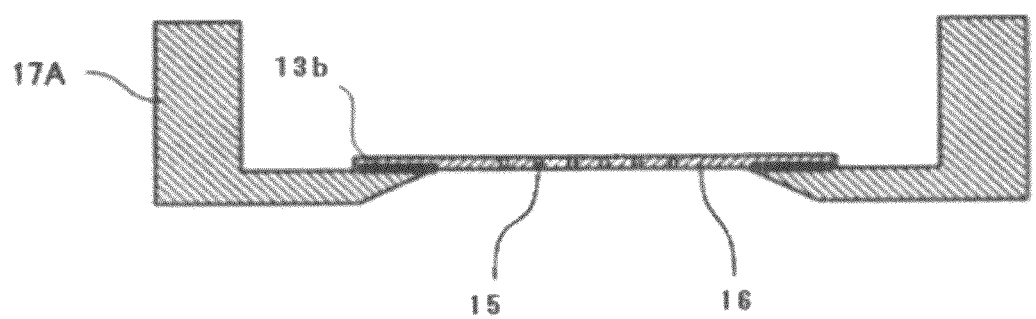
FIG. 10 is an enlarged cross-sectional view of one exemplary conventional liquid droplet-discharging portion.

As described above, the liquid droplet-discharging portion 11 has the ring-shaped vibration generator 17 disposed around a region where the discharge holes 15 are formed, the region being present within the deformable region 16A of the discharge structure 16 having the discharge holes 15 facing the liquid chamber 12. When the liquid droplet-discharging portion 11 has such a configuration, the displacement of the discharge structure 16 is relatively large as compared with, for example, the configuration shown in FIG. 10 where a vibration generator 17A supports the periphery of a discharge structure 16. With this configuration, the plurality of discharge holes 15 can be disposed in a relatively large area (1 mm or greater in diameter) where a large displacement can be obtained and thus, a large number of liquid droplets can be reliably discharged at one time from the discharge holes 15.

Figure 11:
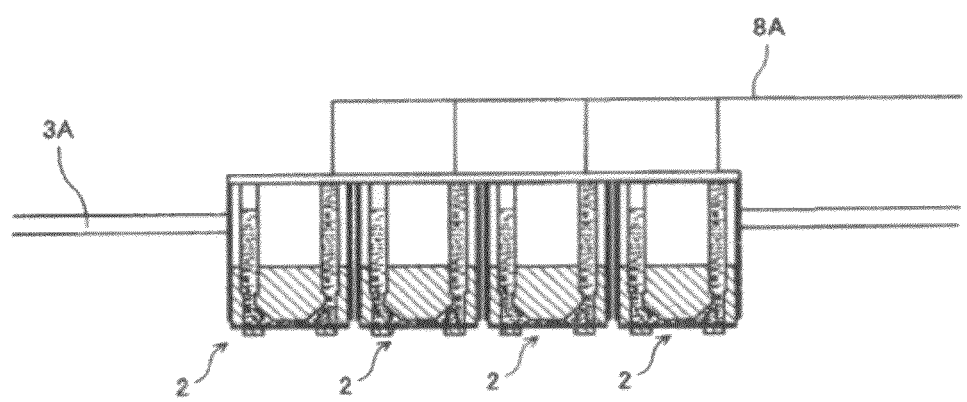
FIG. 11 is a schematic cross-sectional view of an example in which a plurality of liquid droplet-discharging units are disposed.

The toner production apparatus shown in FIG. 5 has one liquid droplet-discharging unit 2. Preferably, as shown in FIG. 11, a plurality of liquid droplet-discharging units 2 are disposed in a row in the top surface 3A of the particle forming portion 3. Particularly preferably, 100 to 1,000 liquid droplet-discharging units 2 are disposed in terms of controllability (in FIG. 11, only four liquid droplet-discharging units are illustrated). In this case, the liquid droplet-discharging units 2 are each connected via a pipe (liquid-feeding tube) 8A to the raw material container 6 (common liquid reservoir) so that the toner composition liquid 10 is supplied to each liquid droplet-discharging unit 2. With this configuration, a larger number of liquid droplets can be discharged at one time, resulting in improving production efficiency.

In FIG. 5, after discharged from the liquid droplet-discharging unit 2, liquid droplets 23 of the toner composition liquid are conveyed downward with gravity force in the particle forming portion 3 and dried and solidified to form toner particles T. Here, the liquid droplets 23 are preferably conveyed with not only the gravity force but also a conveyance gas flow 40 which is generated outside the liquid droplet-discharging unit 2 so as to flow from the upper portion to the lower portion of the particle forming portion 3, from the viewpoint of preventing aggregation between the discharged liquid droplets to form a toner having a higher monodispersibility. The conveyance gas flow thusly generated can prevent the discharged liquid droplets 23 from decreasing in speed due to air resistance. When the liquid droplets 23 are continuously discharged, the following unfavorable phenomenon can be prevented: previously-discharged liquid droplets 23 decrease in speed due to air resistance before drying and are caught up with subsequently-discharged liquid droplets 23 to form aggregated products of the liquid droplets 23, resulting in that the liquid droplets 23 increase in particle diameter.

The dried/solidified toner particles T are charge-eliminated with a charge-eliminating device 43, collected in the toner collecting portion 4, transferred through the flow path 42 and the tube 7 in the flow path-forming member 41, and reserved in the toner reservoir 5.

—Liquid Column Resonance Type—

Referring to FIG. 2, next will be described the case where the liquid droplet-forming unit is of a liquid column resonance type. However, the present invention should not be construed as being limited thereto.

FIG. 2 is an enlarged cross-sectional view of a liquid droplet-discharging portion 11 having the discharge holes 15 of the toner production apparatus shown in FIG. 1. The liquid droplet-discharging portion 11 reserves therein the toner composition liquid 10 containing at least a resin and a colorant. The length L in FIG. 2 is a length from an end portion 54 of the frame at the fixed end side of the liquid chamber 12 to another end portion 55 at the side of a common liquid-feeding path 52. The vibration generator 17 is provided on a wall surface of the liquid droplet-discharging portion 11 with being attached to an elastic plate 56, the wall surface being opposite to a wall surface of the liquid droplet-discharging portion 11 where the discharge holes 15 are provided. Also, the elastic plate 56 is formed as part of the wall of the liquid chamber 12 so that vibration generator 17 is not in contact with the toner composition liquid 10.

Although simplified in FIGS. 2 and 4A to E, the shape of the discharge holes 15 is a tapered shape as shown in FIGS. 9A and 9B.

In the case of the liquid droplet-forming unit of a liquid column resonance type, when the taper angle $\theta_n$ or curvature radius $R_n$ are defined in the same manner as in the liquid droplet-forming unit of film vibration type, $\theta_1$ (n=1) denotes a taper angle of the discharge hole located at the position where the amplitude of the pressure standing wave generated by liquid column resonance becomes maximum. The number denoted by "n" preferably increases with distancing from the discharge hole at the position where the amplitude of the pressure standing wave generated by liquid column resonance becomes maximum.

The number denoted by "n" is not particularly limited and may be appropriately selected depending, for example, on the area of the discharge structure. The number denoted by "n" is preferably greater. When the number denoted by "n" is great, the discharge holes 15 can be set in taper angle or curvature radius more variably. In this case, liquid droplets can be discharged from the entire discharge holes 15 at a uniform discharge speed, which is preferred.

The plurality of discharge holes are not particularly limited and may be appropriately selected depending on the intended purpose, so long as some of the discharge holes have different shapes from each other. Preferably, the taper angle ($\theta_{n>1}$) of the discharge hole located at the position where the amplitude of the pressure standing wave becomes minimum is larger than the taper angle ($\theta_1$) of the discharge hole located at the position corresponding to the antinode of the standing wave generated by liquid column resonance. For example, when the discharge holes 15 are provided as shown in FIG. 4C, the taper angles of the discharge holes 15 (whose positions are denoted by "n") are preferably greater from the discharge hole 15 having a taper angle $\theta_1$ located at the position where the amplitude of the standing wave generated by liquid column resonance becomes maximum (pressure is maximum) both toward the end portion 54 of the frame at the fixed end side and toward the common liquid-feeding path 52. Here, the taper angle may increase continuously or stepwise as the number denoted by "n" becomes greater.

The taper angle is not particularly limited and may be appropriately selected depending, for example, on the area of the discharge structure, the positions of the discharge holes in the discharge structure, and the intensity of the vibration applied by the vibration generator. It is preferably 5° to 60°, more preferably 10° to 30°.

In FIG. 1, after discharged from the liquid droplet-discharging unit 2, liquid droplets 23 of the toner composition liquid are conveyed downward with gravity force in the particle forming portion 3 and dried and solidified to form toner particles T. Here, the liquid droplets 23 are preferably conveyed with not only the gravity force but also a conveyance gas flow 40 from the viewpoint of preventing aggregation between the discharged liquid droplets to form a toner having a higher monodispersibility. The direction of the conveyance gas flow 40 or the conveyance gas flow path is not particularly limited and may be appropriately selected depending on the intended purpose. For example, the direction of the conveyance gas flow 40 or the conveyance gas flow path may be a direction parallel to the direction of the initial discharge speed of the discharged liquid droplets. Alternatively, the conveyance gas flow 40 may be fed in such a direction as to change the direction of the discharged liquid droplets 23.

FIG. 2 is one exemplary view in which the conveyance gas flow path 53 is provided in a direction parallel to the direction of the initial discharge speed of the discharged liquid droplets 23. In this embodiment, the conveyance gas flow 40 goes toward the lower portion of the particle forming portion 3.

Figure 20:
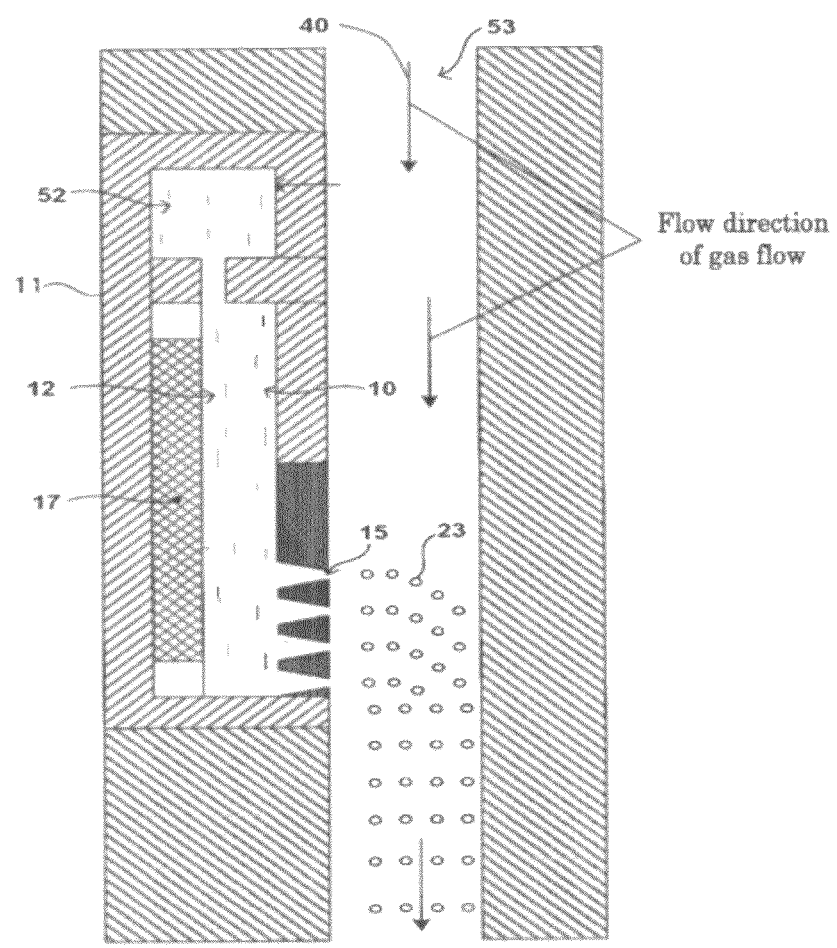
FIG. 20 shows one example of the direction of a conveyance gas flow.

FIG. 20 is one exemplary view in which the conveyance gas flow path 53 is provided in a direction almost perpendicular to the direction of the initial discharge speed of the discharged liquid droplets 23. The conveyance gas flow path 53 in FIG. 20 extends toward a gaseous phase in the particle forming portion 3.

Figure 21:
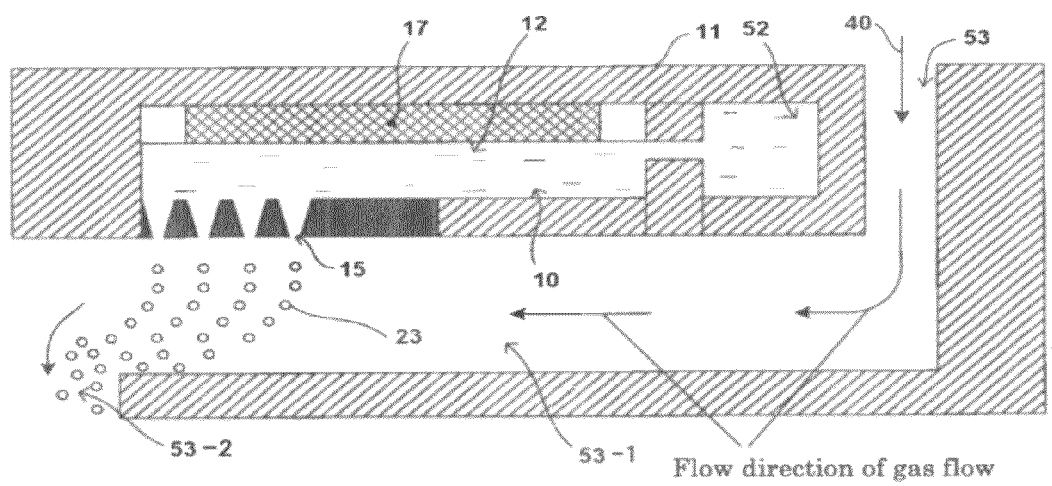
FIG. 21 shows another example of the direction of a conveyance gas flow.

In FIG. 21, the conveyance gas flow path 53 is composed of a first conveyance gas flow path 53-1 and a second conveyance gas flow path 53-2, which is in communication with the first conveyance gas flow path 53-1 and which leads to a gaseous phase of the particle forming portion 3. The first conveyance gas flow path 53-1 extends in a direction almost perpendicular to the direction in which the liquid droplets are discharged. The second conveyance gas flow path 53-2 extends in a direction almost perpendicular to the first conveyance gas flow path 53-1; i.e., in the same direction as the liquid droplets are discharged.

The conveyance gas flow thusly generated can prevent the discharged liquid droplets 23 from decreasing in speed due to air resistance. When the liquid droplets 23 are continuously discharged, the following unfavorable phenomenon can be prevented: previously-discharged liquid droplets 23 decrease in speed due to air resistance before drying and are caught up with subsequently-discharged liquid droplets 23 to form aggregated products of the liquid droplets 23, resulting in that the liquid droplets 23 increase in particle diameter. The dried/solidified toner particles T are collected in the toner collecting portion 4 and reserved in the toner reservoir 5.

<Toner>

A toner produced by the toner production method and apparatus of the present invention including forming the toner composition liquid into liquid droplets and solidifying the liquid droplets of the toner composition liquid to form particles, is advantageous in that it has a monodispersed particle size distribution.

The particle size distribution (weight average particle diameter/number average particle diameter) of the toner particles is not particularly limited and may be appropriately selected depending on the intended purpose. It is preferably 1.00 to 1.15, more preferably 1.00 to 1.07. When the particle size distribution thereof exceeds 1.15, the particles involve large variation therebetween to make chargeability ununiform between the particles, potentially causing abnormal images such as background smear as well as degrading image quality such as granularity.

The weight average particle diameter of the toner particles is not particularly limited and may be appropriately selected depending on the intended purpose. It is preferably 1 μm to 20 μm, more preferably 3 μm to 10 μm. When the weight average particle diameter thereof is less than 1 μm, strongly-charged fine particles increases in amount and firmly adhere to carrier particles to occupy their charging sites, potentially decreasing developability; i.e., causing abnormal images, as well as adsorbing on and adversely affecting the human body.

The method for measuring the particle size distribution of the toner is not particularly limited and may be appropriately selected depending on the intended purpose. Examples thereof include a method in which the particle size distribution is measured with, for example, a flow particle image analyzer.

The toner production method and apparatus of the present invention can discharge liquid droplets at a uniform speed from a plurality of discharge holes at the same time, can discharge a uniform amount of liquid droplets from the discharge holes without aggregating the discharged liquid droplets with each other, and can discharge a larger number of liquid droplets per unit of time. Thus, they can efficiently produce a toner.

The toner obtained by toner production method and apparatus of the present invention has a wide variety of applications and a high monodispersibility and thus, can suitably be used for a developer for developing an electrostatic image in, for example, electrophotography, electrostatic recording and electrostatic printing. This developer is used for all conventional latent electrostatic image bearing members used for electrophotography. In particular, it is suitable to, for example, organic latent electrostatic image bearing members, amorphous-silica latent electrostatic image bearing members, selenium latent electrostatic image bearing members and zinc-oxide latent electrostatic image bearing members.

EXAMPLES

The present invention will next be described in detail by way of Examples, which should not be construed as limiting the present invention thereto.

Example 1

Preparation Step of Toner Composition Liquid

—Preparation of Colorant Dispersion Liquid—

Using a mixer having stirring blades, 17 parts by mass of carbon black (Regal400, product of Cabot Co.), 3 parts by mass of a pigment-dispersing agent (AJISPER PB821, product of Ajinomoto Fine-Techno Co., Ltd.) and 80 parts by mass of ethyl acetate were primarily dispersed. The obtained primary dispersion liquid was secondarily dispersed with DYNO MILL (NPM-PILOT, product of WAB Co.). Then, aggregates having a particle diameter of 5 μm or more were completely removed to prepare a colorant dispersion liquid.

—Preparation of Wax Dispersion Liquid—

Next, using a mixer having stirring blades, 18 parts by mass of carnauba wax, 2 parts by mass of a wax-dispersing agent and 80 parts by mass of ethyl acetate were primarily dispersed. Notably, the wax-dispersing agent used was a polyethylene wax to which a styrene-butyl acrylate copolymer had been grafted. The obtained primary dispersion liquid was heated under stirring to 80° C. to dissolve carnauba wax, followed by cooling to room temperature, to thereby precipitate carnauba wax so that the maximum diameter of the resultant particles became 3 μm or smaller. Furthermore, the resultant mixture was secondarily dispersed with DYNO MILL so that the maximum diameter of the resultant particles became 1 μm or smaller, to thereby prepare a wax dispersion liquid.

—Preparation of Toner Composition Liquid—

Next, using a mixer having stirring blades, 100 parts by mass of a polyester resin serving as a binder resin, 30 parts by mass of the above-prepared colorant dispersion liquid, 30 parts by mass of the above-prepared wax dispersion liquid and 840 parts by mass of ethyl acetate were homogeneously dispersed with stirring for 10 min to prepare a toner composition liquid (dispersion liquid). Notably, the dilution by the solvent did not cause aggregation of the pigment and wax particles.

<Liquid Droplet-Forming Step and Particle-Forming Step>

Next, the obtained toner composition dispersion liquid (500 mL) was supplied to a liquid droplet-discharging portion 11, having a plurality of discharge holes (nozzles) 15, of a toner production apparatus shown in FIG. 5 containing a film vibration-type liquid droplet-forming unit shown in FIG. 6.

The discharge structure (thin film or nozzle plate) 16 used had been produced as follows. Specifically, a nickel plate (outer diameter: 20.0 mm, thickness: 40 μm) was provided with discharge holes 15 through electroformation so that each discharge hole became a truly circular discharge hole having an opening size (diameter) of 10 μm measured at an end of the discharge hole from which the liquid was discharged; i.e., at the side of the gaseous phase.

In the discharge structure, 21 discharge holes were formed in a range having a diameter of 3 mm along the direction parallel to a surface perpendicular to the thickness direction of the discharge structure (a surface having openings of the discharge holes) where this range was around a vertical line (axis) passing through the center of this surface (the center of the discharge structure). The minimum interval of the centers of the discharge holes was adjusted to be about 100 μm (pitch). The rows of the discharge holes were formed symmetrically with respect to the row of the discharge holes located at the center of the discharge structure, like the discharge holes 15 of black circles located in a region surrounded by the square (drawn by the solid line) as shown in FIG. 17.

Figure 17:
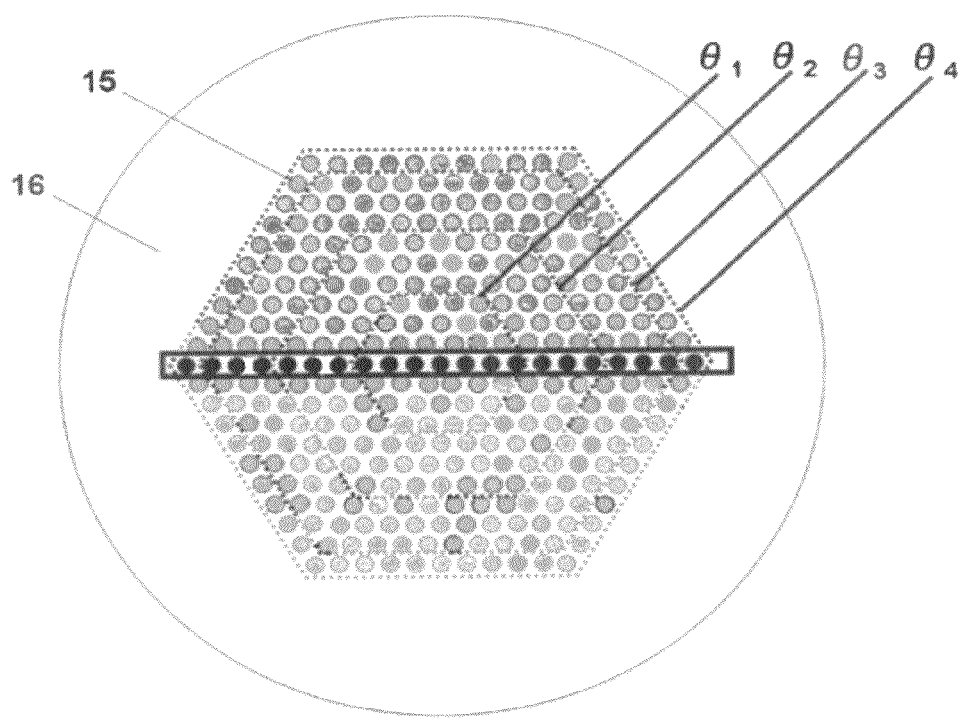
FIG. 17 is a cross-sectional bottom view for explaining taper angles in a discharge structure used in Examples 1 to 3.

Notably, in the present invention, a plurality of discharge holes 15 are preferably formed concentrically to the center of the discharge structure 16 in the form of regular hexagons like the discharge holes 15 of black or gray circles as shown in FIG. 17; however in the Examples, the discharge holes 15 were formed in a row for the sake of convenience in order to make it easy to observe the state where the toner composition liquid was discharged from the discharge holes. In the toner production apparatus of the present invention, since the discharge holes are small and a range where the discharge holes are formed is also small, the discharge holes do not affect the resonance frequency of the toner composition liquid or the propagation of vibration. Therefore, the case where the discharge holes are formed in a row gives substantially the same results as the case where the discharge holes are formed in the form of concentric regular hexagons.

The discharge holes were each formed so as to have a tapered shape where the opening size thereof gradually decreased along the direction in which the toner composition liquid was discharged. Specifically, the discharge hole located at the center of the discharge structure and the first to third discharge holes from this central discharge hole on both sides were each adjusted so as to have a taper angle $\theta_1$ of 13°, the fourth to sixth ones were each adjusted so as to have a taper angle $\theta_2$ of 15°, the seventh to ninth ones were each adjusted so as to have a taper angle $\theta_3$ of 17°, and the tenth ones were each adjusted so as to have a taper angle $\theta_4$ of 19°. Here, the "taper angle" refers to an angle formed between the above-described vertical line (axis) and the side surface of the discharge hole.

Notably, when a plurality of discharge holes 15 are formed concentrically to the center of the discharge structure 16 in the form of regular hexagons, the discharge holes located in each of the regular hexagonal regions surrounded by dotted lines as shown in FIG. 17 have the same taper angle.

Furthermore, a SiO₂ film was formed through RF sputtering on the entire exposed surface of the discharge structure, and then a fluorine-containing compound (OPTOOL, product of DAIKIN INDUSTRIES, Ltd.) was deposited on the SiO₂ film to form a liquid repellent film. The thickness of the liquid repellent film was measured with a non-contact type film thickness meter (ellipsometer, product of Mizojiri Optical Co., Ltd.) and was found to be 50 nm. In addition, the liquid repellent film was measured for contact angle with a contact angle meter (DM500, product of Kyowa Interface Science Co., LTD.) and was found to have a contact angle of 58° with respect to the toner composition dispersion liquid.

A vibration generator 17 shown in FIG. 8 is a lead zirconate titanate (PZT) having an inner diameter of 4 mm, a diameter of 15 mm and a thickness of 2.0 mm. The bonded surface 13b between the vibration generator 17 and the discharge structure 16 and the bonded surface 13a between the discharge structure 16 and a frame 14 made of SUS304 were both formed using an epoxy resin (elastic modulus: $1.3 \times 10^8$ Pa) with heating at 170° C. for 5 min.

After the preparation of the toner composition dispersion liquid, the toner composition dispersion liquid was discharged as liquid droplets under the following toner production conditions, followed by drying and solidifying the liquid droplets at a particle forming portion 3, to thereby produce toner base particles. Notably, in Example 1, there was used an apparatus whose particle forming portion had no conveyance gas flow path.

—Toner Production Conditions—

Specific gravity of toner composition dispersion liquid: $\rho=1.19$ g/cm³

Inner temperature of particle forming portion: 27° C. to 28° C.

Vibration frequency of discharge holes: 125.0 kHz p-p value of Sin wave of voltage applied to PZT: 43.5 V Notably, the "vibration frequency of discharge holes" refers to a vibration frequency of vibration input from an electrical driving device 51 to a vibrating unit 17 shown in FIG. 6.

The state where the toner composition dispersion liquid was discharged was observed by lighting the liquid droplets of the toner composition dispersion liquid with an LED and photographing the liquid droplets with a CCD camera disposed so as to face the LED via the liquid droplets. By synchronizing the drive frequency of the LED with the vibration frequency of the liquid droplet-discharging portion 11, the state where the toner composition liquid was discharged from the discharge holes could be confirmed. As a result, it was found that the toner composition dispersion liquid was discharged from all of the 21 discharge holes.

Using the constriction of the discharged liquid column and the vibration frequency, the discharge speed can roughly be calculated from the following equation: discharge speed (m/sec)=constriction wavelength (μm)/vibration frequency (kHz).

The maximum discharge speed was observed at the sixth discharge holes from the central discharge hole; i.e., 16.5 msec, the minimum discharge speed was observed at the ninth discharge holes from the central discharge hole; i.e., 14.1 m/sec, and the ratio of the minimum discharge speed/maximum discharge speed was 0.85.

The amount of the discharged liquid was found to be 1.35 g/min on the basis of the toner composition dispersion liquid. On the basis of the toner after drying, it was found to be about 0.13 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the below-described manner, and was found to have a weight average particle diameter (D4) of 7.19 μm, and a number average particle diameter (Dn) of 5.8 μm, and a D4/Dn ratio of 1.24.

—Measurement Method for Particle Size Distribution of Toner—

The measurement method using the flow particle image analyzer will be described below.

The particle size distribution of the toner, toner particles or external additives was measured with a flow particle image analyzer (FPIA-2000, product of SYSMEX CORPORATION).

Specifically, water was caused to pass through a filter to remove fine dust so as to contain, per $10^{-3}$ cm³, 20 or smaller particles that had a particle size falling within a measurement range (e.g., a circle-equivalent diameter of 0.60 μm or greater but smaller than 159.21 μm). Then, several drops of a non-ionic surfactant (Contaminon N, product of Wako Pure Chemical Industries, Ltd.) were added to 10 mL of the above-prepared water. In addition, a measurement sample (5 mg) was added to the resultant liquid, followed by dispersing for 1 min with an ultrasonic disperser (UH-50, product of STM Corporation) at 20 kHz and 50 W/10 cm³. Furthermore, the resultant dispersion liquid was dispersed for 5 min in total so as to prepare a sample dispersion liquid containing, per $10^{-3}$ cm³, 4,000 particles to 8,000 particles that had a circle-equivalent diameter falling within a measurement range. The thus-prepared sample dispersion liquid was measured for particle distribution of particles having a circle-equivalent diameter of 0.60 μm or greater but smaller than 159.21 μm.

The sample dispersion liquid was caused to pass through the flow path (extending along the flow direction) of a flat transparent flow cell (thickness: about 200 μm). In order to form an optical path which passes through and intersects with the flow cell in the thickness direction thereof, a stroboscope and a CCD camera are mounted on the flow cell so as to be located at the opposite side to each other. With the sample dispersion liquid flowing, strobe light was applied thereto at an interval of 1/30 sec so as to obtain images of a particle(s) flowing in the flow cell. As a result, each particle was photographed as a two-dimensional image having a certain area parallel to the flow cell. Based on the surface area of each particle in the two-dimensional image, the diameter of a circle having the same surface area was calculated as a circle-equivalent diameter.

The circle-equivalent diameter of 1,200 or more particles can be measured for about 1 min. The number of the particles can be measured based on the measured circle-equivalent diameter. Similarly, the rate (number %) of particles with a predetermined circle-equivalent diameter can be measured. The results (frequency % and cumulative %) can be obtained by dividing a range of 0.06 μm to 400 μm into 226 channels (dividing 1 octave into 30 channels). The actual measurement was performed on particles having a circle-equivalent diameter of 0.60 μm or greater but smaller than 159.21 μm.

<External Treatment>

After the dried/solidified toner base particles had been collected by a cyclone, hydrophobized silica (H2000, product of Clariant Japan K.K.) (1.0% by mass) was externally added to the toner base particles using HENSCHEL MIXER (product of Mitsui Mining Co.), to thereby produce a toner.

<Preparation of Carrier>

A silicone resin serving as a material for forming a coating layer was dispersed in toluene to prepare a coating layer dispersion liquid, and then a core material (spherical ferrite particles having an average particle diameter of 50 μm) was spray-coated with the coating layer dispersion liquid, fired and cooled, to thereby produce a carrier with the coating layer having an average thickness of 0.2 μm.

<Preparation of Developer>

The carrier (96 parts by mass) was mixed with the resultant toner (4 parts by mass) to produce a two-component developer.

Example 2

The procedure of Example 1 was repeated, except that the apparatus used was changed to an apparatus whose particle forming portion had a conveyance gas flow path and that the toner production conditions were changed to the following toner production conditions, to thereby produce a toner and a developer.

—Toner Production Conditions—

Specific gravity of toner composition dispersion liquid: $\rho$=1.19 g/cm$^3$

Flow rate of conveyance gas flow: dry nitrogen gas in apparatus 30.0 L/min

Flow direction of conveyance gas flow: the same direction as the direction of the initial velocity of the discharged liquid droplets Speed of conveyance gas flow: 15 m/sec Inner temperature of particle forming portion: 27° C. to 28° C.

Vibration frequency of discharge holes: 125.0 kHz p-p value of Sin wave of voltage applied to PZT: 43.5 V The state where the toner composition dispersion liquid was discharged was observed using the LED and the CCD camera in the same manner as in Example 1. Similar to Example 1, it was found that the toner composition dispersion liquid was discharged from all of the 21 discharge holes.

The maximum discharge speed was observed at the sixth discharge holes from the central discharge hole; i.e., 16.5 m/sec, the minimum discharge speed was observed at the ninth discharge holes from the central discharge hole; i.e., 14.1 m/sec, and the ratio of the minimum discharge speed/maximum discharge speed was 0.85.

The amount of the discharged liquid was found to be 1.35 g/min on the basis of the toner composition dispersion liquid. On the basis of the toner after drying, it was found to be about 0.13 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the above-described manner, and was found to have a weight average particle diameter (D4) of 5.6 μm, and a number average particle diameter (Dn) of 5.3 μm, and a D4/Dn ratio of 1.06.

Example 3

The procedure of Example 2 was repeated, except that the toner production conditions were changed to the following toner production conditions, to thereby produce a toner and a developer.

—Toner Production Conditions—

Specific gravity of toner composition dispersion liquid: $\rho$=1.19 g/cm$^3$

Flow rate of conveyance gas flow: dry nitrogen gas in apparatus 30.0 L/min

Flow direction of conveyance gas flow: the direction almost perpendicular to the direction of the initial velocity of the discharged liquid droplets Speed of conveyance gas flow: 15 m/sec Inner temperature of particle forming portion: 27° C. to 28° C.

Vibration frequency of discharge holes: 125.0 kHz p-p value of Sin wave of voltage applied to PZT: 37.5 V The state where the toner composition dispersion liquid was discharged was observed using the LED and the CCD camera in the same manner as in Example 1. Similar to Example 1, it was found that the toner composition dispersion liquid was discharged from all of the 21 discharge holes.

The maximum discharge speed was observed at the sixth discharge holes from the central discharge hole; i.e., 16.7 m/sec, the minimum discharge speed was observed at the ninth discharge holes from the central discharge hole; i.e., 14.7 m/sec, and the ratio of the minimum discharge speed/maximum discharge speed was 0.88.

The amount of the discharged liquid was found to be 1.39 g/min on the basis of the toner composition dispersion liquid. On the basis of the toner after drying, it was found to be about 0.13 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.41 μm, and a number average particle diameter (Dn) of 5.2 μm, and a D4/Dn ratio of 1.04.

Example 4

The procedure of example 2 was repeated, except that the shape of the discharge holes and the toner production conditions were changed as follows, to thereby produce a toner and a developer.

The discharge holes were each formed so as to have such a round shape that the opening size thereof decreased along the direction in which the toner composition liquid was discharged. Specifically, the discharge hole located at the center of the discharge structure and the first to third discharge holes from this central discharge hole on both sides were each adjusted so as to have a curvature radius $R_1$ of 80 μm, the fourth to sixth ones were each adjusted so as to have a curvature radius $R_2$ of 60 μm, the seventh to ninth ones were each adjusted so as to have a curvature radius $R_3$ of 45 μm, and the tenth ones were each adjusted so as to have a curvature radius $R_4$ of 40 μm. Here, the "curvature radius" refers to a curvature radius of a round shape curved, in the thickness direction of the discharge structure, from a surface having openings of the discharge holes (i.e., a surface perpendicular to the thickness direction of the discharge structure).

Notably, when a plurality of discharge holes 15 are formed concentrically to the center of the discharge structure 16 in the form of regular hexagons, the discharge holes located in each of the regular hexagonal regions surrounded by dotted lines as shown in FIG. 17 have the same curvature radius.

—Toner Production Conditions—
Specific gravity of toner composition dispersion liquid: $\rho=1.19$ g/cm$^3$
Flow rate of conveyance gas flow: dry nitrogen gas in apparatus 30.0 L/min
Flow direction of conveyance gas flow: the direction almost perpendicular to the direction of the initial velocity of the discharged liquid droplets
Speed of conveyance gas flow: 15 m/sec
Inner temperature of particle forming portion: 27° C. to 28° C.
Vibration frequency of discharge holes: 120.2 kHz
p-p value of Sin wave of voltage applied to PZT: 36.0 V
The state where the toner composition dispersion liquid was discharged was observed using the LED and the CCD camera in the same manner as in Example 1. Similar to Example 1, it was found that the toner composition dispersion liquid was discharged from all of the 21 discharge holes.

The maximum discharge speed was observed at the sixth discharge holes from the central discharge hole; i.e., 14.0 m/sec, the minimum discharge speed was observed at the ninth discharge holes from the central discharge hole; i.e., 12.35 m/sec, and the ratio of the minimum discharge speed/maximum discharge speed was 0.88.

The amount of the discharged liquid was found to be 1.39 g/min on the basis of the toner composition dispersion liquid. On the basis of the toner after drying, it was found to be about 0.12 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.36 μm, and a number average particle diameter (Dn) of 5.1 μm, and a D4/Dn ratio of 1.05.

Comparative Example 1

The procedure of Example 1 was repeated, except that the toner production conditions were changed to the following toner production conditions, to thereby produce a toner and a developer.
—Toner Production Conditions—
Specific gravity of toner composition dispersion liquid: $\rho=1.19$ g/cm$^3$
Inner temperature of particle forming portion: 27° C. to 28° C.
Vibration frequency of discharge holes: 122.4 kHz
p-p value of Sin wave of voltage applied to PZT: 45.0 V
Shape of discharge holes: tapered shape (taper angle: 15° in all the discharge holes)
The state where the toner composition dispersion liquid was discharged was observed using the LED and the CCD camera in the same manner as in Example 1. It was found that, out of the 21 discharge holes, the toner composition dispersion liquid was discharged from 13 discharge holes near the center of the discharge structure. The lengths of constriction wavelengths of the liquid columns discharged were varied with the positions of the discharge holes.

The maximum discharge speed was observed at the central discharge hole; i.e., 21.6 msec, the minimum discharge speed was observed at the sixth discharge holes from the central discharge hole; i.e., 6.3 m/sec, and the ratio of the minimum discharge speed/maximum discharge speed was 0.29.

The amount of the discharged liquid was found to be 0.97 g/min on the basis of the toner composition dispersion liquid. On the basis of the toner after drying, it was found to be about 0.09 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 9.31 μm, and a number average particle diameter (Dn) of 6.7 μm, and a D4/Dn ratio of 1.39.

Comparative Example 2

The procedure of Example 2 was repeated, except that the toner production conditions were changed to the following toner production conditions, to thereby produce a toner and a developer.
—Toner Production Conditions—
Specific gravity of toner composition dispersion liquid: $\rho=1.19$ g/cm$^3$
Flow rate of conveyance gas flow: dry nitrogen gas in apparatus 30.0 L/min
Flow direction of conveyance gas flow: the same direction as the direction of the initial velocity of the discharged liquid droplets
Speed of conveyance gas flow: 15 m/sec
Inner temperature of particle forming portion: 27° C. to 28° C.
Vibration frequency of discharge holes: 122.4 kHz
p-p value of Sin wave of voltage applied to PZT: 46.0 V
Shape of discharge holes: tapered shape (taper angle: 15° in all the discharge holes)
The state where the toner composition dispersion liquid was discharged was observed using the LED and the COD camera in the same manner as in Example 1. It was found that, out of the 21 discharge holes, the toner composition dispersion liquid was discharged from 13 discharge holes near the center of the discharge structure. The lengths of constriction wavelengths of the liquid columns discharged were varied with the positions of the discharge holes.

The maximum discharge speed was observed at the central discharge hole; i.e., 21.6 m/sec, the minimum discharge speed was observed at the sixth discharge holes from the central discharge hole; i.e., 6.3 m/sec, and the ratio of the minimum discharge speed/maximum discharge speed was 0.29.

The amount of the discharged liquid was found to be 0.97 g/min on the basis of the toner composition dispersion liquid. On the basis of the toner after drying, it was found to be about 0.09 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 7.1 μm, and a number average particle diameter (Dn) of 6.0 μm, and a D4/Dn ratio of 1.18.

Comparative Example 3

The procedure of Example 2 was repeated, except that the toner production conditions were changed to the following toner production conditions, to thereby produce a toner and a developer.

—Toner Production Conditions—

Specific gravity of toner composition dispersion liquid: $\rho=1.19$ g/cm$^3$

Flow rate of conveyance gas flow: dry nitrogen gas in apparatus 30.0 L/min

Flow direction of conveyance gas flow: the same direction as the direction of the initial velocity of the discharged liquid droplets Speed of conveyance gas flow: 15 m/sec Inner temperature of particle forming portion: 27° C. to 28° C.

Vibration frequency of discharge holes: 115.9 kHz p-p value of Sin wave of voltage applied to PZT: 37.5 V Shape of discharge holes: round shape (curvature radius: 40 μm in all the discharge holes)

The state where the toner composition dispersion liquid was discharged was observed using the LED and the CCD camera in the same manner as in Example 1. It was found that, out of the 21 discharge holes, the toner composition dispersion liquid was discharged from 15 discharge holes near the center of the discharge structure. The lengths of constriction wavelengths of the liquid columns discharged were varied with the positions of the discharge holes.

The maximum discharge speed was observed at the central discharge hole; i.e., 15.9 msec, the minimum discharge speed was observed at the seventh discharge holes from the central discharge hole; i.e., 7.3 m/sec, and the ratio of the minimum discharge speed/maximum discharge speed was 0.46.

The amount of the discharged liquid was found to be 1.03 g/min on the basis of the toner composition dispersion liquid. On the basis of the toner after drying, it was found to be about 0.10 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 6.8 μm, and a number average particle diameter (Dn) of 5.6 μm, and a D4/Dn ratio of 1.21.

Example 5

Figure 19:
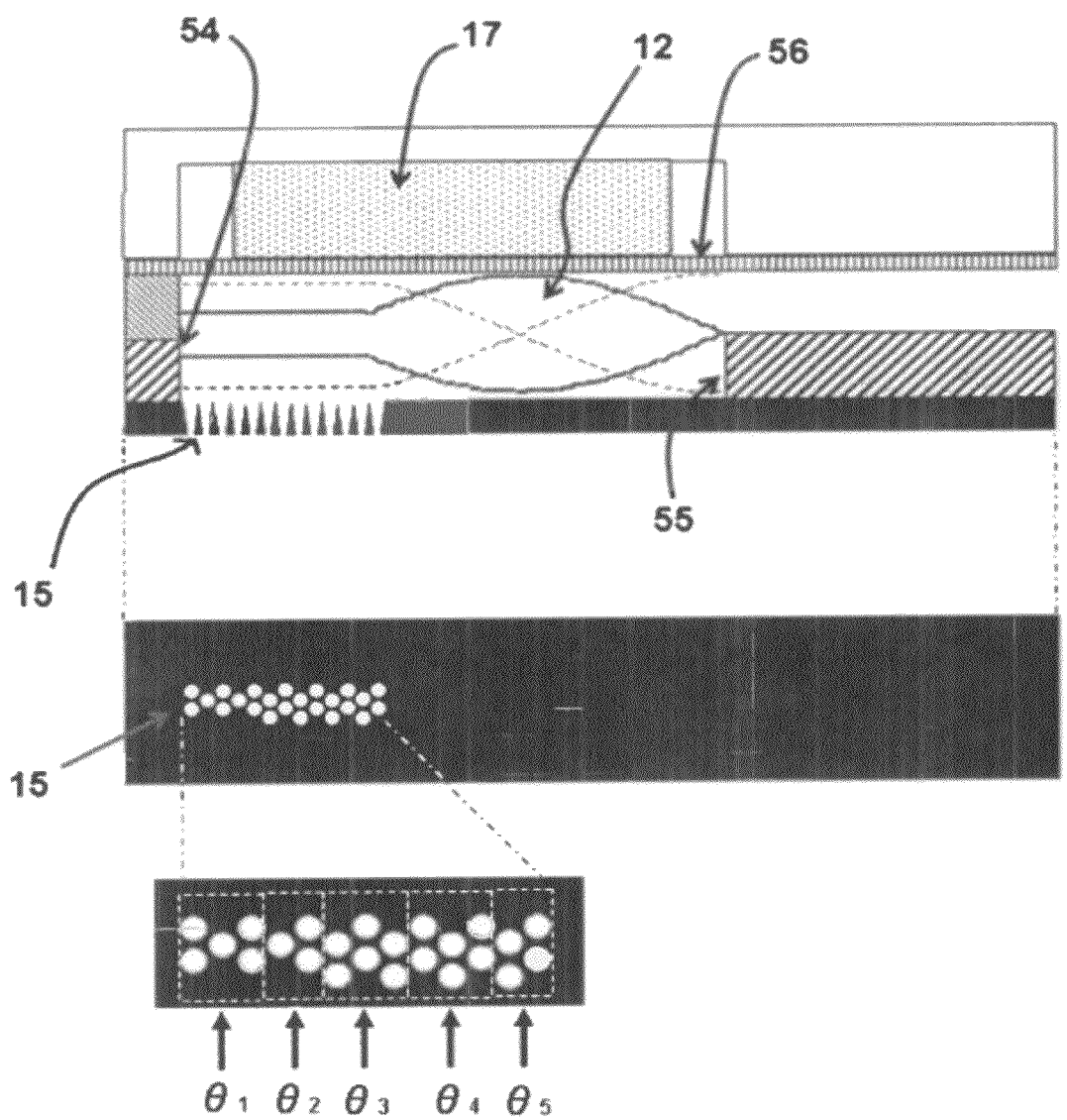
FIG. 19 schematically shows a cross-sectional surface and a bottom surface of a discharge structure used in Examples 4 to 6.

The procedure of Example 1 was repeated, except that the liquid droplet-forming step and the particle-forming step were performed using a toner production apparatus shown in FIG. 1, whose liquid droplet-forming unit was of a liquid column resonance type shown in FIG. 19, to thereby produce a toner and a developer.

FIG. 19 shows the liquid droplet-forming unit used in Example 5, and one exemplary standing wave formed in a liquid column resonance-generating liquid chamber 12 having 24 discharge holes 15 near an end portion 54 of a frame at the side of the fixed end and a reflection wall provided at an end portion 55 at the side of a common liquid-feeding path of the liquid column resonance-generating liquid chamber 12. The discharge holes 15 are provided near the end portion 54, so that the side of the end portion 54 becomes a somewhat loose fixed end. The standing wave formed at the side of the end portion 55 of the common liquid-feeding path can be considered to have a resonance mode of N=2 in the case of a fixed end. Notably, the drive frequency was set to 420 kHz (resonance frequency). In the liquid column resonance-generating liquid chamber 12 shown in FIG. 19, the solid line indicates a speed standing wave and the dotted line indicates a pressure standing wave.

The length L between the wall surfaces of the liquid column resonance-generating liquid chamber 12 at both ends thereof in the longitudinal direction was set to 1.85 mm and the width W of the liquid column resonance-generating liquid chamber (i.e., the length in the perpendicular direction to the length L) was set to 0.12 mm. In the liquid column resonance-generating liquid chamber 12, the frame containing all the wall surfaces other than the wall surface having the discharge holes was formed through stainless punching. The discharge structure having the discharge holes were attached to the frame with a bonding member.

The discharge structure used had been produced as follows. Specifically, a nickel plate (thickness: 40 μm) was provided with discharge holes 15 through electroformation so that each discharge hole became a truly circular discharge hole having an opening size (diameter) of 8.2 μm at its end from which the liquid was discharged; i.e., at the side of the gaseous phase.

As shown in FIG. 19, the 24 discharge holes were formed in a range from the end portion 54 of the frame at the fixed end side of the discharge structure to a distance of 0.6 μm therefrom in the longitudinal direction so that they were arranged in a zig-zag manner to form 13 rows in the longitudinal direction. Here, the minimum interval of the centers of the discharge holes was adjusted to be about 100 μm (pitch).

Notably, in Example 5, since the arrangement of the discharge holes would be likely to affect the resonance frequency of the toner composition liquid and propagation of vibration, the discharge holes were arranged in multiple rows; i.e., 13 rows, in the longitudinal direction of the liquid column resonance-generating liquid chamber as efficient conditions.

The discharge holes were each formed so as to have a tapered shape where the opening size thereof gradually decreased along the direction in which the toner composition liquid was discharged. Specifically, with the discharge holes of the first row being those at the end portion of the frame at the fixed end side (at the side of the end portion 54), the discharge holes of the first to third rows were each adjusted so as to have a taper angle $\theta_1$ of 20°, the discharge holes of the fourth and fifth rows were each adjusted so as to have a taper angle $\theta_2$ of 18°, the discharge holes of the sixth to eighth rows were each adjusted so as to have a taper angle $\theta_3$ of 16°, the discharge holes of the ninth to eleventh rows were each adjusted so as to have a taper angle $\theta_4$ of 14°, and the discharge holes of the twelfth and thirteenth rows were each adjusted so as to have a taper angle $\theta_5$ of 12°. Here, the "taper angle" refers to an angle formed between the above-described vertical line (axis) and the side surface of the discharge hole.

—Toner Production Condition—

Specific gravity of toner composition dispersion liquid: $\rho=1.19$ g/cm$^3$

Inner temperature of particle forming portion: 27° C. to 28° C.

Vibration frequency of discharge holes: 420.0 kHz p-p value of Sin wave of voltage applied to PZT: 15.6 V The state where the toner composition dispersion liquid was discharged was observed using the LED and the CCD camera in the same manner as in Example 1, with the focal point of the CCD camera being slid for observing the discharge holes one row by one row. It was found that the toner composition dispersion liquid was discharged from all of the 24 discharge holes.

The maximum discharge speed was found to be 16.4 m/sec, the minimum discharge speed was found to be 14.7 m/sec, and the ratio of the minimum discharge speed/maximum discharge speed was found to be 0.90.

The amount of the discharged liquid was found to be 4.72 g/min on the basis of the toner composition dispersion liquid. On the basis of the toner after drying, it was found to be about 0.45 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 6.55 μm, and a number average particle diameter (Dn) of 5.5 μm, and a D4/Dn ratio of 1.19.

Example 6

The procedure of Example 5 was repeated, except that the apparatus used was changed to an apparatus whose particle forming portion had a conveyance gas flow path and that the toner production conditions were changed to the following toner production conditions, to thereby produce a toner and a developer.
—Toner Production Conditions—
Specific gravity of toner composition dispersion liquid: $\rho$=1.19 g/cm$^3$
Flow rate of conveyance gas flow: dry nitrogen gas in apparatus 30.0 L/min
Flow direction of conveyance gas flow: the same direction as the direction of the initial velocity of the discharged liquid droplets
Speed of conveyance gas flow: 15 msec
Inner temperature of particle forming portion: 27° C. to 28° C.
Vibration frequency of discharge holes: 420.0 kHz
p-p value of Sin wave of voltage applied to PZT: 15.6 V
The state where the toner composition dispersion liquid was discharged was observed using the LED and the CCD camera in the same manner as in Example 1, with the focal point of the CCD camera being slid for observing the discharge holes one row by one row. It was found that the toner composition dispersion liquid was discharged from all of the 24 discharge holes.

The maximum discharge speed was found to be 16.4 m/sec, the minimum discharge speed was found to be 14.7 m/sec, and the ratio of the minimum discharge speed/maximum discharge speed was found to be 0.90.

The amount of the discharged liquid was found to be 4.72 g/min on the basis of the toner composition dispersion liquid. On the basis of the toner after drying, it was found to be about 0.45 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.41 μm, and a number average particle diameter (Dn) of 5.2 μm, and a D4/Dn ratio of 1.04.

Example 7

The procedure of Example 6 was repeated, except that the toner production conditions were changed to the following toner production conditions, to thereby produce a toner and a developer.
—Toner Production Conditions—
Specific gravity of toner composition dispersion liquid: $\rho$=1.19 g/cm$^3$
Flow rate of conveyance gas flow: dry nitrogen gas in apparatus 30.0 L/min
Flow direction of conveyance gas flow: the direction almost perpendicular to the direction of the initial velocity of the discharged liquid droplets
Speed of conveyance gas flow: 15 m/sec
Inner temperature of particle forming portion: 27° C. to 28° C.
Vibration frequency of discharge holes: 420.0 kHz
p-p value of Sin wave of voltage applied to PZT: 15.6 V
The state where the toner composition dispersion liquid was discharged was observed using the LED and the CCD camera in the same manner as in Example 1. It was found that the toner composition dispersion liquid was discharged from all of the 24 discharge holes.

The maximum discharge speed was found to be 16.3 m/sec, the minimum discharge speed was found to be 14.5 m/sec, and the ratio of the minimum discharge speed/maximum discharge speed was found to be 0.89.

The amount of the discharged liquid was found to be 4.70 g/min on the basis of the toner composition dispersion liquid. On the basis of the toner after drying, it was found to be about 0.45 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.1 μm, and a number average particle diameter (Dn) of 5.0 μm, and a D4/Dn ratio of 1.02.

Example 8

The procedure of Example 6 was repeated, except that the shapes of the discharge holes mid the toner production conditions were changed as follows, to thereby produce a toner and a developer.

The discharge holes were each formed so as to have such a round shape that the curvature radius thereof decreased along the direction in which the toner composition liquid was discharged. Specifically, with the discharge holes of the first row being those at the end portion of the frame at the fixed end side (at the side of the end portion 54), the discharge holes of the first to third rows were each adjusted so as to have a curvature radius $R_1$ of 40 μm, the discharge holes of the fourth and fifth rows were each adjusted so as to have a curvature radius $R_2$ of 45 μm, the discharge holes of the sixth to eighth rows were each adjusted so as to have a curvature radius $R_3$ of 50 μm, the discharge holes of the ninth to eleventh rows were each adjusted so as to have a curvature radius $R_4$ of 60 μm, and the discharge holes of the twelfth and thirteenth rows were each adjusted so as to have a curvature radius $R_5$ of 80 μm. Here, the "curvature radius" refers to a curvature radius of a round shape curved, in the thickness direction of the discharge structure, from a surface having openings of the discharge holes (i.e., a surface perpendicular to the thickness direction of the discharge structure).
—Toner Production Conditions—
Specific gravity of toner composition dispersion liquid: $\rho=1.19$ g/cm$^3$
Flow rate of conveyance gas flow: dry nitrogen gas in apparatus 30.0 L/min
Flow direction of conveyance gas flow: the direction almost perpendicular to the direction of the initial velocity of the discharged liquid droplets
Speed of conveyance gas flow: 15 m/sec
Inner temperature of particle forming portion: 27° C. to 28° C.
Vibration frequency of discharge holes: 420.3 kHz
p-p value of Sin wave of voltage applied to PZT: 15.2 V
The state where the toner composition dispersion liquid was discharged was observed using the LED and the CCD camera in the same manner as in Example 1. It was found that the toner composition dispersion liquid was discharged from all of the 24 discharge holes.
The maximum discharge speed was found to be 16.0 m/sec, the minimum discharge speed was found to be 14.1 m/sec, and the ratio of the minimum discharge speed/maximum discharge speed was found to be 0.88.
The amount of the discharged liquid was found to be 4.69 g/min on the basis of the toner composition dispersion liquid. On the basis of the toner particles after drying, it was found to be about 0.45 g/min.
The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.2 μm, and a number average particle diameter (Dn) of 5.1 μm; and a D4/Dn ratio of 1.02.

Example 9

The procedure of Example 6 was repeated, except that the toner composition liquid used was changed to a toner composition liquid having undergone the following toner composition liquid preparation step, aging step and filtration step and that the conditions for the liquid droplet-forming step and particle-forming step were changed to the following conditions, to thereby produce a toner and a developer.

Toner Composition Liquid Preparation Step

The procedure of the toner composition liquid preparation step in Example 1 was repeated, except that the toner composition liquid was prepared by the following method, to thereby prepare a toner composition liquid.
—Preparation of Toner Composition Liquid—
Using a mixer having stirring blades, 100 parts by mass of a polyester resin serving as a binder resin stored in a thermostat bath of 10° C., 30 parts by mass of a colorant dispersion liquid stored in a thermostat bath of 10° C., 30 parts by mass of a wax dispersion liquid stored in a thermostat bath of 10° C. and 840 parts by mass of ethyl acetate stored in a thermostat bath of 10° C. were homogeneously dispersed with stirring for 10 min in a room of 10° C., to thereby prepare a toner composition liquid (dispersion liquid).
<Aging Step>
Immediately after the above toner composition liquid preparation step, the toner composition liquid was adjusted in temperature to 15° C. and kept for 24 hours.
<Filtration Step>
The toner composition liquid having undergone the above aging step was heated from 15° C. to 20° C., followed by filtration using a filter cartridge (SBP-020, product of ROKI TECHNO CO., LTD.). Notably, before use, the filter cartridge, filtration machine and container had been left to stand for a long enough time in a room set to 20° C.
<Liquid Droplet-Forming Step and Particle-Forming Step>
The procedure of Example 6 was repeated, except that the toner production conditions were changed to the following toner production conditions and that after the toner composition liquid having undergone the filtration step had been heated from 20° C. to 25° C., the toner composition liquid was discharged as liquid droplets, to thereby produce toner base particles.
Notably, the toner production apparatus was operated in a factory adjusted in temperature to 25° C. Also, the temperature of the toner composition liquid was adjusted to 25° C. before the toner composition liquid would be discharged as liquid droplets. That is, the temperature of a region ranging from a raw material container 6 to the discharge holes 15 was adjusted to 25° C.
—Toner Production Conditions—
Specific gravity of toner composition dispersion liquid: $\rho=1.19$ g/cm$^3$
Flow rate of conveyance gas flow: dry nitrogen gas in apparatus 30.0 L/min
Flow direction of conveyance gas flow: the direction almost perpendicular to the direction of the initial velocity of the discharged liquid droplets
Speed of conveyance gas flow: 15 msec
Inner temperature of particle forming portion: 25° C.
Vibration frequency of discharge holes: 420.0 kHz
p-p value of Sin wave of voltage applied to PZT: 15.6 V
The state where the toner composition dispersion liquid was discharged was observed using the LED and the CCD camera in the same manner as in Example 1. It was found that the toner composition dispersion liquid was discharged from all of the 24 discharge holes. Even after discharged for 12 hours, the toner composition dispersion liquid was discharged from all of the 24 discharge holes.
The maximum discharge speed was found to be 16.2 m/sec, the minimum discharge speed was found to be 14.3 m/sec, and the ratio of the minimum discharge speed/maximum discharge speed was found to be 0.88.
The amount of the discharged liquid was found to be 4.74 g/min on the basis of the toner composition dispersion liquid. On the basis of the toner after drying, it was found to be about 0.45 g/min.
The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.2 μm, and a number average particle diameter (Dn) of 5.1 μm, and a D4/Dn ratio of 1.02.

Example 10

The procedure of the production of the toner base particles in Example 6 was repeated, except that the toner composition liquid was changed to a resin composition liquid prepared at the following resin composition liquid preparation step and that the conditions for the liquid droplet-forming step and particle-forming step were changed to the following conditions, to thereby produce fine resin particles.

<Resin Composition Liquid Preparation Step>

Using a mixer having stirring blades, 110 parts by mass of a polyester resin serving as a binder resin and 890 parts by mass of ethyl acetate were homogeneously dispersed with stirring for 10 min to prepare a resin composition liquid.

<Liquid Droplet-Forming Step and Particle-Forming Step>

The procedure of Example 6 was repeated, except that the toner production conditions were changed to the following fine resin particle production conditions, to thereby produce fine resin particles.

—Fine Resin Particle Production Conditions—

Specific gravity of resin composition liquid: $\rho=1.19$ g/cm$^3$

Flow rate of conveyance gas flow: dry nitrogen gas in apparatus 30.0 L/min

Flow direction of conveyance gas flow: the direction almost perpendicular to the direction of the initial velocity of the discharged liquid droplets Speed of conveyance gas flow: 15 m/sec Inner temperature of particle forming portion: 27° C. to 28° C.

Vibration frequency of discharge holes: 421.0 kHz p-p value of Sin wave of voltage applied to PZT: 15.8 V The state where the resin composition liquid was discharged was observed using the LED and the CCD camera in the same manner as in Example 1. It was found that the resin composition liquid was discharged from all of the 24 discharge holes.

The maximum discharge speed was found to be 16.2 m/sec, the minimum discharge speed was found to be 14.5 m/sec, and the ratio of the minimum discharge speed/maximum discharge speed was found to be 0.90.

The amount of the discharged liquid was found to be 4.73 g/min on the basis of the resin composition liquid. On the basis of the particles after drying, it was found to be about 0.45 g/min.

The dried/solidified resin particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.1 μm, and a number average particle diameter (Dn) of 5.0 μm, and a D4/Dn ratio of 1.02.

Comparative Example 4

The procedure of Example 5 was repeated, except that the toner production conditions were changed to the following conditions, to thereby produce a toner and a developer.

—Toner Production Conditions—

Specific gravity of toner composition dispersion liquid: $\rho=1.19$ g/cm$^3$

Flow rate of conveyance gas flow: dry nitrogen gas in apparatus 30.0 L/min

Flow direction of conveyance gas flow: the direction almost perpendicular to the direction of the initial velocity of the discharged liquid droplets Speed of conveyance gas flow: 15 m/sec Inner temperature of particle forming portion: 27° C. to 28° C.

Vibration frequency of discharge holes: 423.0 kHz p-p value of Sin wave of voltage applied to PZT: 16.0 V Shape of discharge holes: round shape (curvature radius: 40 μm in all the discharge holes)

The state where the toner composition dispersion liquid was discharged was observed using the LED and the CCD camera in the same manner as in Example 1. It was found that the toner composition dispersion liquid was discharged from all of the 24 discharge holes. The lengths of constriction wavelengths of the liquid columns discharged were varied with the positions of the discharge holes.

The maximum discharge speed was found to be 21.9 m/sec, the minimum discharge speed was found to be 7.3 m/sec, and the ratio of the minimum discharge speed/maximum discharge speed was found to be 0.33.

The amount of the discharged liquid was found to be 4.36 g/min on the basis of the toner composition dispersion liquid. On the basis of the toner after drying, it was found to be about 0.42 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 7.22 μm, and a number average particle diameter (Dn) of 5.6 μm, and a D4/Dn ratio of 1.29.

Comparative Example 5

The procedure of Example 7 was repeated, except that the toner production conditions were changed to the following conditions, to thereby produce toner base particles.

—Toner Production Conditions—

Specific gravity of toner composition dispersion liquid: $\rho=1.19$ g/cm$^3$

Flow rate of conveyance gas flow: dry nitrogen gas in apparatus 30.0 L/min

Flow direction of conveyance gas flow: the direction almost perpendicular to the direction of the initial velocity of the discharged liquid droplets Speed of conveyance gas flow: 15 m/sec Inner temperature of particle forming portion: 27° C. to 28° C.

Vibration frequency of discharge holes: 423.0 kHz p-p value of Sin wave of voltage applied to PZT: 16.0 V Shape of discharge holes: round shape (curvature radius: 40 μm in all the discharge holes)

The state where the toner composition dispersion liquid was discharged was observed using the LED and the CCD camera in the same manner as in Example 1. It was found that the toner composition dispersion liquid was discharged from all of the 24 discharge holes. The lengths of constriction wavelengths of the liquid columns discharged were varied with the positions of the discharge holes.

The maximum discharge speed was found to be 21.9 m/sec, the minimum discharge speed was found to be 7.3 m/sec, and the ratio of the minimum discharge speed/maximum discharge speed was found to be 0.33.

The amount of the discharged liquid was found to be 4.36 g/min on the basis of the toner composition dispersion liquid. On the basis of the toner after drying, it was found to be about 0.41 g/min.

The dried/solidified toner base particles were subjected to a soft X-ray irradiation to eliminate electric charge therefrom and then collected by suction through a filter having 1 μm fine pores. The particle size distribution of the particles collected one hour after operation was measured with a flow particle image analyzer (FPIA-2000, product of SYSMEX CORPORATION) in the same manner as in Example 1, and was found to have a weight average particle diameter (D4) of 5.8 μm, and a number average particle diameter (Dn) of 5.2 μm, and a D4/Dn ratio of 1.12.

The results of Examples 1 to 10 and Comparative Examples 1 to 5 are shown in the following Tables 1-1 and 1-2.

TABLE 1-1

|  |  | Shape of discharge holes | Conveyance gas flow path | Direction of gas flow | [No.]/ [Total No.] | [Max. speed]/ [Min. speed] | D4 (μm) | Dn (μm) | D4/ Dn | Collected amount (g/min) |
|---|---|---|---|---|---|---|---|---|---|---|
| FV | Ex. 1 | Different taper angle | Absent | — | 21/21 | 0.85 | 7.19 | 5.8 | 1.24 | 0.13 |
|  | Ex. 2 | Different taper angle | Present | Same | 21/21 | 0.85 | 5.60 | 5.3 | 1.06 | 0.13 |
|  | Ex. 3 | Different taper angle | Present | Almost perp. | 21/21 | 0.88 | 5.41 | 5.2 | 1.04 | 0.13 |
|  | Ex. 4 | Different round shape | Present | Almost perp. | 21/21 | 0.88 | 5.36 | 5.1 | 1.05 | 0.12 |
|  | Comp. Ex. 1 | Constant taper angle | Absent | — | 13/21 | 0.29 | 9.31 | 6.7 | 1.39 | 0.09 |
|  | Comp. Ex. 2 | Constant taper angle | Present | Same | 13/21 | 0.29 | 7.10 | 6.0 | 1.18 | 0.09 |
|  | Comp. Ex. 3 | Round shape | Present | Same | 15/21 | 0.46 | 6.80 | 5.6 | 1.21 | 0.10 |

In Table 1-1, the "FV" is an abbreviation of "film vibration type," "direction of gas flow" is a direction of the gas flow with respect to the initial discharge speed of the discharged liquid droplets, "[No.]/[Total No.]" is a ratio of the number of the discharge holes from which the liquid droplets were discharged to the total number of the discharge holes, "[Max. speed]/[Min. speed]" is a ratio of the maximum discharge speed to the minimum discharge speed, "D4" and "Dn" respectively denote weight average-particle diameter and number average particle diameter, and "collected amount" is-an amount of the liquid discharged on the basis of the toner or particles after drying.

TABLE 1-2

|  |  | Shape of discharge holes | Conveyance gas flow path | Direction of gas flow | [No.]/ [Total No.] | [Max. speed]/ [Min. speed] | D4 (μm) | Dn (μm) | D4/ Dn | Collected amount (g/min) |
|---|---|---|---|---|---|---|---|---|---|---|
| LCR | Ex. 5 | Different taper angle | Absent | — | 24/24 | 0.90 | 6.55 | 5.5 | 1.19 | 0.45 |
|  | Ex. 6 | Different taper angle | Present | Same | 24/24 | 0.90 | 5.41 | 5.2 | 1.04 | 0.45 |
|  | Ex. 7 | Different taper angle | Present | Almost perp. | 24/24 | 0.89 | 5.10 | 5.0 | 1.02 | 0.45 |
|  | Ex. 8 | Different round shape | Present | Almost perp. | 24/24 | 0.88 | 5.20 | 5.1 | 1.02 | 0.45 |
|  | Ex. 9 | Different taper angle | Present | Almost perp. | 24/24 | 0.88 | 5.20 | 5.1 | 1.02 | 0.45 |
|  | Ex. 10 | Different taper angle | Present | Almost perp. | 24/24 | 0.90 | 5.10 | 5.0 | 1.02 | 0.45 |
|  | Comp. Ex. 4 | Round shape | Absent | — | 24/24 | 0.33 | 7.22 | 5.6 | 1.29 | 0.42 |
|  | Comp. Ex. 5 | Round shape | Present | Almost perp. | 24/24 | 0.33 | 5.80 | 5.2 | 1.12 | 0.41 |

In Table 1-2, the "LCR" is an abbreviation of "liquid column resonance type" and the "direction of gas flow," "[No.]/[Total No.]," "[Max. speed]/[Min. speed]," "D4," "Dn" and "collected amount" have the same meanings as described in Table 1-1.

The toner composition liquid was discharged from all of the discharge holes in Examples 1 to 10, while in Comparative Examples 1 to 3, it was discharged from 13 or 15 discharge holes only. In Examples 1 to 10, the discharge holes were adjusted in taper angle so that a uniform pressure was applied to the discharge holes at the side where the toner composition liquid was supplied. In Comparative Examples 1 and 2, the discharge holes had the same taper angle; and in Comparative Example 3, the discharge holes did not have tapered shapes. Thus, the pressure applied was varied with the positions of the discharge holes in the discharge structure. Conceivably, the discharge holes at the vibration generator side where the pressure was smaller could not receive a sufficient pressure to discharge the toner composition liquid.

Also, regarding the ratio of the minimum discharge speed, which was observed at the vibration generator side of the discharge structure, to the maximum discharge speed, which was observed near the center of the discharge structure, the ratio of the minimum discharge speed/the maximum discharge speed was closer to 1 in Examples 1 to 10 than in Comparative Examples 1 to 5. Conceivably, the reason for this also lies in that a uniform pressure was applied to the discharge holes.

The weight average particle diameter D4 was smaller in Examples 1 to 10 than in Comparative Examples 1 to 5. This is likely because the liquid droplets were frequently aggregated with each other at the vibration generator side where the discharge speed was lower in Comparative Examples 1 to 5, while in Examples 1 to 10, such aggregation of the liquid droplets occurred to a less extent. The ratio D4/Dn, which is indicative of the extent of variation in the particles, was also smaller in Examples 1 to 10 than in Comparative Examples 1 to 5 for the same reason. In addition, the ratio D4/Dn was closer to 1 when the discharged liquid droplets were conveyed with the conveyance gas flow fed through the conveyance gas flow path of the toner production apparatus. In particular, the ratio D4/Dn was much closer to 1 when the flow direction of the conveyance gas flow was almost perpendicular to the direction of the initial velocity of the discharged liquid droplets.

The amount of the particles collected was larger in Examples 5 to 10, using the liquid column resonance-type liquid droplet-forming unit, than Examples 1 to 3 using the film vibration-type liquid droplet-forming unit.

The toner production method and apparatus of the present invention can discharge liquid droplets from a plurality of discharge holes at the same time, can discharge a uniform amount of liquid droplets from the discharge holes without aggregating the discharged liquid droplets with each other, and can discharge a larger number of liquid droplets per unit of time. Thus, they can efficiently produce a toner having a wide variety of applications and a high monodispersibility.

The toner obtained by toner production method and apparatus of the present invention has a wide variety of applications and a high monodispersibility and thus, can suitably be used for a developer for developing an electrostatic image in, for example, electrophotography, electrostatic recording and electrostatic printing. This developer is used for all conventional latent electrostatic image bearing members used for electrophotography. In particular, it is suitable to, for example, organic latent electrostatic image bearing members, amorphous-silica latent electrostatic image bearing members, selenium latent electrostatic image bearing members and zinc-oxide latent electrostatic image bearing members.

This application claims priority to Japanese patent application Nos. 2010-208237, filed on Sep. 16, 2010, 2011-017096, filed on Jan. 28, 2011, and 2011-047673, filed on Mar. 4, 2011, and incorporated herein by reference.

What is claimed is:

1. An apparatus for producing a toner, comprising:
   a liquid droplet-forming unit configured to discharge a toner composition liquid containing at least a resin and a colorant at a uniform discharge speed from a plurality of discharge holes including holes of different shapes to form liquid droplets, and
   a particle-forming unit configured to solidify the liquid droplets of the toner composition liquid to form particles,
   wherein the liquid droplet-forming unit includes a discharge structure in which the plurality of the discharge holes are formed,
   wherein each of the discharge holes has a tapered shape such that an opening size thereof decreases along a direction in which the toner composition liquid is discharged,
   wherein each of the discharge holes has a taper angle that is set differently based on a position of the each of the discharge holes in the discharge structure,
   wherein the liquid droplet-forming unit includes a liquid chamber in which the discharge holes are formed and a vibration generator configured to apply a vibration to the toner composition liquid in the liquid chamber, and
   wherein the liquid droplet-forming unit is configured to allow the vibration generator to apply the vibration to the toner composition liquid in the liquid chamber to form a standing wave in the toner composition liquid by liquid column resonance, to discharge the toner composition liquid as the liquid droplets from the discharge holes formed in a region corresponding to an antinode of the standing wave.

2. The apparatus for producing a toner according to claim 1, wherein the particle-forming unit includes a conveyance gas flow path that allows a conveyance gas flow to pass therethrough, the conveyance gas flow conveying at least one of the liquid droplets of the toner composition liquid and solidified particles of the toner composition liquid.

3. The apparatus for producing a toner according to claim 2, wherein the conveyance gas flow path is provided so as to allow the conveyance gas flow to flow in a direction substantially perpendicular an initial discharge direction of the liquid droplets discharged by the liquid droplet-forming unit.

4. A method for producing a toner with an apparatus for producing a toner, the method comprising:
   discharging, via a liquid droplet-forming unit, a toner composition liquid containing at least a resin and a colorant at a uniform discharge speed from a plurality of discharge holes including holes of different shapes to form liquid droplets, and
   solidifying, via a particle forming unit, the liquid droplets of the toner composition liquid to form particles,
   wherein the liquid droplet-forming unit includes a discharge structure in which the plurality of the discharge holes are formed,
   wherein each of the discharge holes has a tapered shape such that an opening size thereof decreases along a direction in which the toner composition liquid is discharged, and
   wherein each of the discharge holes has a taper angle that is set differently based on a position of the each of the discharge holes in the discharge structure,
   wherein by discharging the toner composition liquid, a vibration is applied to the toner composition liquid in a liquid chamber including the discharge holes to form a standing wave in the toner composition liquid by liquid column resonance to discharge the toner composition liquid from the discharge holes formed in a region corresponding to an antinode of the standing wave.

5. The method for producing a toner according to claim 4, wherein the step of solidifying the liquid droplets further comprising conveying the liquid droplets present within a distance of 2 mm from openings of the discharge holes where the openings are toward a side where the toner composition liquid is discharged, using a conveyance gas flow that flows in a direction substantially perpendicular to an initial discharge direction of the liquid droplets.

6. The method for producing a toner according to claim 4, further comprising, prior to the step of discharging the toner composition liquid, dissolving or dispersing in an organic solvent a toner composition containing at least a resin and a colorant to prepare the toner composition liquid, and filtrating the toner composition liquid to remove coarse particles therefrom, wherein a temperature of the toner composition liquid at the step of discharging the toner composition liquid is higher than that of the toner composition liquid at the step of filtrating the toner composition liquid.

7. An apparatus for producing fine resin particles, comprising:

a liquid droplet-forming unit configured to discharge a resin composition liquid at a uniform discharge speed from a plurality of discharge holes including holes of different shapes to form liquid droplets, and a particle-forming unit configured to solidify the liquid droplets of the resin composition liquid to form particles, wherein the liquid droplet-forming unit includes a discharge structure in which the plurality of the discharge holes are formed, wherein each of the discharge holes has a tapered shape such that an opening size thereof decreases along a direction in which the resin composition liquid is discharged, and wherein each of the discharge holes has a taper angle that is set differently based on a position of the each of the discharge holes in the discharge structure, wherein the liquid droplet-forming unit includes a liquid chamber in which the discharge holes are formed and a vibration generator configured to apply a vibration to the resin composition liquid in the liquid chamber, and wherein the liquid droplet-forming unit is configured to allow the vibration generator to apply the vibration to the resin composition liquid in the liquid chamber to form a standing wave in the resin composition liquid by liquid column resonance, to discharge the resin composition liquid as the liquid droplets from the discharge holes formed in a region corresponding to an antinode of the standing wave.

8. The apparatus for producing a toner according to claim 1, wherein the taper angles of the discharge holes located at a side of the vibration generator in the discharge structure are smaller than those of the discharge holes located at an end portion of a frame at a fixed end side.

\* \* \* \* \*